United States Patent [19]

Suzuki et al.

[11] Patent Number: 5,681,494
[45] Date of Patent: Oct. 28, 1997

[54] TEMPERATURE CONTROL METHOD FOR FIXING DEVICE AND FIXING DEVICE AND IMAGE FORMING APPARATUS USING SAME TEMPERATURE CONTROL METHOD

[75] Inventors: Takashi Suzuki; Hisako Katsuura, both of Nagano, Japan

[73] Assignee: Seiko Epson Corporation, Tokyo, Japan

[21] Appl. No.: 325,110

[22] Filed: Oct. 17, 1994

[30] Foreign Application Priority Data

Oct. 15, 1993 [JP] Japan ................... 5-258761
Oct. 15, 1993 [JP] Japan ................... 5-258762
Mar. 18, 1994 [JP] Japan ................... 6-048555

[51] Int. Cl.$^6$ ........................... H05B 1/02
[52] U.S. Cl. ............... 219/497; 219/216; 219/505; 219/501; 374/102
[58] Field of Search ................... 219/216, 497, 219/492, 501, 505, 488, 494, 508; 307/117, 119; 374/102

[56] References Cited

U.S. PATENT DOCUMENTS

| 3,833,790 | 9/1974 | Quant et al. ............... 219/216 |
| 4,318,612 | 3/1982 | Brannan et al. ........... 355/14 FU |
| 4,374,321 | 2/1983 | Cunningham, Jr. et al. ... 219/505 |
| 4,404,461 | 9/1983 | Sitek et al. ................ 219/490 |
| 4,551,007 | 11/1985 | Elter ....................... 219/216 |
| 4,868,368 | 9/1989 | Araki ....................... 219/216 |
| 5,053,604 | 10/1991 | Escaravage et al. ........ 219/48 |
| 5,260,548 | 11/1993 | Todd et al. ................ 219/483 |
| 5,332,883 | 7/1994 | Highshira .................. 219/497 |

FOREIGN PATENT DOCUMENTS

| 0025606 | 3/1981 | European Pat. Off. . |
| 0030372 | 6/1981 | European Pat. Off. . |
| 0085950 | 8/1983 | European Pat. Off. . |
| 55-156976 | 12/1980 | Japan . |
| 63-48349 | 9/1988 | Japan . |
| 24909 | 1/1990 | Japan . |
| 473786 | 3/1992 | Japan . |
| 4113378 | 4/1992 | Japan . |
| 756650 | 9/1956 | United Kingdom . |
| 1226015 | 3/1971 | United Kingdom . |
| 1256499 | 12/1971 | United Kingdom . |
| 1358292 | 7/1974 | United Kingdom . |
| 1576615 | 10/1980 | United Kingdom . |
| 2068596 | 8/1981 | United Kingdom . |

Primary Examiner—Mark H. Paschall
Attorney, Agent, or Firm—Sughrue, Mion, Zinn, Macpeak & Seas, PLLC

[57] ABSTRACT

The present invention relates to a temperature control method for a fixing device of an image forming apparatus using an electrostatic photographing process, and it is an object of the present invention particularly to realize excellent temperature control performance without any addition of any complicated mechanism or device to a fixing device using a heater having a small heat capacity.

The present invention is characterized by:

(1) Correcting a detected temperature, above all, correcting a delay in the detection by a temperature sensor, in accordance with a predetermined equation with a view to determining the electric power to be supplied (i.e., to be applied);

(2) Supplying the electric power to be supplied (applied) to the heater by using a particular pattern, and, above all, supplying the electric power to be supplied in a sampling period to be set up for the purpose and additionally in specific units formed by dividing the sampling period into smaller segments;

(3) Performing sequential control by using a temperature discriminating method for the pressurizing roller and, above all, by estimating the temperature of a pressurizing roller not provided with any temperature detector on the basis of a natural temperature decline process in the heater, the quantity of heat which the heater is deprived of, the transport of the recording medium, and so forth, and applying an adequate quantity of electric power to the heater on the basis of such an estimate.

30 Claims, 28 Drawing Sheets

PATTERN A

TEMPERATURE CONTROL METHOD FOR FIXING DEVICE AND FIXING DEVICE AND IMAGE FORMING APPARATUS USING SAME TEMPERATURE CONTROL METHOD

BACKGROUND OF THE INVENTION

1. Field of the Invention

The present invention relates to an image forming apparatus which is used for a copying machine, a printer, a facsimile machine, or the like, and, more particularly, it relates to a fixing device for an image forming apparatus which employs an electrostatic photographing process and to a temperature control method to be applied to such a fixing device.

2. Related Background Art

For a fixing device which performs the fixing of an electrostatic photograph image on a recording medium, it has hitherto been in practice to use a thermal fixing device which performs a fixing process by applying heat and by applying pressure to a recording medium by means of a heating member, such as a heating roller, which has attained a high temperature with the heat generated by a heater when it is supplied with electric power, and by means of a pressurizing member, such as a pressurizing roller, which holds and transports the recording member between itself and the heating member. Now, the operating states of such a thermal fixing device consist of a warm-up state, in which the thermal fixing device attains a fixing enabled state with a rise in its temperature from its non-heated state to a predetermined temperature, and a fixing enabled state, in which the thermal fixing device is capable of performing a fixing process on a recording medium passed through it. It is in practice to control the electric power supplied to the heater in order to make both of these states more desirable.

What is most keenly desired of the warm-up state is to attain a reduction of the duration of time needed until the required temperature rise is attained, namely, the so-called warm-up time, thereby achieving a state in which the fixing process can be finished more promptly. This not merely means a reduction of a waiting time, which is to be spent from the time when the power source for the device is turned ON to the time when the device can be operated, but also makes it possible to de-energize the heater in the stand-by time for the device, which is to be designed so as to perform a warming up operation after its reception of an image forming command, provided that the warm-up time can be reduced beyond a certain extent. Since the time in which an image forming job is performed is usually very short in comparison with the time for the stand-by state, the arrangement described above will be able to attain the saving of a considerable amount of electric power.

In the meanwhile, what is most keenly desired of the fixing enabled state attained after the completion of a warm-up operation is to keep the temperature of the heating member and that of the pressurizing member at as constant a level as possible, thereby ensuring that the recording medium can always be fixed stably in a favorable condition.

For the control of the electric power to be supplied to the heater in the fixing enabled state of the fixing device, the available control processes include a process generally known as a "temperature control" for keeping the temperature of the heating member or the like as constantly as possible at the target value and a process generally known as a "sequence control" for performing such jobs as changing the target temperature in accordance with the conditions of the particular image forming job, such as the number of sheets to be printed, and either one of these two control processes is employed independently, or both of them in combination, in accordance with the purpose.

Among the various processes for what is generally called temperature control, the process which has hitherto been in the commonest practice is the so-called ON/OFF control process in which the electric power to be conducted to the heater will be turned ON when the detected temperature is any lower than the predetermined target temperature while the electric power will be turned OFF when the detected temperature is any higher than the predetermined target temperature. However, the ON/OFF control process has a disadvantage in that it is difficult for the temperature control process to attain a stable and favorable state of fixing since there occurs a temperature ripple in consequence of an overshoot which occurs after an ON operation and an undershoot which occurs after an OFF operation. In order to reduce this disadvantage, it has hitherto been in practice to use a heating roller having a comparatively large heat capacity, but this practice has resulted in a prolongation of the warm-up time in which the heating roller attains a rise in its temperature up to such a temperature as will ensure a favorable state of fixing. That is to say, this process has failed to attain a reduction of the warm-up time while achieving a success in securing a favorable state of fixing.

In view of these circumstances, the Unexamined Japanese Patent Publication No. Hei. 2-4909 describes a method for controlling the temperature by storing a plural number of output patterns for a particular pulse and by selectively putting out one of the patterns in accordance with the difference between the detected temperature and the target temperature, so that the temperature ripple may be reduced thereby and so that finer and more appropriate control may be performed. Yet, in the case of the output based on the selection of a pattern, it will be necessary to provide a large memory for storing such patterns, and, in addition, the algorithm will be complex. Further, in case it is intended to apply any large electric power to a heating roller which has a small heat capacity, so that the warm-up time may be thereby reduced, then it will be necessary to perform finer control, but, in such a case, there occurs a disadvantage that it is not possible to deal properly with the requirements in the control with a small number of particular patterns mentioned above. Further, this conventional example requires that an output pattern should be selected with a detection of the temperature to be made once in every 15 msec., with the result that the CPU which performs the control of the device has an increased burden to such an extent that another CPU dedicated exclusively to the control of temperature will be needed. On the other hand, any effort to reduce the burden placed on the CPU gives rise to the disadvantage that it requires an extension of the detecting time and consequently an increase of the temperature ripple. In order to deal properly with these disadvantages, a large number of additional patterns are needed for the selection, and, accordingly, a larger capacity is required for the memory device.

Further, depending on the output pattern as selected, the control process has the disadvantage that the flickers which occur to the other electrical apparatuses than the fixing device and, above all, those flickers which occur to lighting appliances, such as a fluorescent lamp and an incandescent lamp, and display units which are connected to the same power source line cause attention-distracting troubles, and an application of large electric power to a heating roller having a small heat capacity will result in a consistent increase of flickers and is therefore not desirable.

In contrast with this, the Japanese Patent Publication No. 48349-1988 (Showa 63) describes an example in which a phase control means is kept in operation while the exposing lamp in a copying machine is being turned ON, as a measure intended for preventing the flickers which would otherwise occur to the other electrical apparatuses on the same electric power source line as that for a fixing device and an image forming apparatus using the fixing device in it, but this structure formed with a phase control means has the disadvantage that it generates noises and is consequently not desirable.

Further, the Japanese Patent Application Laid Open No. 113378-1992 (Heisei 4) discloses a method intended for attaining a reduction of the temperature ripple and a reduction of the warm-up time by performing a control process which operates by a changeover between a mode in which the electric power supplied to the heater is to be controlled in multiple stages on the basis of the difference from the target temperature and a mode in which the electric power supplied to the heater is controlled in multiple stages on the basis of the amount of change in the difference. However, this prior art technique does not achieve any sufficient reduction of the temperature ripple or any sufficient reduction of the warm-up time, and it is difficult for this technique to perform any high-speed warming up operation while performing a control operation with any sufficient accuracy particularly in a device provided with a heating roller having a small heat capacity.

Further, the Japanese Patent Application Laid Open No. 73786-1992 (Heisei 4) discloses a method for reducing a temperature ripple by reducing an overshoot by performing fuzzy logical operations using the temperature detected by a temperature sensor and an amount of change in the detected temperature. However, this prior art technique has had a disadvantage in that the CPU will have an increased burden since the processing of fuzzy logical inferences will grow too complicated for the performance of temperature control with a high degree of accuracy.

On the other hand, various types of methods for achieving a reduction of the warm-up time by the use of sequence control have been disclosed. A fixing device provided with a heating roller requires not only the time needed for the heating roller to attain a prescribed fixing temperature in the duration of time starting from the state in which the heating roller is not supplied with any electric power to the time when the heating roller attains a state which enables the fixing device to perform a fixing operation, but also the time in which the pressurizing roller attains a rise in temperature to a certain level of temperature. Therefore, if it is intended to attain any sufficient fixing state before the pressurizing roller has yet attained any rise in temperature, it is necessary to set up the temperature of the heating roller at a level of temperature higher than that of the prescribed fixing temperature. Yet, if the pressurizing roller attains a rise in its temperature in the state of the higher temperature mentioned above, the pressurizing roller will be in a state of its excessive heating in relation to the recording medium, causing such a disadvantage as wrinkles developed on the recording paper. In view of this disadvantage, a control method, such as the one disclosed in the Japanese Utility Model Application Laid Open No. 181258-1980 (Showa 55), has been developed and known to those persons skilled in the art. According to this control method, a fixing process is to be performed with a heating roller set at a higher temperature only for the fixing operation performed on a prescribed number of sheets of recording paper immediately after the completion of its warm-up while any fixing process on any subsequent sheet of recording paper is to be performed at a reduced temperature. However, it occurs in this prior art example in some cases that the pressurizing roller remains at a high temperature even immediately after the completion of an warm-up operation under the influence of an image forming job performed in the past or under the influence of the ambient temperature of the fixing device in the image forming apparatus. In such a case, it is not avoidable that excessive heating is applied to the recording medium, so that it has not been possible to attain any constantly stable state of fixing.

Further, the Japanese Patent Application Laid Open No. 32467-1982 (Showa 57) discloses a method whereby the heating roller is to be set at a higher temperature in case the period of time from the start of the conduction of electric power to the heater to the time when the heating roller attains the target temperature exceeds a prescribed period of time. This prior art example is not liable to cause any such disadvantage as excessive heating since the method described in this prior art example estimates the temperature of the pressurizing roller and the like in the inside region of an image forming apparatus on the basis of the period of time required for the rise of temperature on the heating roller. However, this prior art example does not permit any proper judgment since the temperature of the pressurizing roller can scarcely be reflected on the rise of temperature of the heating roller, provided that the pressurizing roller and the heating roller remain in their respective stationary states. In contrast with this, an attempt at judging the degree of the rise in the temperature of the pressurizing roller while both the heating roller and the pressurizing roller are set in their concurrent rotation from the state in which the heating roller is cold will eventually result in an increase of the warm-up time in consequence of a delay that occurs in the rise of the temperature because the heating roller is first deprived of heat by the pressurizing roller at the time of a rise in the temperature. Further, such an attempt results in forcibly starting the rotation of the heating roller in a state in which toner is solidified as it has been deposited in a very small amount at each time in the gaps between those component parts which work in their sliding motion with the heating roller, such as the gap between the heating roller and a temperature sensor, which is in its contact with the heating roller, so that physical damages are given in some cases to an offset-preventing layer and a temperature sensor which are respectively formed on the surface of the heating roller.

Further, the Japanese Patent Application Laid Open No. 39554-1975 (Showa 50) discloses a structure for controlling the electric power applied to the heating roller on the basis of the temperatures detected respectively of a heating roller and a pressurizing roller, each of which is provided with a temperature sensor. In this prior art example, however, it is necessary to provide another temperature sensor in addition to the temperature sensor which measures the temperature of the heating roller, so that the requirement for these temperature sensors has incurred greater complexity in the construction of a fixing device or that of an image forming apparatus using such a fixing device in it. Furthermore, in the case of a contact type temperature sensors, the provision of such a temperature sensor works as a cause of damages affecting the pressurizing roller, which is inferior in friction resistance to the heating roller.

Still further, the thermal fixing devices in the several prior art examples described above have been found to suffer a deterioration in the state of fixing as the result of the passage of the recording medium through them. Therefore, the Japanese Patent Application Laid Open No. 156976-1980

(Showa 55) discloses a method including a step for supplying such electric power as compensates for a decline which occurs in the fixing temperature in consequence of the absorption of heat by the recording medium by an application of the power at a time prior to the passage of the recording medium through the fixing device. However, this prior art example offers a method for making a correction of a decline which occurs in the temperature of the heating roller as the result of a delay in the feedback control, and the method consists of conducting predetermined constant electric power as from the leading edge of the recording medium. Hence, this prior art method does not incorporate any consideration or any countermeasure for a deterioration progressively affecting the fixing performance according as the recording medium passes through the fixing device.

SUMMARY OF THE INVENTION

The present invention, which has been made in view of the above-mentioned disadvantages, has found a control method capable of achieving excellent temperature control, without any addition of any complex mechanism or device to a fixing device that employs a heating means comparatively small in its heat capacity or comparatively large in the amount of electric power.

A first object of the present invention is to realize highly accurate temperature control capable of operating with small temperature ripples and with a slight constant deviation and capable of achieving both a reduction of the warm-up time and a stable state of favorable fixing.

Further, a second object of the present invention is to realize an electric power supply control method which is capable of making fine temperature adjustments using highly advanced means, such as the method for controlling the temperature for attaining the first object, in spite of the fact that the method places only a small burden on the Central Processing Unit (CPU) and does not require any memory device in any large capacity, and is capable of preventing the occurrence of flickers unpleasant to the human eyes on other electrical appliances, above all, lighting appliances (such as fluorescent lamps and incandescent lamps) and display units, which are connected to the same electric power source line as that for a fixing device or an image forming apparatus using the fixing device.

Still further, a third object of the present invention is to realize a sequence control over temperature which is capable of achieving both a reduction of the warm-up time and a stable state of favorable fixing, without any dependence on any temperature fluctuations that occur in the pressurizing member under the influence of an image forming job performed in the past or under the influence of the ambient temperature.

Still further, a fourth object of the present invention is to offer a fixing device having excellent temperature controlling performance and yet formed in a compact size, at a low cost, and with favorable electric power saving characteristics and also to offer an image forming apparatus provided with such a fixing device.

The temperature controlling method employed in the fixing device according to the present invention have the three characteristic features described in the following part:
(1) Temperature Control - - - Correction of Detected Temperature The fixing device according to the present invention has a correcting means for correcting an error which occurs between the actual temperature and the detected temperature as the result of the time of a delay in detection by a temperature detecting means. Moreover, the fixing device can effect a change in the electric power applied to the heating means, using the temperature as thus corrected.
(2) Electric Power Control - - - Supply Patterns for Supplied (Applied) Electric Power This fixing device supplies (applies) calculated applied electric power in a particular pattern to a heating means in a fixing enabled state in which the fixing device is enabled to perform a fixing process on a recording medium passed through it.
(3) Cequence control - - - Estimation of Temperature on Pressurizing Roller This fixing device can estimate the temperature of the pressurizing roller, for which it is not provided with any temperature detecting means, on the basis of the natural process of a temperature decline on the heating means, the quantity of heat (i.e., calorific value) of which the heating means is deprived, the transport of the recording medium, and so forth and can then apply an adequate amount of electric power to the heating means on the basis of the estimated temperature.

Now, a more detailed description will be made of the characteristic features of the present invention as described above:
(1) Temperature Control The primary cause of the temperature ripples is a delay in the responses of the various parts of the control systems including a fixing device and a temperature control device. It has been found that a delay in a detection by a temperature sensor, among such delays, is most predominant. In view of this point, the fixing device according to the present invention is provided with a correcting means, which corrects the error that occurs between the actual temperature and the detected temperature of the heating means in consequence of a delay in a detection by a temperature sensor. It is desirable that this correcting method is put into practice on the basis of the rate of change in the temperature detected by the temperature sensor and the product of a prescribed time constant for a delay in detection. In specific terms, the correcting process is performed as expressed by the following equation:

$$T_c = T_s + (k \cdot \tau \cdot \Delta T_s / \Delta t)$$

wherein, $T_c$ = temperature as corrected $T_s$ = temperature detected by temperature sensor provided, however, that the rate of change in the temperature as detected by the temperature sensor is expressed by $\Delta T_s / \Delta t$, that the time constant for the delay in detection is expressed by $\tau$, and that the correction factor is expressed by $k$ ($0 < k \leq 1.5$).

Then, it is desirable to calculate the applicable electric power P by using this corrected temperature $T_c$. As regards the specific formula for calculation and a calculating method, it is desirable to perform the calculations by using the following formula:

$$P = G \cdot (T^* - T_c) + P_c$$

wherein, $T^*$ expresses the target temperature, $P_c$ expresses the offset electric power, and G expresses the gain.
(2) Electric Power Control As a pattern for supplying (applying) electric power, this fixing device operates by a method for determining a pattern for each prescribed period (i.e., each sampling period). That is to say, the fixing device performs a sampling operation on the temperature detected by the temperature sensor for every sampling period and then finds the quantity of electric power to be supplied (i.e., applied) by performing calculations on the basis of the sampling operation, and then selects a specific electric power supply pattern corresponding to the quantity of electric power to be supplied. This method is employed with a view to realizing a very fine and stable temperature control with a high degree of accuracy.

Specifically, the temperature control period is composed of a first period and a second period (i.e., a sampling period), which is longer than the first period, and, within the second period, it is possible to set up a first phase, in which an application of electric power to the heating means is permitted, and a second phase, in which it is not permitted to apply any electric power to the above-mentioned heating means, and the temperature control period employed in this fixing device is characterized by supplying electric power to the heating device in the first period within the first phase.

Further, it has been found that an active use of this electric power supply pattern is very effective for preventing the occurrence of flickers unpleasant to the human eyes on other electrical appliances, above all, lighting appliances (fluorescent lamps and incandescent lamps) which are provided on the same power source line as that for the fixing device and an image forming apparatus using the fixing device. Still further, another electric power supply pattern, which does not provide any sampling period, has been found for the prevention of the flickers mentioned above.

Specifically, this electric power supply pattern takes a half-cycle portion of an alternating current wave supplied to the heating means as a single unit to be used as a standard and sets up a specific power-on/power-off pattern using the unit just mentioned.

(3) Sequence Control

The characteristics of the sequence control according to the present invention are such that the sequence control system estimates the temperature of the pressurizing roller and effects a change in the control temperature to be taken as a target in accordance with the state of the temperature thus estimated, thereby making an adequate change in the quantity of electric power to be applied to the heating means. Several specific examples of the control methods are described in the following:

A method for selecting a control temperature for the heating means at the time when fixing a predetermined number of sheets of the recording medium right after the warm-up state in accordance with a predetermined discriminating temperature $T_D$, and here the discriminating temperature $T_D$ is determined by the formula, $T_D \leq T_I$, in which the temperature at which the temperature difference between the heating means and the pressurizing means will be within a predetermined range in the process of a natural decline in temperature on the heating means is expressed as an equalizing temperature $T_I$.

A method for selecting a control temperature for the heating means on the basis of the quantity of heat of which the heating roller is deprived by the pressurizing roller in a state in which the heating means and the pressurizing means are being driven.

A method for controlling the applied electric power in such a manner that the applied power will be larger in the latter half portion than in the former half portion of the fixing operation for a single sheet of the recording medium.

A method for controlling the applied electric power in such a manner that the fixing temperature will be higher in the latter half portion than in the former half portion of the fixing operation for a single sheet of the recording medium.

The temperature control method for the fixing device according to the present invention and the fixing device, as well as an image forming apparatus, which uses the temperature control method will be described in detail below with reference to the examples of the optimum embodiments of the present invention.

BRIEF DESCRIPTION OF THE DRAWINGS

FIG. 20 (a) is a chart illustrating the fluctuations occurring in the quantity of light in correspondence to the second period, and FIG. 20 (b) is a chart illustrating the fluctuations which occur in the quantity of light in correspondence to the first period;

FIG. 21 (a) is a chart illustrating the fluctuations which occur in the quantity of light in correspondence to the second period, and FIG. 21 (b) is a chart illustrating the fluctuations which occur in the quantity of light in correspondence to the first period;

FIG. 22 (a) is a chart illustrating the fluctuations which occur in the quantity of light in correspondence to the second period, and FIG. 22 (b) is a chart illustrating the fluctuations which occur in the quantity of light in correspondence to the first period;

FIG. 25 (a) is a chart illustrating the fluctuations which occur in the quantity of light in correspondence to the second period, and FIG. 25 (b) is a chart illustrating the fluctuations which occur in the quantity of light in correspondence to the first period;

FIG. 26 (a) is a chart illustrating the fluctuations which occur in the quantity of light in correspondence to the second period, and FIG. 26 (b) is a chart illustrating the fluctuations which occur in the quantity of light in correspondence to the first period;

[DESCRIPTION OF REFERENCE NUMBERS]

Figure 1:
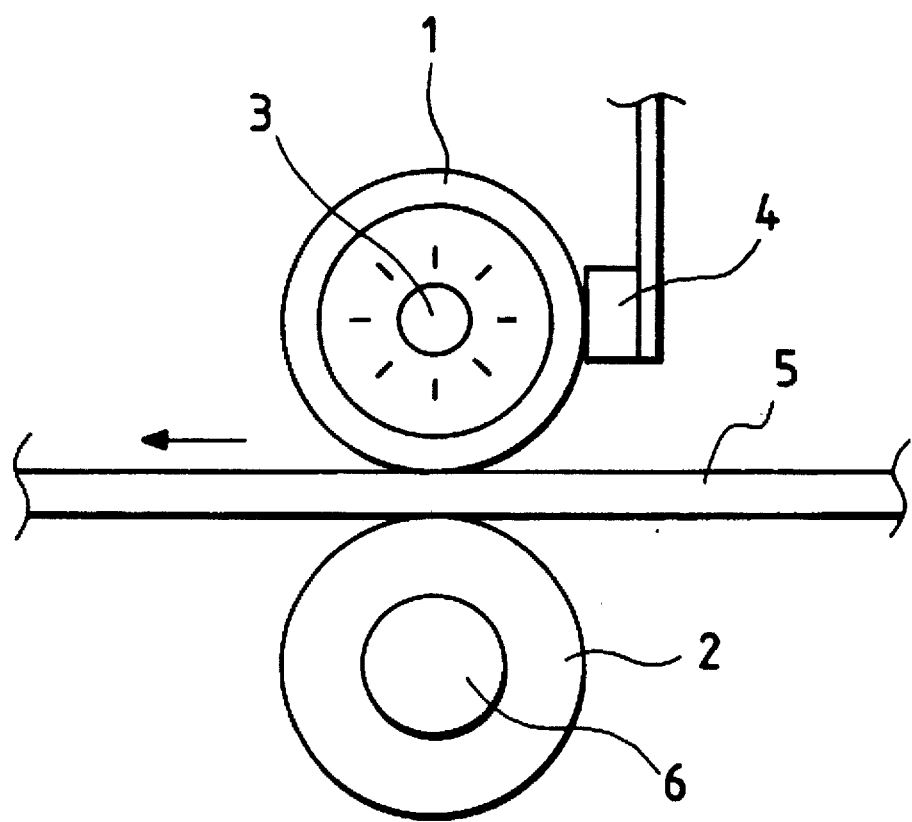
FIG. 1 is a sectional view illustrating an example of embodiment of a fixing device according to the present invention.

1. Heating roller
2. Pressurizing roller
3. Halogen lamp heater
4. Temperature sensor
5. Recording medium
6. Metal shaft
7. SSR (Solid State Relay)
8. Zero switching circuit
9. Amplifier
10. Analog-digital converter (A/D converter)
11. Input-output (I/O)
12. Read Only Memory (ROM)
13. Central Processing Unit (CPU)
101. Unit corresponding to count0
102. Unit corresponding to count1
103. Unit corresponding to count2
104. Unit corresponding to count3
105. Unit corresponding to count4
201. Fluctuations in quantity of light
202. Fluctuations in quantity of light in Example 2 of Experiment according to the present invention
203. Fluctuations in quantity of light in Example 3 of Experiment according to the present invention
204. Fluctuations in quantity of light in Example 4 of Experiment according to the present invention
205. Fluctuations in quantity of light in Example 5 of Experiment according to the present invention
206. Fluctuations in quantity of light in Example 6 of Experiment according to the present invention

DESCRIPTION OF THE PREFERRED EMBODIMENTS

Now, an example of preferred embodiment of the present invention as applied to a printer, which is an example of an image forming apparatus, will be described below with reference to the accompanying drawings. In this regard, a description of the construction of the printer as a whole will be omitted, and a description will first be made here with respect to an outline of a fixing device and the entire construction of a temperature control device for the fixing device, which constitute the essential parts of the present invention.

1. Construction of Fixing Device

FIG. 1 is a sectional view illustrating the construction of an example of embodiment of a fixing device according to the present invention. With a halogen lamp heater 3 provided in the inside area of a heating roller 1 in a hollow cylinder shape supported in such a manner as to permit its rotation, and the heating roller 1 will be heated up with a predetermined amount of electric power applied to it. Onto the surface of the heating roller 1, a temperature sensor 4 (i.e., a temperature detecting means) with a thermistor built into it is pressed under pressure applied to it, and the electric power to be conducted to the halogen lamp heater 3 will be controlled on the basis of the temperature detected by the temperature sensor 4.

A pressurizing roller 2, which is supported in such a manner as to permit its rotation, is provided with an elastic layer formed of silicon rubber or the like in the periphery of a metal shaft 6, and this elastic layer is formed into a nip portion, being held in its contact under pressure with the heating roller 1 by loads applied to both the end portions of the shaft, which are not illustrated in the Figure. A fixing process is performed when a recording medium 5 with yet undeveloped toner images formed thereon is transported through this nip portion in the arrow mark direction indicated in the Figure. The recording medium 5 as used for the fixing device according to the present invention is a thin flat-shaped recording medium such as ordinary paper, overhead projector (OHP) film, envelopes, and postcards.

Further, an image forming apparatus is constructed not only with this fixing device but also with such various types of means for performing an electrostatic photographing process as a latent image carrier, a charging means, an exposing means, a developing means, a transferring means, a cleaning means, a recording medium transporting means, driving means and controlling means, and with cabinets and the like which support or enclose these various means.

Here, in order to reduce the period of time needed for causing the heating roller 1 to attain a rise in temperature up to a predetermined target temperature and to attain a state in which it is enabled to perform a fixing process, namely, the so-called warm-up time, it is effective to set up the heating roller 1 in a small heat capacity. For example, by setting the product of the diameter and the wall thickness at 15 mm$^2$ or less, it is possible to attain a warm-up time presenting no problem in its practical use. On the other hand, if the diameter is set too small and the wall thickness too thin, there occurs insufficiency in the rigidity of the heating roller 1 in the axial direction. As the result of this, the central portion of the heating roller 1 develops a deflection, as compared with its end portions, in the direction in which they move away from the pressurizing roller 2. Then, no sufficient nip is formed between the heating roller 1 and the pressurizing roller 2 in the central region, so that the fixing process is not performed to any sufficient extent. In order to avoid this, it is more effective to enlarge the diameter of the heating roller 1 than increasing the its wall thickness, and it is desirable to set the diameter to 12 mm or more.

2. Construction of Temperature Control Device

Figure 2:
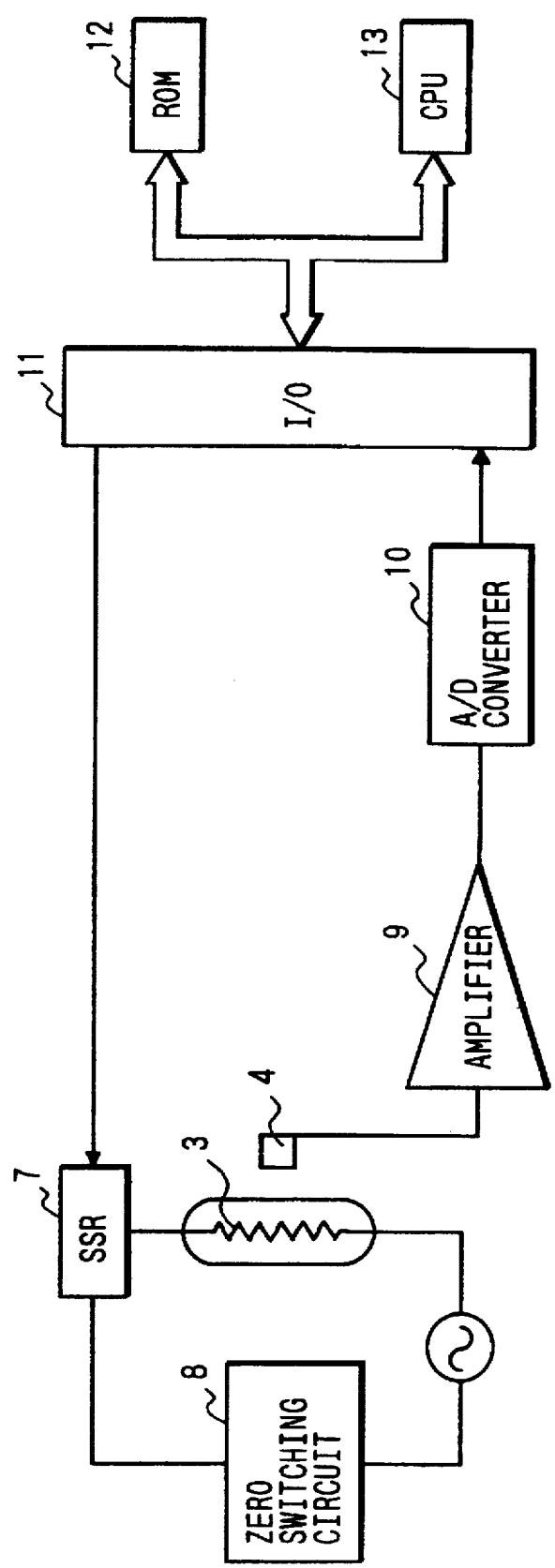
FIG. 2 is a block diagram illustrating a temperature control device in an example of embodiment of a fixing device according to the present invention.

FIG. 2 is a block diagram illustrating the construction of a temperature control device for controlling the temperature of the heating roller 1 which is used in an example of embodiment of a fixing device according to the present invention. An analog voltage signal, which is generated from a temperature sensor 4, which detects the temperature of the heating roller 1, will be amplified by an amplifier 9. Thereafter, this analog signal will be converted into digital signals at 256 levels by an analog-digital (A/D) converter 10 and will be thereafter put into an input-output (I/O) device 11. Then, the digital signals will be put into a Central Processing Unit (CPU) 13, which executes a temperature control program, at every predetermined sampling time. The temperature control program is stored in a ROM 12 and is read into the CPU 13 as required and executed by the CPU 13. In this regard, the term, "a predetermined sampling time," as used here means the second period as defined in the present invention, and a detailed description will be made of this term at a later time.

The control signal generated by the CPU 13 is transmitted to an SSR 7, which is a switch for turning the halogen lamp heater 3 ON and OFF. To the SSR 7, a signal synchronizing with the alternating current zero cross is transmitted also from a zero switching circuit 8. The SSR 7 will be turned ON if there is any control signal transmitted from the CPU 13 when it receives a signal from the zero switching circuit 8 but will be turned OFF if there is no such control signal. In this manner, the SSR 7 will be turned ON and OFF, taking one half wave of an alternating current as one unit, in its action in response to the control signal transmitted from the CPU 13, and electric power is conducted to the heater with the ON/OFF operations of the SSR 7. In order to operate this SSR 7 to turn ON and OFF in a half wave in an alternating current as the unit, it is also feasible to apply an interrupt to the CPU 13 with a signal from the zero switching circuit 8, thereby causing the CPU 13 to generate a control signal.

Figure 3:
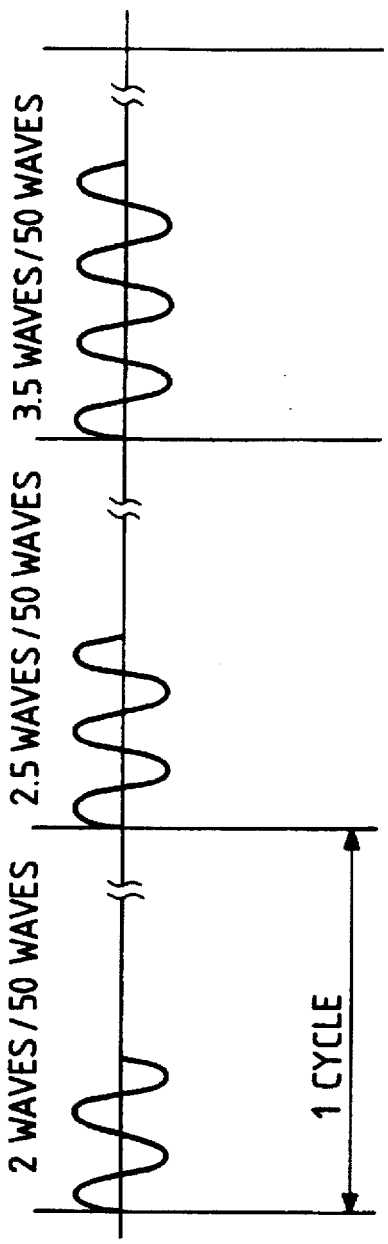
FIG. 3 is chart illustrating an example of a method for conducting electric power to a heater in an example of embodiment of the present invention.

An adjustment of the electric power applied to the halogen lamp heater 3 is made by increasing or decreasing the number of waves applied at certain predetermined intervals from the alternating current source, as illustrated in FIG. 3. For example, if a control operation is performed for an adjustment of the applied electric power by setting the number of waves at one second intervals, it will be possible to select an amount of applied electric power at 100 levels in case an alternating current power source at 50 Hz is to be employed. FIG. 3 shows an example in which the applied electric power is increased in every one cycle from two waves to 2.5 waves and to 3.5 waves with an alternating current power source at 50 Hz. At this time, the power applying duty is 4%, 5%, and 7%. The methods available for making an adjustment of the amount of the applied electric power using the number of waves of an alternating current power source include a method for conducting electric power continually for a given number of waves in this manner and a method for conducting electric power intermittently lest there should occur any fluctuation in the power source voltage to any other electrical appliances—above all, lighting apparatuses—which are connected to the same power source line, as described later.

3. Basic Operating Sequence of Fixing Device

Figure 4:
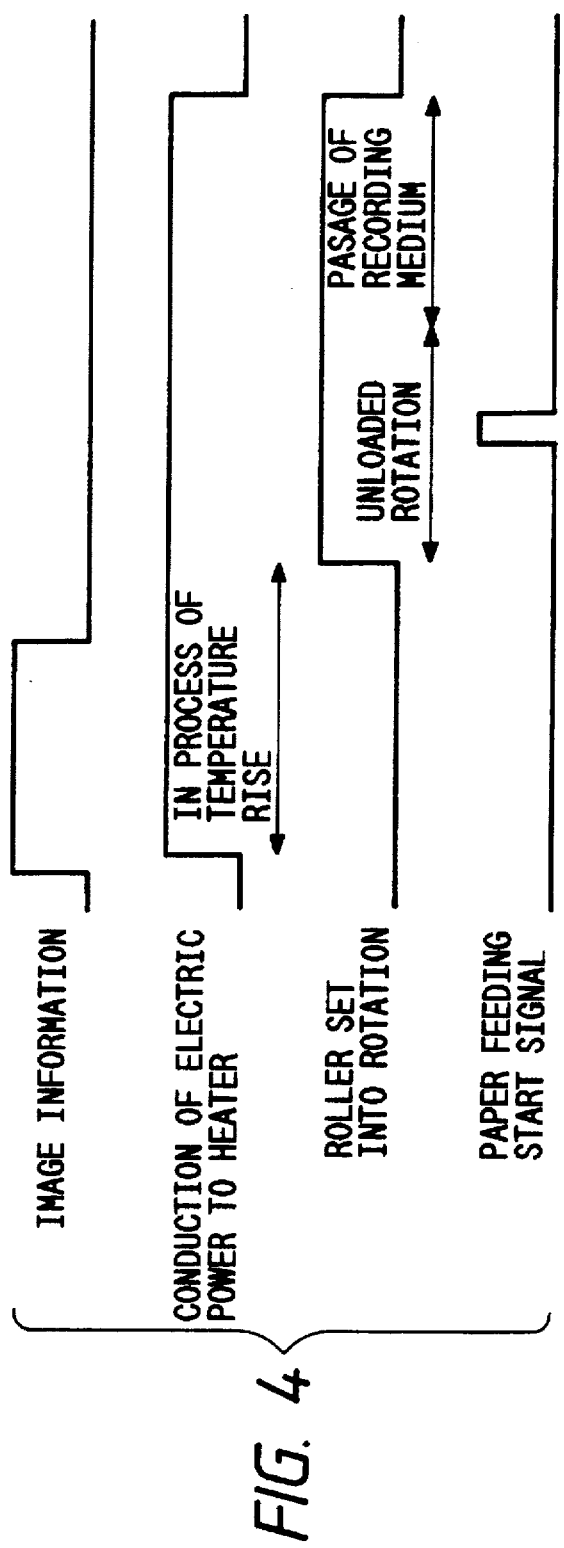
FIG. 4 is a timing chart illustrating the operating sequence in an example of embodiment of the present invention.

FIG. 4 is a timing chart illustrating the operating sequence of a fixing device in an example of embodiment of the present invention. First, print information (image information) is fed from an external equipment such as a computer, which is not illustrated in the Figure, into a controller which processes the image information for the printer. Then, the CPU 13, which controls the operations of the equipment, including the control of the temperature in the fixing device, puts out a power conduction start signal, so that the heating roller 1 can be heated up to a predetermined temperature at which it can perform a fixing operation (i.e., starts the conduction of electric power to the heater, which will then be in a process of attaining a rise in its temperature). After that, when it is judged on the basis of an output from the temperature sensor 4 that the heating roller 1 has attained a predetermined temperature at which the heating roller 1 is enabled to perform a fixing operation, the CPU 13 causes the heating roller 1 and the pressurizing roller 2 to be driven to start their rotation (unloaded rotation). In order to ensure that a state of favorable fixing can be attained, it is essential that not only the heating roller 1 has attained a predetermined fixing temperature, but also the pressurizing roller 2 has attained a rise in its temperature to a certain extent. The unloaded rotation time is set at a predetermined duration of time in the range from 10 seconds to several tens of seconds, so that the pressurizing roller 2 can attain a rise in its temperature during the period of time (i.e., the unloaded rotation time) from the start of the rotation of both the rollers to the start of the passage of a recording medium through the fixing device. On the basis of a paper feeding start signal, which is to be put out at a predetermined timing during the unloaded rotation, the feeding of a recording medium is started, the recording medium being thereafter passed through the fixing device. Then, at the same time as the completion of the passage of the recording medium through the fixing device, the driving of the rollers for their rotation and the conduction of electric power to the halogen lamp heater 3 will be stopped.

It is possible to achieve a power saving by conducting electric power only at the time of a printing operation (i.e., when any printing operation is being performed) as described above. In such a case, the warm-up time for the fixing device will be reflected directly on the time needed for the printing of the first single sheet (i.e., the first print out time), so it is required to reduce the warm-up time to as short a period as possible. This example of embodiment features a very small heat capacity of the heating roller 1 and a reduced warm-up time for it with a view to shorten the first print time.

The most critical problem to be encountered in case the heat capacity of the heating roller 1 is set at a small value in order to shorten the warm-up time is an increase of the temperature ripples. Now, a description is given below with respect to a highly accurate temperature control method yielding a very small amount of temperature ripple, which is a first characteristic feature of the present invention.

4. Correction of Detected Temperature

For the temperature ripple in a fixing device formed in the construction described above, delays in the responses of the various parts of the control system including a fixing device and a temperature control device are a main cause. If the control system is a system that does not have any element of delay at all, the control system stops the conduction of electric power to the halogen lamp heater 3 at the very moment when the temperature of the heating roller 1 has exceeded a predetermined control temperature, and the temperature of the heating roller 1 starts declining as from the moment, the heating roller 1 assuming a temperature lower than the control temperature after an instant has elapsed. Then, the control system starts conducting electric power again to the halogen lamp heater 3, and the temperature of the heating roller 1 soon reaches the control temperature. In this manner, the heating roller 1 repeats a temperature rise and a temperature fall bit by bit in the proximity of the predetermined temperature with the result that only a very minute temperature ripple occurs. However, since there are actually several delay elements in the control system, temperature ripples occur.

According to what the present inventors have revealed through experiments and the like, the delay elements in the control system include a time delay from the start of the conduction of electric power to the time when the halogen lamp heater 3 generates radiant heat, a time delay from the time when the inner surface of the heating roller 1 to the time when the temperature on its surface attains a rise, a time delay from the time when the temperature on the surface of the heating roller 1 has risen to the time when the temperature detected by the temperature sensor 4 attains a rise, and a time delay from the time when the temperature detected by the temperature sensor 4 has attained a rise to the time when the control system starts conducting electric power to the halogen lamp heater 3 and also that the delay in the detection by the temperature sensor 4 is the most predominant one among these various delay elements.

Figure 5:
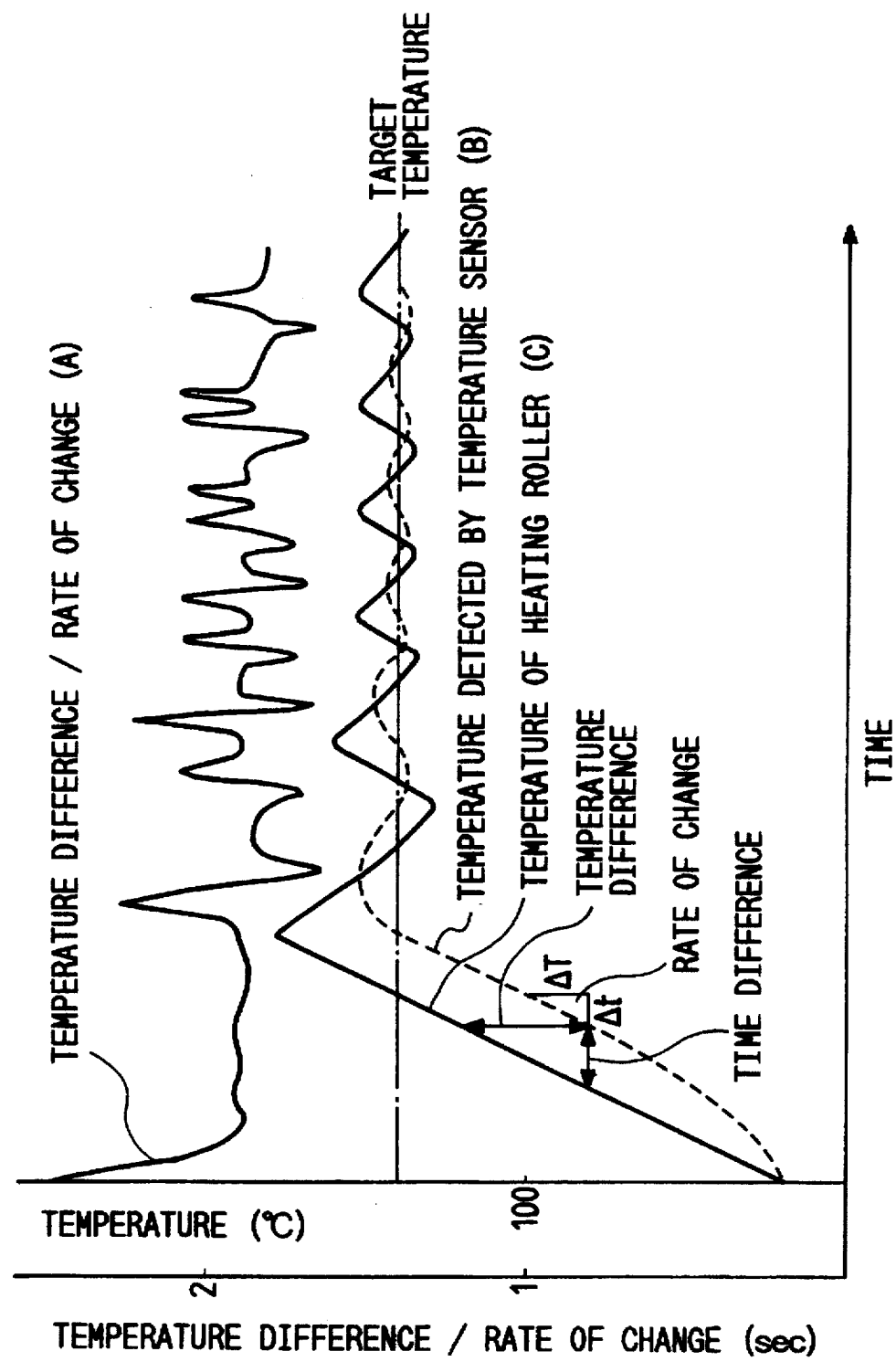
FIG. 5 is a chart illustrating the principle of the temperature control method according to the present invention.

Therefore, the present inventors have conducted some experiments under various conditions selected from the ambient temperature in an image forming apparatus, the image forming jobs performed in the past, and so forth in order to determine the relationnship between the temperature detected by the temperature sensor 4 and the actual temperature of the heating roller 1. As the result of those experiments, it has been found that the ratio of the difference between the temperature detected by the temperature sensor 4 and the actual temperature on the surface of the heating roller 1 to rate of change in the temperature detected by the temperature sensor 4 are in the proximity of certain constant values without showing any notable change. FIG. 5 is a graph showing a typical example which illustrates the state of these factors, and this Figure presents a graph showing (A) the ratio of the difference in temperature between the temperature of the heating roller 1 and the temperature detected by the temperature sensor 4 to the rate of change in the temperature detected by the temperature sensor 4, (B) the temperature of the temperature sensor 4, and (C) the temperature of the heating roller 1. As just mentioned, the ratio of the temperature difference to the rate of change (A) assumes an almost constant value. This is supported by the thermodynamic law that the quantity of heat exchanged between two objects (namely, the temperature sensor 4 and the heating roller 1) is in proportion to the temperature difference between them and that the quantity of heat exchanged between them is in proportion to their rate of change in temperature. That is to say, the following equation holds valid:

$$\lambda \cdot (T_R - T_S) = C_S \cdot dT_S/dT \tag{1}$$

wherein, the heat transfer coefficient from the heating roller 1 to the temperature sensor 4 is expressed by $\lambda$, the temperature of the heating roller 1 is expressed by $T_R$, the temperature of the temperature sensor 4 is expressed by $T_S$, the heat capacity of the temperature sensor 4 is expressed by $C_S$, and the rate of change in the temperature of the temperature sensor 4 is expressed as $dT_S/dt$. Here, $C_S/\lambda$ is a time constant $\tau$ for the temperature sensor 4.

According to the present invention, such control deviations as a temperature ripple, which is caused to occur by a delay in a detection by the temperature sensor 4, is eliminated by estimating the actual temperature of the heating roller 1 through a correction of the temperature detected of the temperature sensor 4 on the basis of the delay characteristics which are revealed of the temperature sensor 4 in the manner described above.

An estimate of the temperature of the heating roller 1 can be made by adding the product of the rate of change in the detected temperature of the temperature sensor 4 and a predetermined constant to the particular detected temperature. That is to say, such a correction is to be made in accordance with the following equation:

$$T_C = T_S + c \cdot \Delta T_S / \Delta t \qquad (2)$$

wherein, the temperature after its correction is expressed by $T_C$, the temperature detected by the temperature detecting means is expressed as $T_S$, the rate of change in the temperature detected by the temperature detecting means is expressed by $\Delta T_S / \Delta t$, and the correction constant is expressed by c. The equation (2) will be identical with the equation (1), provided that the value of the correction constant c is made equal to the value of the time constant τ for the temperature sensor 4, and then the equation (2) will completely cancel a delay in a detection by the temperature sensor 4. Yet, as mentioned later, an adequate value of the correction constant c appropriate for a practical use will not necessarily be equal to the value of the time constant τ.

In this regard, the graph presented in FIG. 5 which shows the ratio of the temperature difference to the rate of change (A) includes a portion of fluctuation from a certain constant value. Accordingly, it will be possible also to make a correction at a higher order of accuracy by using more complex functions than those in the equation (2) in case it is necessary to perform control with extremely high accuracy or in case there is a margin of surplus in the processing capacity of the CPU which performs the temperature control operations expressed in the equation (2). For example, when the heat transfer from the temperature sensor 4 to the other parts is to be taken into consideration, it will be feasible to make a correction with a member expressing a secondary time differential of the detected temperature $T_S$ further added to the equation.

In order to obtain the time constant τ for the temperature sensor 4, it is proper to use the results of a measurement of the actual temperature rise curve (C) of the heating roller 1 and a measurement of the detected temperature rise curve (B) of the temperature sensor 4 as at the time when the warm-up operation is performed for the fixing device in the manner shown in FIG. 5. Then, as shown by Δ t and Δ T in FIG. 5, it is possible to read the difference in time when the two curves arrive at the same temperature after they have become almost parallel. In order to measure the actual temperature of the heating roller 1, it is desirable to employ a temperature measuring instrument, such as a thermocouple or an infrared thermometer, which gives a response at a sufficiently high speed.

Figure 6:
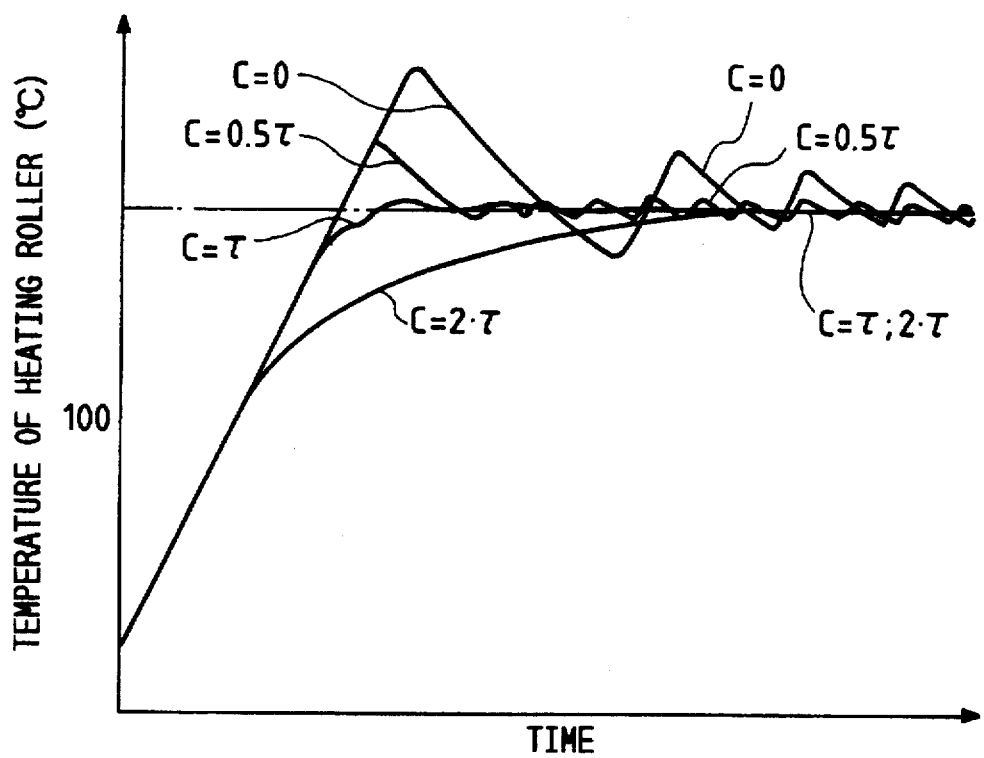
FIG. 6 is a chart illustrating the differences of temperature fluctuations on the heating roller by the effect of a correction constant c.

A value of the correction constant c which is appropriate for the practical use of a fixing device is to be determined desirably based on the operating characteristics and required characteristics of the particular fixing device. It is thereby made possible to make an effective correction. First, FIG. 6 illustrates the states of the fluctuations found in the temperature of the heating roller 1 when the operations from the start of the warm-up operation to the completion of the passage of the recording medium through the fixing device have been performed with changes made in the degree of correction. The degree of correction is expressed by the correction factor k in the following equation, which expresses a delay in the detection by the temperature sensor 4, and is written as:

$$T_C = T_S + k \cdot \tau \cdot \Delta T_S / \Delta t \qquad (3)$$

FIG. 6 shows the fluctuations in the temperature of the heating roller 1 for those cases in which the correction factor k is 0, 0.5, and 1.2, respectively (i.e., those cases in which the correction constant c is 0, 0.5 τ, τ, and 2 τ, respectively). In case the correction factor k is any smaller than 1, there occurs an insufficient correction, and there occurs an overshoot, for which the cause is found in a delay in a temperature detection by the temperature sensor 4, and yet the overshoot is reduced as compared with a case in which no correction is made. In case the correction factor k is larger than 1, there occurs an excess in the correction, so that the control system reduces the electric power supplied to the heating roller 1, judging that the heating roller 1 has attained the target temperature, even at a time before the temperature of the heating roller 1 has actually attained the target temperature. For this reason, the rise in the temperature of the heating roller 1 becomes dull immediately before the completion of the temperature rise, and there is a tendency that an increase begins to occur in the duration of time from the start of the conduction of electric power to the attainment of the target temperature by the heating roller 1. In this figure, also in a case in which the correction factor k is 1, there occurs a slight retardation immediately before the completion of a warm-up operation, but this is due to the action of a proportional control process, which, as described later, works to reduce the supplied electric power when the actual temperature has come to a point proximate to the target temperature. Now that the temperature ripple has been reduced by a proportional control process, it is in a sufficiently small value except in a case in which no correction has been made.

Figure 7:
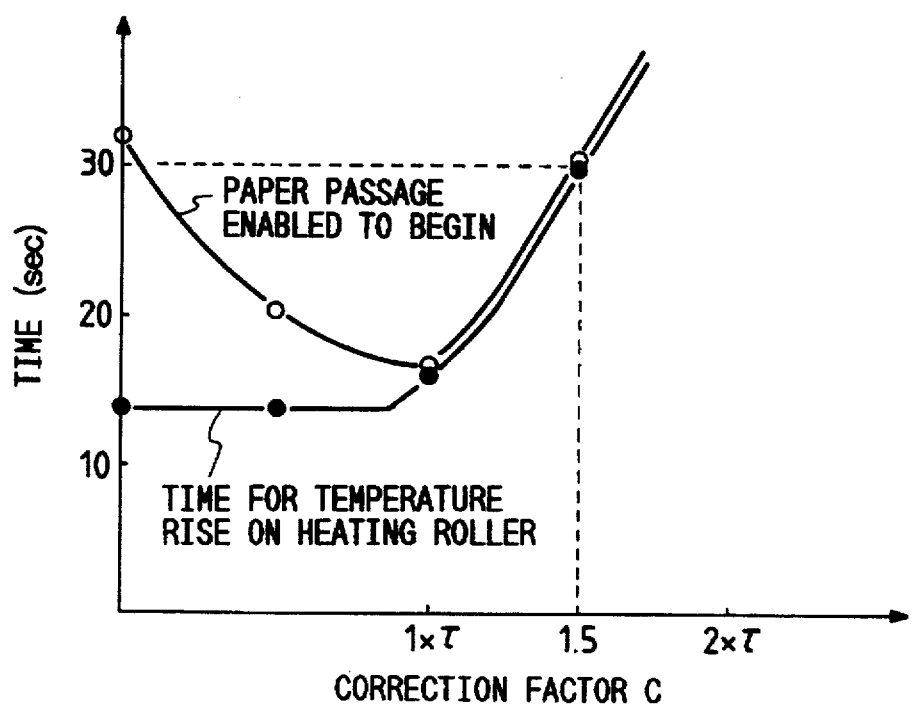
FIG. 7 is a chart illustrating the manner how a correction constant is to be selected for the temperature control method according to the present invention.

FIG. 7 is a graph illustrating the relationship between the correction constant c (the correction factor k×time constant τ) and the paper feeding start enable time and the temperature rise time until the heating roller 1 attains the target temperature. In this regard, the paper feeding start enable time means the duration of time from the start of the conduction of electric power to the heating roller 1 to the time when the temperature of the heating roller 1 is stabilized after the completion of an overshoot. As it is clearly observed in the graph given in FIG. 7, the temperature rise time for the heating roller 1 begins to be longer than the paper feeding start time in a case in which no correction is made, once the correction factor k begins to exceed 1.5. In consequence of this, the effect of a correction will be reduced when it is seen from the viewpoint of a reduction of the warm-up time. At the side where the correction factor k is smaller than that, a correction has the effect of reducing the warm-up time to a duration shorter than in the case in which no correction is made, so long as the correction factor assumes any positive value.

Moreover, the time constant for the temperature sensor 4 has variances due to the manufacture of individual sensors and variances resulting from the pressing force of contact and the position for their contact with the heating roller under the pressing force applied to them. Therefore, if the correction constant c is set in a value equal to the design value of the time constant τ, there will be some cases in which the correction constant c becomes larger than the time constant τ in consequence of such a variance, so that there occurs an excessive correction, which brings about an increase of the warm-up time. Also from this standpoint, it is desirable to keep the correction factor k at 1.5 or less.

Now, as described with reference to FIG. 4, the fixing device in this example of embodiment of the present invention has an operating sequence in which the fixing device starts the rotating operation of the heating roller 1 after it has attained a certain predetermined temperature and the paper feeding operation is started after a predetermined period of time subsequent to the start of the rotating operation. In such a case like this, the recording medium 5 does not pass through the fixing device for a certain duration of time after the heating roller temperature once attains a predetermined temperature. Therefore, the temperature of the heating roller 1 may have fluctuations by reason of an overshoot or the like in such a period. That is to say, it will be effective for a reduction of a warm-up time to make the heating roller 1 attain the predetermined temperature as promptly as possible even if there occurs some overshoot. In such a case, therefore, it is desirable to set the correction factor k at 1 or less as already described with reference to FIG. 6.

Moreover, it is evident from FIG. 6 that a correction of a delay of the temperature sensor 4 produces a remarkable effect for a reduction of overshoots. From the viewpoint of a reduction of overshoots, the correction factor k will be effective if it is set at 0 or more and will produce a remarkable effect if it is set at 0.3 or more.

As viewed from a comprehensive observation of the points mentioned above, the correction factor k is effective when it is in the range, $0 < k \leq 1.5$, and will produce a remarkable effect when it is in the range, $0.3 \leq k \leq 1$.

Further, in case it is desired to keep the amount of the overshoot within a predetermined range in consideration of such issues as the safety of the device, the conditions may be set up by taking into consideration not only the correction factor k but also the value of the time constant $\tau$ of the temperature sensor 4. Specifically, as the amount of the overshoot depends on the gradient of the temperature rise on the heating roller 1 at the time of a warm-up operation, the overshoot can be held down to approximately $T_o$ or less if the gradient of temperature, which is expressed by $\Delta T_c/\Delta t$, is set up in the range expressed by the following equation, using the correction factor k and the time constant $\tau$:

$$\Delta T_c/\Delta t \cdot (1-k) \cdot \tau > T_o \quad (4)$$

The left side of the equation (4) means the difference between the actual temperature of the heating roller 1 and the corrected temperature of the temperature detected of the temperature sensor 4 at the time of an warm-up operation in case the temperature of the heating roller 1 and that of the temperature sensor 4 are in accordance with the equation (1). For the value of $T_o$, approximately 5° C. or more will be appropriate in view of the condition that no retardation is to occur at the time of the completion of the warm-up operation while 30° C. or less will be appropriate from the viewpoint of the safety, etc., of the device.

5. Calculation of Amount of Applied Electric Power 5-1 Method of Calculation of Amount of Applied Electric Power Next, a description will be made of the method for performing a feedback control for the amount of applied electric power on the basis of the temperature as corrected by the method described above. The method for control described below sets up the value obtained by adding a certain constant to a value determined by a proportional control process as an amount of applied electric power, and this control process is called proportional control with offset. That is to say, this control process determines the amount of applied electric power in accordance with the following equation:

$$P = G \cdot (T^* - T_C) + P_C \quad (5)$$

wherein, the electric power applied to the halogen lamp heater 3 is expressed by P, the target temperature is expressed by $T^*$, the gain is expressed by G, and the offset electric power is expressed by $P_C$. This control process can reduce the fluctuations in the amount of applied electric power by the conduction and non-conduction of electric power by the effect of the performance of proportional control, this control process is effective for a reduction of a temperature ripple. Further, with the addition of offset electric power, this control process can reduce a constant deviation of the temperature.

In the calculations conducted with the equations (3) and (5), the target temperature $T^*$, the detected temperature $T_S$, the corrected value $T_C$ of the detected temperature, and so forth are actually in digital values at 256 levels as subjected to analog-digital conversion, and the applied electric power is obtained by integral arithmetic operation in the CPU.

Figure 8:
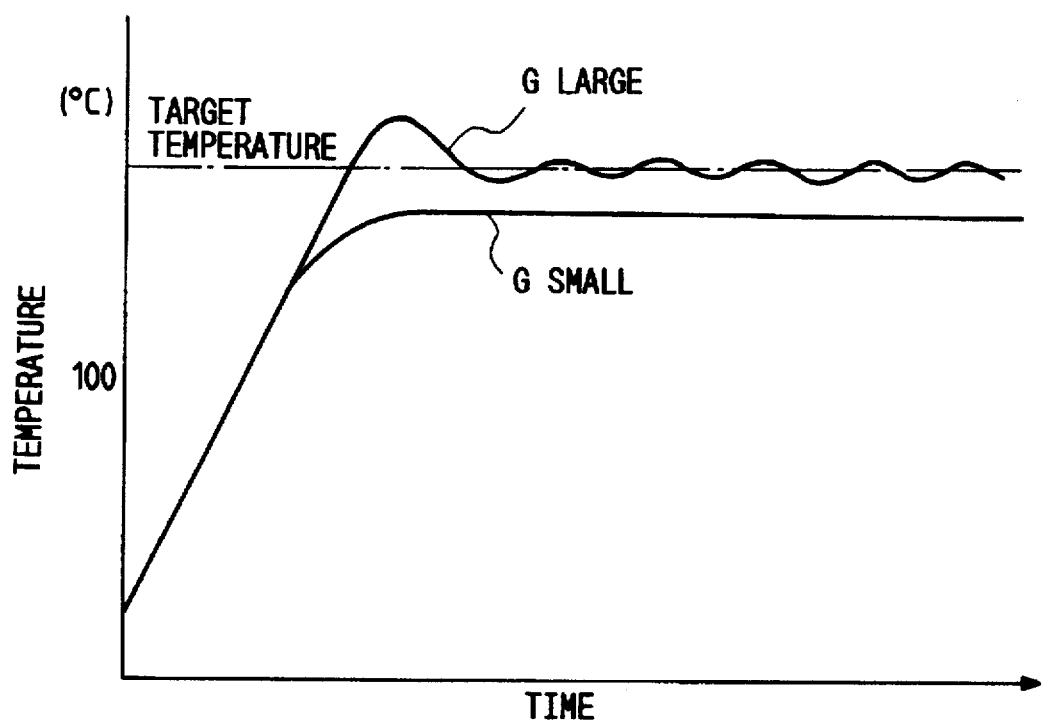
FIG. 8 is a chart illustrating the differences of temperature fluctuations on the heating roller by the effect of the gain G.

FIG. 8 illustrates the states of the fluctuations in the temperature on the heating roller in a case with a large gain G and in another case with a small gain G. If the gain G is too large, there is a tendency that there occurs an excessive reaction in case there appears a deviation from the target temperature, so that the temperature ripple grows large, but, if the gain G is too small, there is a tendency that a constant deviation occurs as the recovering force becomes small when there appears any deviation from the target temperature. An experiment conducted under the conditions presented in Table 1 has revealed results verifying that both the temperature ripple and the constant deviation will be kept within the range from 1 degree to 10 degrees if the gain G is larger than 10 (W/°C.) but smaller than 100 (W/°C.).

5-2. Method of Finding Offset Electric Power

Figure 9:
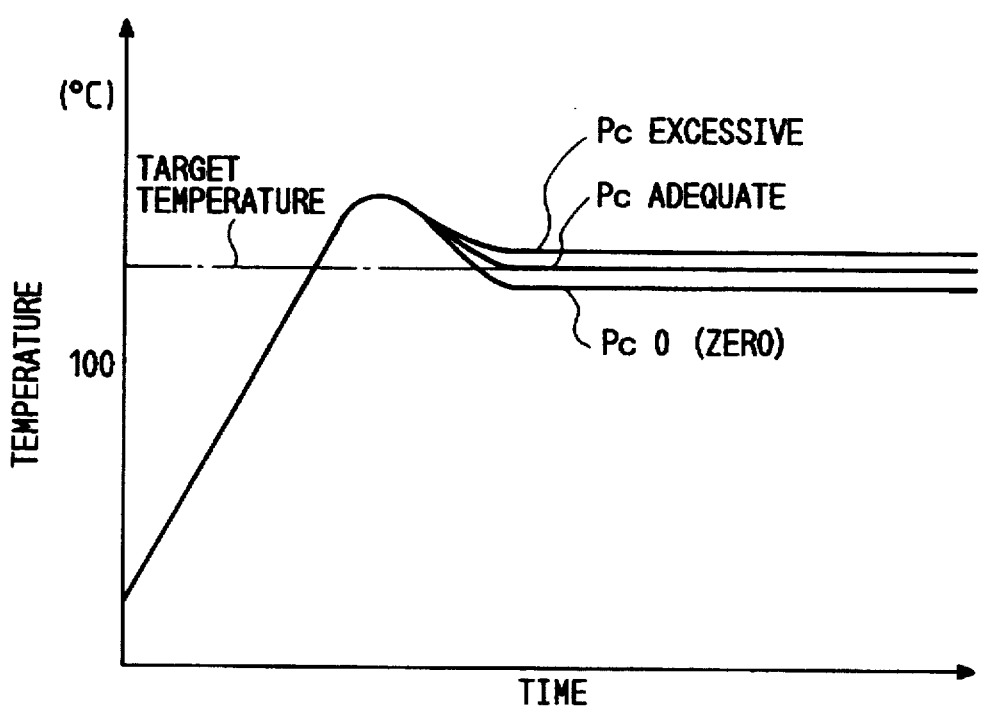
FIG. 9 is a chart illustrating the differences of temperature fluctuations on the heating roller by the effect of offset electric power $P_c$.

FIG. 9 is a chart illustrating an appropriate way how the offset electric power $P_C$ is to be selected. As shown in FIG. 9, the negative constant deviation decreases by the effect of giving offset electric power while a positive constant deviation appears when offset electric power is given in any excess. In the following part, a description will be made of the manner how the offset electric power $P_C$ is to be obtained, with reference to an example of an experiment conducted under the conditions given in Table 1.

TABLE 1

| Heating roller | |
|---|---|
| Material | Aluminum |
| Diameter | 18 mm |
| Thickness | 0.6 mm |
| Pressurizing roller | |
| Rubber material | Silicone rubber |
| Hardness | 24 degrees (JIS-A) |
| Rubber thickness | 4 mm |
| Diameter | 18 mm |
| Roller pressurizing force | 5 kg |
| pressurizing width | 230 mm |
| Paper passage velocity v | 15 to 150 mm/sec. |
| Ambient environment | 10 to 35° C. |
| | 20 to 85% RH |
| Initial-phase temperature of pressurizing roller | 10 to 100° C. |
| Paper type | 60 to 90 g/m² |
| Offset electric power | |
| Non-passage of paper | 0 to 70 W |
| Passage of former half of paper | 0 to 100 W |
| Passage of latter half of paper | 0 to 120 W |

The constant deviation is least when the offset electric power $P_C$ and the quantity of heat of which the heating roller 1 is deprived of are equal in value. However, as the quantity of heat of which the heating roller 1 is deprived will be in fluctuation, depending on the ambient temperature of the image forming apparatus, the atmospheric temperature, the temperature of the pressurizing roller 2, the heat capacity of the recording medium 5, and so forth, it is desirable to set the offset electric power with reference to the median value accounting for all those various types of fluctuations. Since the quantity of heat of which the heating roller 1 is deprived is in proportion to the paper passage velocity and the paper passage width for the recording medium, it is appropriate to describe a proper value of the offset electric power by using the values normalized by the paper passage velocity v (mm/sec) and the paper passage width L (mm), i.e., $P_C/(v \cdot L)$ and $(W \cdot sec/mm^2)$.

Under the conditions shown in Table 1, it has been found possible to maintain a favorable state of fixing even in a state in which the ambient temperature in the image forming apparatus and the atmospheric temperature are at low temperatures, with the pressurizing roller 2 being in a cold state, provided that the value of $P_C/(v \cdot L)$ is 0.0025 or more and it has also been found that no overheated state, such as wrinkles on paper, is caused to occur even at a time when the ambient temperature in the image forming apparatus and the atmospheric temperature are at high temperatures, with the pressurizing roller 2 remaining warm as the result of the printing history, etc., up to the preceding operation, in case the value of $P_C/(v \cdot L)$ is 0.025 or less.

Now, the fluctuations in the ambient temperature in the image forming apparatus, in the atmospheric temperature, and in the temperature of the pressurizing roller 2 occur gradually, but the fluctuations due to the passage of the recording medium occurs suddenly, so that such sudden fluctuations may cause a temperature ripple. However, the timing for the passage of paper is known in advance, and it is therefore possible to increase the offset electric power by $\Delta P_C$ to a total of $P_{C2}$ ($P_{C2}=P_C+\Delta P_C$) in order to cancel off the quantity of deprived heat in adjustment for the passage of the paper. This correction is to be set desirably to the median value for the range of the quantities of heat deprived by various types of recording media to be used. The quantity of heat of which the heating roller 1 is deprived is in proportion to the paper passage velocity and the paper passage width of the recording medium 5, the offset electric power being therefore normalized with the paper passage velocity v (mm/sec) and the paper passage width L (mm), and then it has been ascertained by an experiment conducted under the conditions given in Table 1 that it is desirable to set the value of $\Delta P_C/(v \cdot L)$ in the range from 0.0015 to 0.015 $(W \cdot sec/mm^2)$. With the offset electric power at 0.0015 or more, a favorable state of fixing can be maintained even when the recording medium 5 maintains a large heat capacity and the fixing device is under a low temperature, and, with the offset electric power at 0.015 or less, the fixing device does not cause any overheated state, such as paper wrinkles even when the recording medium has a small heat capacity and the fixing device was under a high temperature.

However, even in case the temperature of the heating roller 1 is maintained in a stable state in this manner at the time when the recording medium 5 is passed through the fixing device, the state of fixing becomes worse according as the latter half portion of the recording medium 5 is passed. This deteriorated fixing performance occurs since the recording medium 5 not only deprives the heating roller 1 of heat but also deprives the pressurizing roller 2 of heat, so that there occurs a decline in the temperature on the surface of the temperature sensor 4. In that case, the pressurizing roller 2, unlike the heating roller 1, is steadily deprived of heat while the paper is being passed through the fixing device, so that the temperature of the pressurizing roller 2 cannot be restored until the passage of the paper is finished.

It follows, therefore, that it is effective to keep the temperature of the heating roller 1 at a high temperature with extra heat being added to the heating roller 1 in a progressively increasing amount, in order to compensate for a decline in the temperature of the pressurizing roller 2, according as the recording medium 5 is moved forward for the fixing of its latter half portion. In order to realize this application of additional heat in an actual temperature control operation, it is permissible to employ either one of the two available methods, one being a method comprising a step for raising the target temperature T* progressively for the latter half portion of the passage of the paper and the other being a method comprising a step for setting the offset electric power $P_C$ in a progressively increasing value for the latter half portion of the paper passage. An experiment conducted under the conditions given in Table 1 has revealed that it is appropriate for the former of these methods that the target temperature is raised by a range approximately from 1° C. to 5° C. and that it is appropriate for the latter of these methods that the offset electric power is increased by $\Delta P_{C2}$ to make it $P_{C3}$ ($P_{C2}=P_{C2}+\text{delta } P_{C2}$), which, being normalized by the paper passage velocity v (mm/sec) and the paper passage width (mm), gives a range from 0.001 to 0.01 $(W \cdot sec/mm)$ for $\Delta P_{C2}/(v \cdot L)$. At 0.001 or more, a favorable state of fixing can be maintained even at a time when the heat capacity of the recording medium 5 is large and the fixing device is at a low temperature, and, at 0.01 or less, the fixing device does not cause any overheated state, such as paper wrinkles, even when the heat capacity of the recording medium 5 is small and the fixing device is at a high temperature.

5-3. Flow Chart for Calculation of Amount of Applied Electric Power

Figure 10:
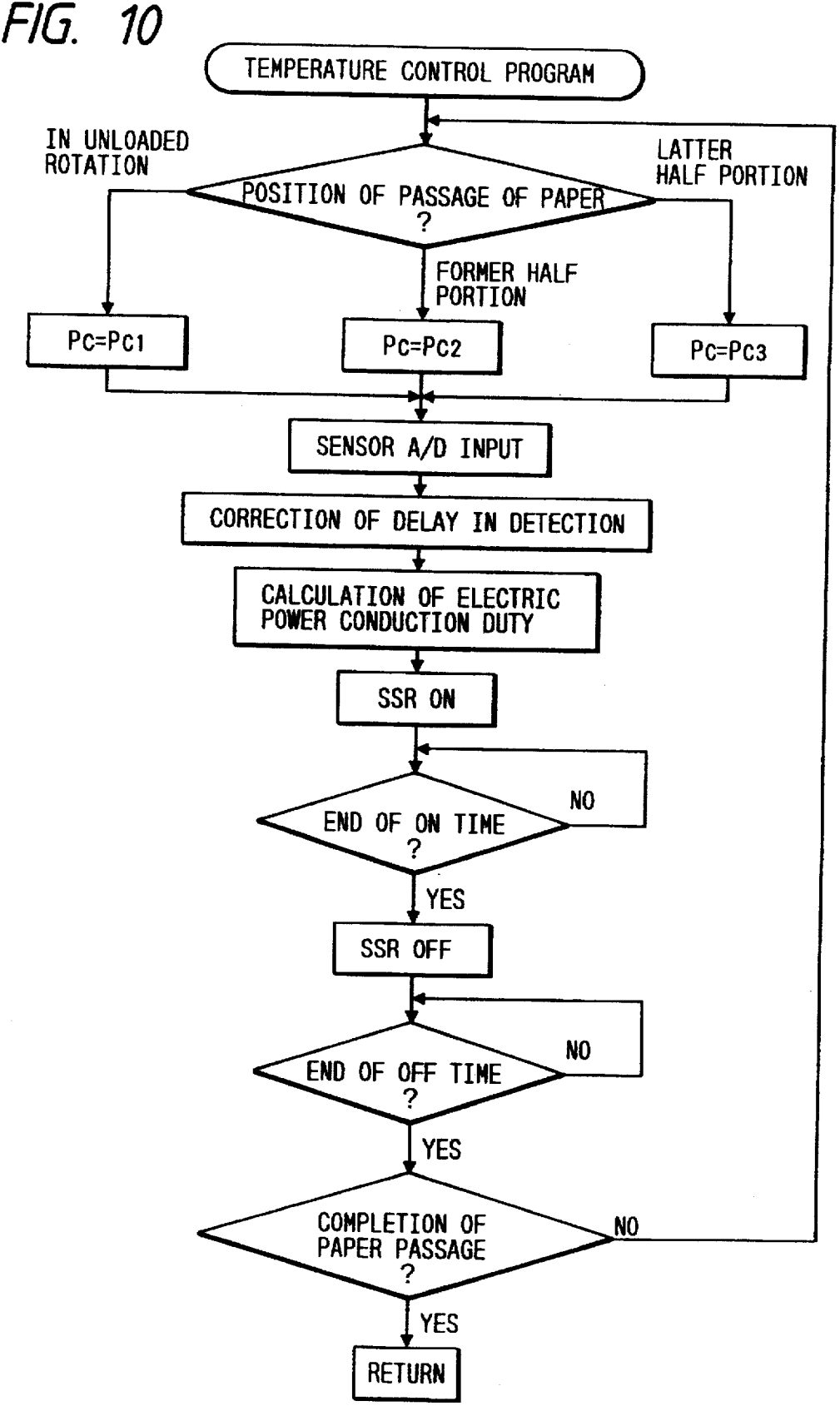
FIG. 10 is a flow chart illustrating the temperature control in an example of embodiment using the offset electric power $P_C$ and the temperature sensor delay correction.

In this example of embodiment, the above-mentioned temperature control method is realized by digital control by a CPU, and FIG. 10 shows a flow chart illustrating the control sequence. First, it is judged whether the fixing device is in a state with no recording medium present in it or whether the recording medium in the fixing device is in its former half part or in its latter half part in the process of its passage through the fixing device. This point can be judged on the basis of the count value on the timer indicating the state of transport of the recording medium in the entire apparatus. Depending on the state thus judged, the offset electric power is to be set in any of the values, $P_{C1}$, $P_{C2}$, and $P_{C3}$, as determined by the setting method described above. Next, the A/D conversion value of the signal from the temperature sensor is fed into the CPU, which processes this value in performance of a calculation for a correction of the delay and a calculation for a proportional control with an offset. These calculations may be performed separately, but the burden which is placed on the CPU in its performance of the processing operations will be reduced if the arithmetic equations for these arithmetic operations are combined into a single arithmetic equation. On the basis of the results of these arithmetic operations, the electric power conduction duty within a single cycle, namely, the on-time (the number of on-waves) and the off-time (the number of off-waves) are determined, and, with the respective timers set accordingly, the signals are kept ON or OFF to the SSR for the respective times.

The arithmetic operations for a correction of a delay can be performed with a value obtained by digitalizing the equation (2), and the arithmetic operations for a proportional control with an offset can be performed with a value obtained by digitalizing the equation (4). Since the CPU performs an arithmetic operation for finding a product only once, and merely performs adding and subtracting arithmetic operations several times, for finding each of these calculations, only a small portion of the time for the processing operations by the CPU, which controls the whole apparatus, is to be allocated to the processing operations for the temperature control processes.

5-4. Examples of Experiments

[Example 1 of Experiment]

Table 2 given below presents the specifications of the fixing device used in this example of embodiment of the present invention:

TABLE 2

| Heating roller | |
|---|---|
| Material | Aluminum |
| Diameter | 18 mm |
| Thickness | 0.6 mm |
| Pressurizing roller | |
| Rubber material | Silicone rubber |
| Hardness | 24 degrees (JIS-A) |
| Rubber thickness | 4 mm |
| Diameter | 18 mm |
| Roller pressurizing force | 5 kg |
| pressurizing width | 230 mm |
| Paper passage velocity v | 20 mm/sec. |
| Halogen lamp power | 500 W |
| Temperature sensor | |
| Sensing element | Thermistor |
| Time constant τ | 2 sec. |
| Analog-digital conversion levels | 256 levels |
| Temperature resolution for analog-digital conversion | 0.5 degree/level |
| Control cycle | 1 sec. |
| Delay correction factor k | 0.5 |
| Proportional control gain G | 30 W/°C. |
| Offset electric power | |
| Non-passage of paper | 30 W |
| Passage of former half of paper | 45 W |
| Passage of latter half of paper | 55 W |

As the result of temperature control operations performed in accordance with the specifications and the sequence given in Table 2, it has been made possible to realize a fixing device which is capable of attaining a warm-up time of 15 seconds for the heating roller 1, a temperature ripple at ±1° C., and the maximum constant deviation at ±1.5° C. and thus performing a fixing operation in a stable manner with a very small temperature deviation in spite of the fact that the warm-up time is extremely short, and it has thus been verified that the fixing device can attain a favorable state of fixing under the various conditions such as the ambient temperature in an image forming apparatus and the image forming jobs performed in the past.

The example of embodiment given above describes an example in which a proportional control process with an offset is performed by using a temperature $T_C$ which is obtained by a correction made of a delay in a detection by the temperature sensor 4 as expressed in the equation (5) or as shown in the flow chart given in FIG. 10, and yet it has been ascertained that either of the proportional control process with an offset and a temperature detection delay correction control process can produce a remarkable effect in the elimination of a temperature ripple and in the removal of a constant deviation even if it is employed independently, i.e., even if both of these are not combined. Thus, either one of these control processes may be employed in a manner suitable for the processing capacity of the CPU or for the characteristics of the device to which the control process is to be applied.

6. Method of Supplying (Applying) Electric Power 6-1. Sampling Period and Power Supplying Pattern Next, a description will be made of the method of supplying (applying) electric power, which forms a second characteristic feature of the present invention. What is to be described first is a method for setting up an electric power quantity determining period in order to determine the quantity of electric power to be supplied to the heating means and for adequately supplying electric power to the heating means within the period thus set up. Then, at this point in particular, a detailed description will be made of such terms as the first period, the second period, the first phase, and the second phase and also of the manner how these periods and phases are utilized for the supply of electric power.

Figure 11:
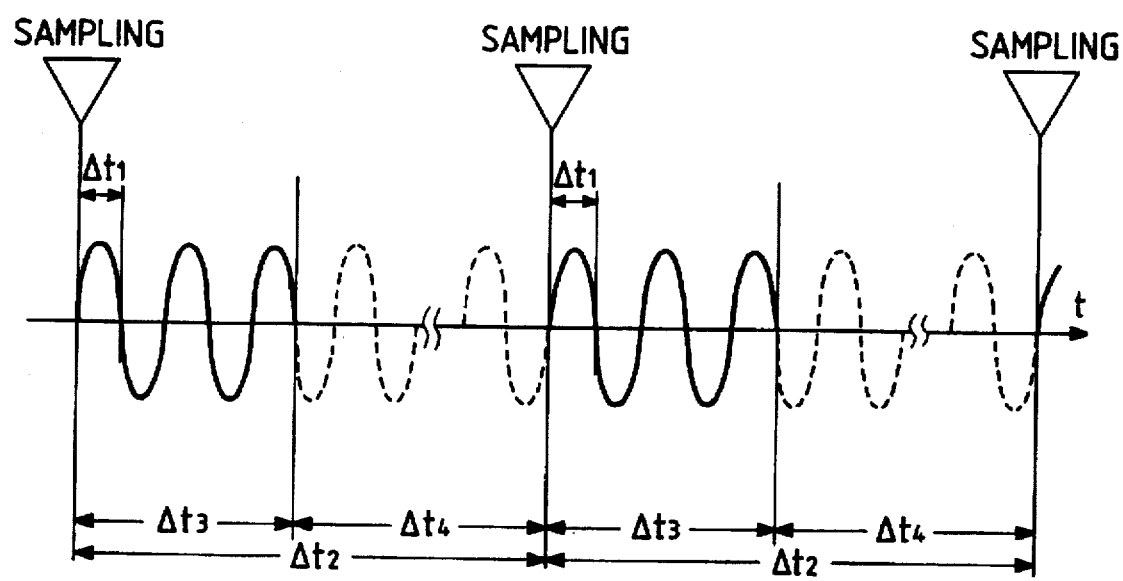
FIG. 11 is a chart illustrating the first period and the second period, as well as the first phase and the second phase, of the temperature control method according to the present invention.

FIG. 11 is a chart illustrating an example of the method for supplying electric power in the temperature control process according to the present invention. This Figure shows the voltage of the electric power supplied to the halogen lamp heater 3 on the vertical axis and shows the time t on the horizontal axis. First, the temperature control system samples the temperature. $T_S$ detected by the temperature sensor 4, which is brought into its contact with the heating roller 1, for each of the second period $\Delta t_2$, and the CPU 13 determines the quantity of electric power to be supplied (which is to be hereinafter referred to as "the duty") on the basis of the detected temperature $T_S$ as thus sampled. In other words, feedback control is performed with the second period $\Delta t_2$ as one unit. The second period $\Delta t_2$ is divided into two parts, i.e., the first phase $\Delta t_3$, in which it is permitted to supply electric power, and the second phase $\Delta t_4$, in which it is not permitted to supply any electric power. In the first phase $\Delta t_3$, an electric power conducting operation is performed in a unit of a first period $\Delta t_1$ (which, in this example, is a half-cycle period of an alternating current wave from a commercial AC power source) shorter than the second period $\Delta t_2$.

In order to control the temperature with a high degree of accuracy, it is desirable to perform feedback control with the second period $\Delta t_2$ set at approximately three seconds or less, i.e., at a frequency not less than approximately ⅓ Hz, and to make frequent changes of the duty. On the other hand, a second period $\Delta t_2$ set in too short a duration will cause a reduction of the number of waves which are in the form of a half wave in an alternating current and can be put into one second period $\Delta t_2$, with the result that it becomes impossible to divide the levels of the duty (i.e., the quantity of electric power to be supplied) into finer parts. It is therefore desirable to set up the second period $\Delta t_2$ in a duration not less than approximately 0.2 sec, i.e., 5 Hz or less.

Further, the shorter the first period $\Delta t_1$ is in comparison with the second period $\Delta t_2$, the more finely the levels of the supplied quantity of electric power can be divided. Therefore, it will then be possible to perform temperature control with a higher degree of accuracy. Usually, it is desirable that the first period $\Delta t_1$ is one fifth or less in comparison with the second period $\Delta t_2$. Further, if the first period $\Delta t_1$ is one fiftieth or less in comparison with the second period $\Delta t_2$, it is possible to perform temperature control with a still higher degree of accuracy. In this regard, it is proper to state that the first period $\Delta t_1$ can theoretically be shortened to an extreme limit. However, it is natural that a certain limit is imposed on the length of the first period by such hardware conditions as the response velocity of the actually used control circuit element (for example, a halogen lamp heater 3). Further, even if the first period $\Delta t_1$ is set in too short a period, the reduced length of the period will not render any significant contribution toward attaining any higher accuracy in an actual temperature control process. The lower limit value of the first period $\Delta t_1$ which usually produces any effect is approximately $1/5000$ in comparison with the second period $\Delta t_2$.

Even in the desirable range of the first period $\Delta t_1$ described above, it is more desirable that the first period $\Delta t_1$ assumes a period in proportion to one half cycle of an alternating current wave supplied to the halogen lamp heater 3, as used for the first period $\Delta t_1$ in the example of embodiment of the present invention. The reason for this is that such a period makes it possible to attain relatively greater ease in obtaining a zero cross signal which is in its synchronization with the half cycle of the alternating current wave. Moreover, by using this zero cross signal as a reference signal for the formation of one unit for the quantity of electric power to be supplied to the halogen lamp heater 3, it will be possible to attain a large reduction of complexity of control circuit and a burden placed on the control program and the processing operations performed by the CPU. In this regard, the specific value of the first period $\Delta t_1$ at such a time will be different, depending on the frequency of the commercial AC power source in use. In case the frequency of the commercial AC power source is 50 Hz, the specific values of the first period $\Delta t_1$ are, for example, $1/100$ sec., $1/50$ sec., $3/100$ sec., $1/25$ sec., $1/10$ sec., $3/50$ sec., and $7/100$ sec. (which, as expressed in frequency, are 100 Hz, 50 Hz, approximately 33 Hz, 25 Hz, 20 Hz, approximately 17 Hz, and approximately 14 Hz).

With control performed in this manner over the conduction of electric power, it is possible to make frequent changes in the quantity of the supplied electric power for a predetermined control cycle, i.e., for each of the second period $\Delta t_2$, so that it is made possible to perform very fine and stable temperature control with this control process in combination with such a highly advanced control process as the PID control. What is more, this control method places a reduced burden on the CPU since it is sufficient for the CPU to perform the calculations for the temperature detection and the calculation of the duty only once in the second period $\Delta t_2$. Therefore, this control method offers the advantage that the CPU can perform control operations and so forth on the other parts of the apparatus at the same time and that the CPU of the entire unit of the image forming apparatus can therefore perform the temperature control operations concurrently with such other operations without requiring any exclusive-purpose CPU provided for the temperature control operations.

Moreover, it is desirable that the calculation of the quantity of electric power to be supplied is performed on the basis of the description made above in 5. Calculation of Amount of Applied Electric Power.

6-2. On Flickering Impression

When the present inventors performed a temperature control operation on a fixing device on the basis of the control period mentioned above, it was ascertained that the temperature could be maintained in a stable state with an extremely high degree of accuracy.

Now, in the meanwhile, it was found that flickers might occur in lighting appliances in some instances in case the lighting appliances were connected to the same electric power source line to which a fixing device according to the present invention or any image forming apparatus provided with such a fixing device is connected. It was also observed that such flickers gave a more disagreeable impression in some cases than those which appear in the case of the conventional ON/OFF control process.

Figure 12:
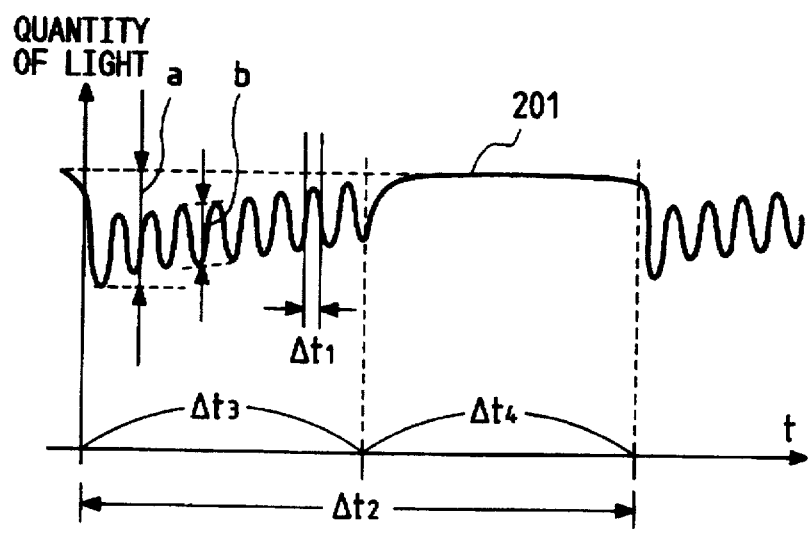
FIG. 12 is a chart illustrating the fluctuations in the quantity of light in the lighting appliances and the display units connected to the same electric power source line at the time when the temperature control method according to the present invention is employed.

FIG. 12 is a chart illustrating the fluctuations which occur in the quantity of light emitted from a fluorescent lamp connected to the same electric power source line to which a fixing device or an image forming apparatus provided with a fixing device is connected in the operations performed by the above-mentioned method for supplying electric power. FIG. 12 shows on its vertical axis the quantity of light emitted from the fluorescent lamp connected to the same electric power source line to which a fixing device or an image forming device provided with a fixing device is connected and shows the time t on its horizontal axis. Moreover, $\Delta t_1$, $\Delta t_2$, $\Delta t_3$, and $\Delta t_4$ are the durations of time respectively corresponding to the first period, the second period, the first phase, and the second phase, which are shown in FIG. 11.

As it is seen clearly in FIG. 12, the light emitted from the fluorescent lamp suffer fluctuations in its quantity as the lamp receives influence from the conduction of electric power to the heating means in the fixing device. These light quantity fluctuations 201 are felt as flickers with the human eyes, giving a disagreeable sensation in some cases. The light quantity fluctuations 201 include the fluctuations which occur in each of the second period $\Delta t_2$ as indicated by "a" in FIG. 12 and those fluctuations which occur in each of the first period $\Delta t_1$ as indicated by "b" in FIG. 12.

The present invention not merely offers a method for supplying electric power, as described above with reference to FIG. 11, but also has realized a method for supplying electric power in such a manner as to prevent the occurrence of a flickering impression, with attention paid to the manner how the human eyes sense the flickers caused in the manner described above. In the following part, the details of the method for supplying electric power while preventing a flickering impression will be described.

Figure 13:
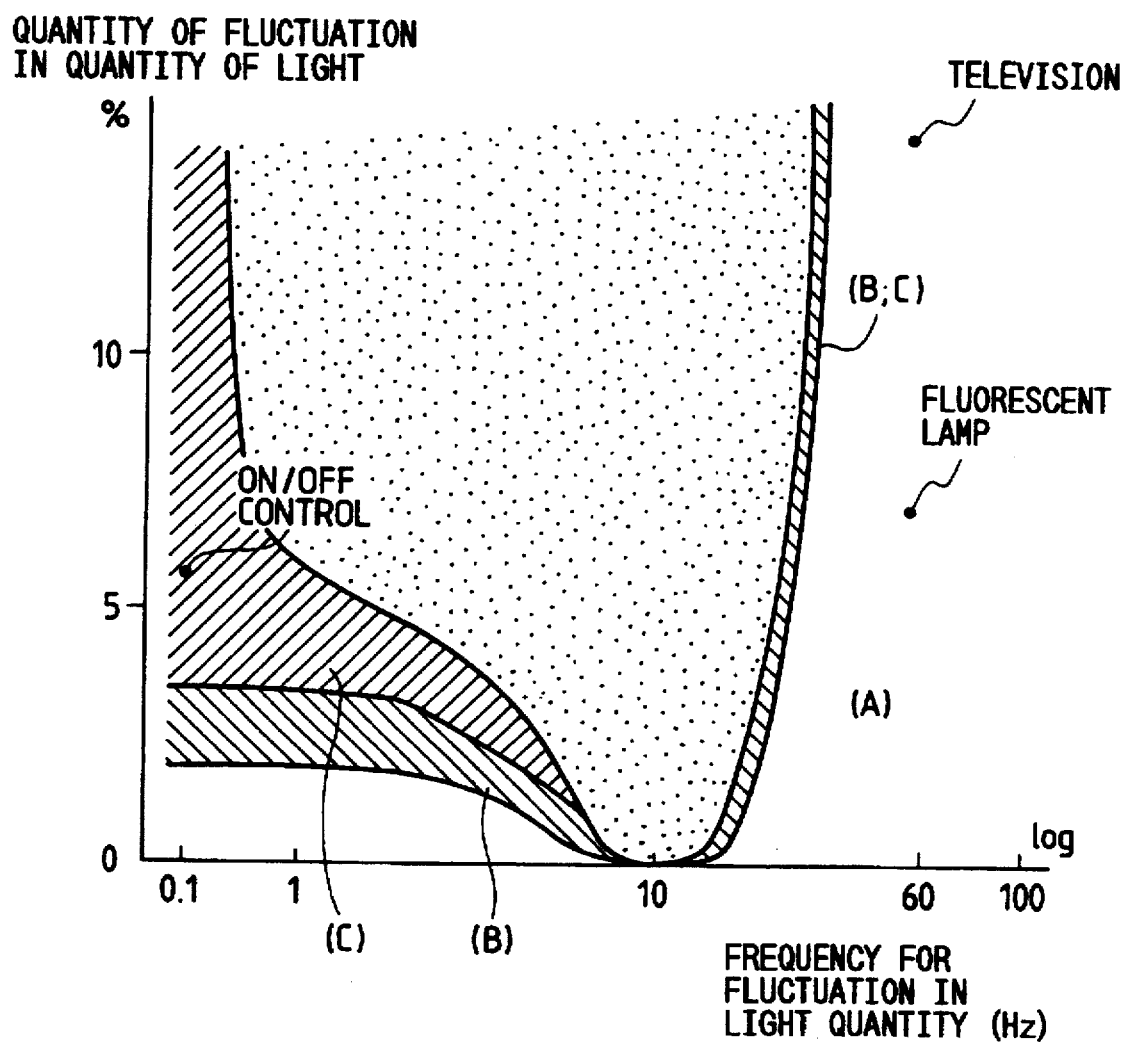
FIG. 13 is a chart illustrating the relationship between the frequency for fluctuations in the quantity of light and the quantity of fluctuations in the quantity of light with respect to the impression of flickers.

First, a study was conducted on the relationship between the fluctuations in the quantity of light and the fluctuating frequency as viewed with respect to the flickering impressions sensed with the human eyes, and the study has revealed the fact that there are characteristics as shown in FIG. 13. FIG. 13 is a chart illustrating the manner how a flickering impression occurring on a lighting appliance connected to the same line to which a fixing device or an image forming apparatus provided with a fixing device is connected depend on the light quantity fluctuating frequency and the quantity of fluctuation in the light quantity. This FIG. 13 shows the quantity of fluctuation in the quantity of light (%) on its vertical axis while it shows the light quantity fluctuation frequency (Hz) on its horizontal axis. The region (A) in FIG. 13 is a region in which no flickering impression at all can be discerned, the region (B) is a region in which a flickering impression can be slightly discerned, and the region (C) is a region in which a flickering impression is discerned but is not disagreeable. Moreover, the regions other than these are those in which a flickering impression is felt and causes a disagreeable sensation. The power source frequency used for this experiment was 60 Hz, but the same result was obtained when an experiment was conducted at the frequency of 50 Hz. Further, a halogen lamp approximately in a range from 300 W to 700 W was used as a halogen lamp heater 3.

Now, it is observed in FIG. 13 that a flickering impression depends largely on the quantity of fluctuation in the quantity of light in the frequency range of the cycle for each of the second period $\Delta t_2$ (approximately from $1/3$ to 5 Hz) mentioned above. On the other hand, no particularly disagreeable sensation is felt even if any flicker is sensed at any point below this frequency range (i.e., approximately $1/3$ Hz or less) since its frequency of occurrence is low. The ON/OFF control operations according to the prior art are performed in this frequency range.

6-3. Method for Preventing Flickering Impression (Part 1)

Figure 14:
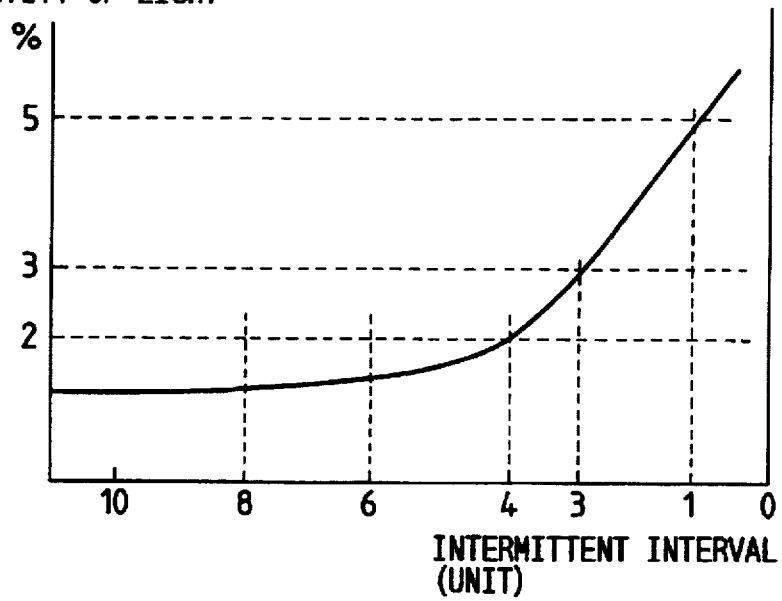
FIG. 14 is a chart illustrating the relationship between the intermittent intervals for the conduction of electric power and the quantity of fluctuations in the quantity of light.

Therefore, with a view to reducing the quantity of fluctuation which occurs in the quantity of light emitted from the lighting appliance in each of the second period $\Delta t_2$, an attempt was made at intermittently conducting electric power in the electric power conducting phase $\Delta t_3$ in each of the second period $\Delta t_2$. In specific terms, the conduction of electric power in the first period $\Delta t_1$ was performed in an electric power supply pattern, which consists of at least one unit of conduction of electric power and at least one unit of non-conduction of electric power, as described later with reference to FIG. 16. Then, a study was conducted on the characteristic features of the quantity of fluctuation in the quantity of light emitted from a lighting appliance, such as a fluorescent lamp, by employing such an electric power supplying method like this and varying the number of units of the non-conduction of electric power, i.e., the intermittent intervals for the supply of electric power. Then, as shown in FIG. 14, the study has revealed that the intermittent intervals for the intermittent conduction of electric power are in correlation with the quantity of fluctuation which occurs in the quantity of light in each of the second period $\Delta t_2$. FIG. 14 shows as plotted in it the quantity of fluctuation which occur in the quantity of light in each of the second period $\Delta t_2$ as correlated with the intermittent intervals. In comparison with the case in which electric power is not conducted intermittently, the intermittent conduction of electric power has achieved a considerable reduction in the quantity of fluctuation in the quantity of light, and, additionally, the quantity of fluctuation in the quantity of light decreases according as the intervals for the intermittent conduction of electric power are extended. In view of this taken into consideration together with a decrease of a disagreeable sensation along with a reduction of the quantity of fluctuation in the quantity of light, it is found that intermittent conduction of electric power produces a remarkable effect in the elimination of a disagreeable sensation caused by flickers due to a fluctuation in the quantity of light in each of the second period $\Delta t_2$.

A more detailed study on the characteristics of the human eyes shown in FIG. 13 has revealed the fact that no flicker is sensed if the quantity of fluctuation in the quantity of light is approximately 2% or less in the frequency range for each of the second period $\Delta t_2$ (i.e., approximately ⅓ to 5 Hz) mentioned above, that merely a slight flicker is sensed if the quantity of fluctuation in the quantity of light is approximately 3% or less, and that a flicker is sensed but is not disagreeable if the quantity of fluctuation in the quantity of light is 5% or less. With this being set in comparison with the relationship between the intermittent power conduction intervals and the quantity of fluctuation in the quantity of light shown in FIG. 14, it is found that 1 or more in the intermittent power conduction intervals represents a region in which a flicker is sensed but does not cause any disagreeable sensation and therefore presents no problem for the purpose of practical use, 3 or more in the intermittent power conduction intervals represents a desirable region in which only a slight flicker is sensed, and 4 or more in the intermittent power conduction intervals represents a more desirable region no flicker at all is ever sensed.

However, as the intermittent power conduction intervals are extended further in an effort to attain a further reduction of the flickers which occur in each of the second period $\Delta t_2$ in the manner described above, those flickers caused by the intermittent conduction of electric power, i.e., those flickers which occur in consequence of the fluctuations in the quantity of light in each of the first period $\Delta t_1$, appear in some cases on the contrary. In the subsequent part, a description will be made of the conditions which prevent the occurrence of such flickers. The first condition is that the first period $\Delta t_1$ in a case in which no intermittent power conduction is performed is to be at two times as large a frequency (for example, 100 Hz) as the frequency (for example, 50 Hz) of the alternating current from a commercial AC power source. Therefore, it is found with reference to the graph in FIG. 13 that the region satisfying this condition is a region of frequency in which a fluctuation in the quantity of light is not sensed by the human eyes even if any fluctuation in the quantity of light is present in each of the first period $\Delta t_1$. Yet, the cycle in the first period $\Delta t_1$, which is 100 Hz when no intermittent power conduction is performed, becomes approximately 9 Hz, provided that the intermittent power conduction intervals are ten units in half waves, for example, as the result of the performance of intermittent power conduction, and the region is then turned into a region in which a fluctuation in the quantity of light can be sensed by the human eyes.

Figure 15:
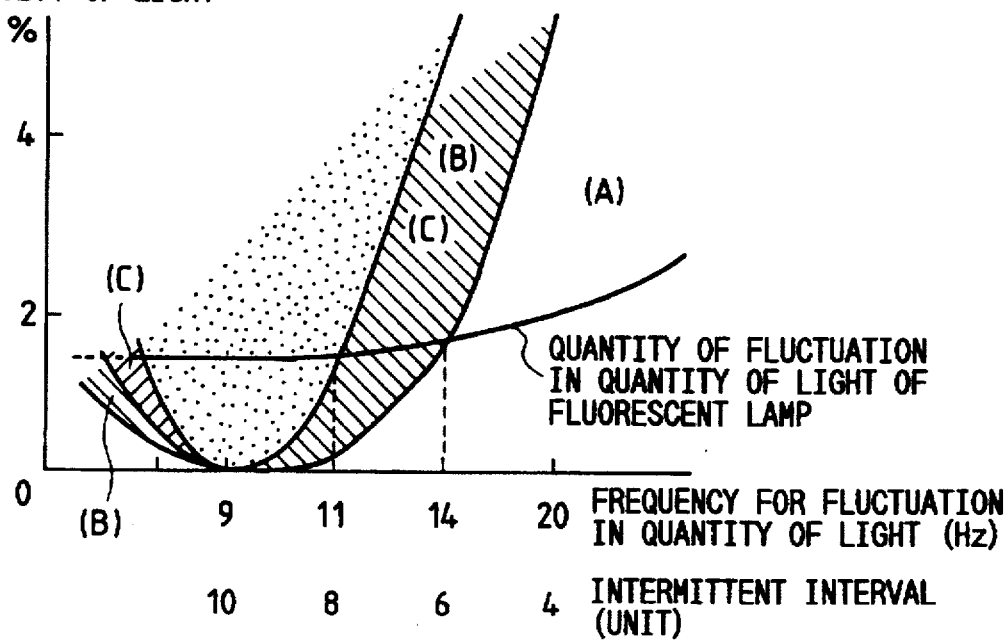
FIG. 15 is a detailed chart illustrating the relationship between the intermittent intervals (i.e., the frequency for the fluctuations in the quantity of light) and the quantity of fluctuations in the quantity of light with respect to the impression of flickers.

FIG. 15 is a chart illustrating the extent to which the power conduction intervals can be extended, and FIG. 15 shows the quantity of fluctuation in the quantity of light shown in FIG. 14 as superposed on a portion of what is shown in FIG. 13 as expanded to show more details. Moreover, FIG. 15 shows a case in which the frequency of the commercial AC power source is 50 Hz. As it can be understood from FIG. 15, slight flickers are sensed if the frequency at which a fluctuation occurs in the quantity of light is approximately 11 Hz or more, i.e., eight units or less in the intermittent intervals. Further, no flicker is sensed in case the frequency at which a fluctuation occurs in the quantity of light is approximately 14 Hz or more, i.e., six units or less in intermittent intervals.

It is possible to prevent a disagreeable sensation caused by flickers by performing the supply of electric power at intervals in this manner with one half of a cycle of an alternating current taken as one unit. Then, preferably with three units or more but with eight units or less forming the intervals, there will be the region in which almost no flickering impression is sensed. More preferably, with intermittent intervals formed of four units or more but six units or less, a more favorable region in which no flickering impression at all is ever sensed is formed.

Figure 16:
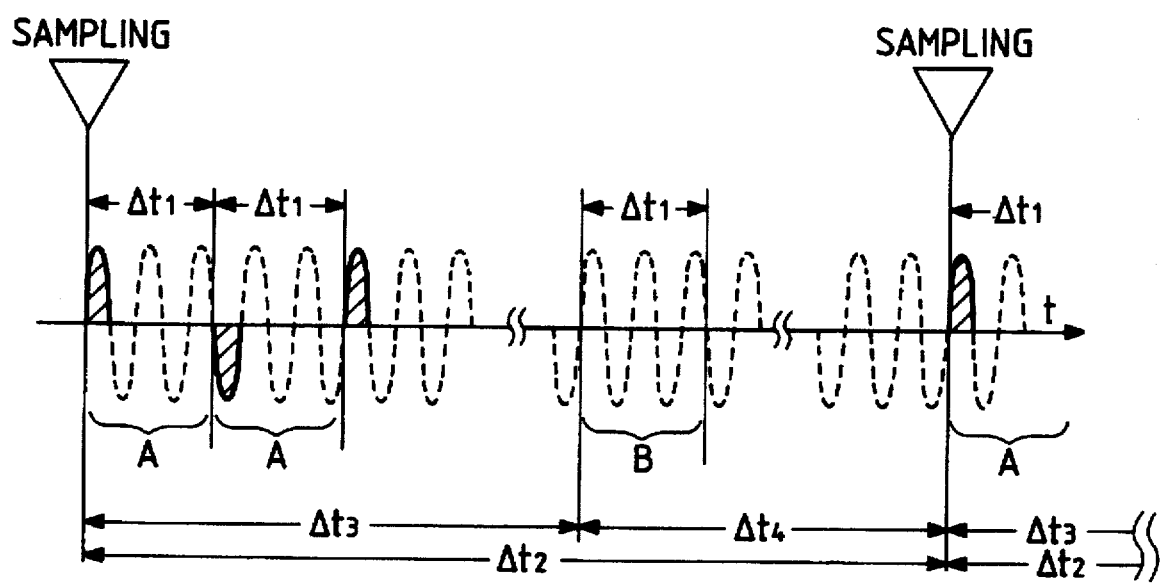
FIG. 16 is a chart illustrating an example of a method for supplying electric power by intermittent conductions of electric power for the temperature control method according to the present invention.

FIG. 16 illustrates an example of a method for supplying electric power by intermittent conductions of electric power in satisfaction of these conditions. The electric power supply pattern shown in FIG. 16 represents an example in which the first period $\Delta t_1$ is composed of five units, with electric power conducted in one of the five units and with no electric power conducted in the remaining four units, and this pattern is called "Pattern A". The number of units for the non-conduction of electric power, which are located between the power conduction units and the next power conduction unit, is referred to as an intermittent interval, then the intermittent interval in the pattern A is 4. In the first phase $\Delta t_3$, electric power is conducted, with the pattern A repeated in the first period $\Delta t_1$. The number of times in which the pattern A is to be repeated is determined on the basis of the duty, the frequency of the commercial AC power source, the second period $\Delta t_2$, and the construction of the pattern A in the first period $\Delta t_1$. In the meantime, the supply of electric power is not permitted in the second phase $\Delta t_4$, and, in this phase, the first period $\Delta t_1$ is composed of five units, and each and all of these five units are for the non-conduction of electric power. This pattern is called as "Pattern B". In the second phase $\Delta t_4$, the pattern B is to be repeated for a predetermined number of times. This operation is repeated in each of the second period Δ $t_2$. Moreover, the sampling of the temperature detected by the temperature sensor 4 and the calculation of the duty to be performed on the basis of the sampled temperature are performed at every beginning of the second period Δ $t_2$.

Next, with reference to an example of experiment, a detailed description will be made of a specific process for the method of controlling the conduction of electric power for the performance of the intermittent conduction of electric power as described above.

6-4. Examples of Experiments

[Example 2 of Experiment]

The construction of the fixing device in this example of experiment is as shown in Table 3.

TABLE 3

| Heating roller | |
|---|---|
| Material | Aluminum |
| Diameter | 18 mm |
| Thickness | 0.6 mm |
| Pressurizing roller | |
| Rubber material | Silicone rubber |
| Hardness | 24 degrees (JIS-A) |
| Rubber thickness | 4 mm |
| Diameter | 18 mm |
| Roller pressurizing force | 5 kg |
| pressurizing width | 230 mm |
| Paper passage velocity v | 20 mm/sec. |
| Halogen lamp power | 500 W |
| Temperature sensor | |
| Element | Thermistor |
| Time constant τ | 2 sec. |
| Analog-digital conversion levels | 256 levels |
| Temperature resolution for analog-digital conversion | 0.5 degree/level |
| Second period Δ $t_2$ | 1 sec. |
| First period Δ $t_1$ | 5 units |
| Pattern in first phase | A (Power conducted in one unit, power not conducted in four units, intermittent interval 4) |
| Pattern in second phase | B (Power not conducted in any of the five units) |
| Power source frequency | 60 Hz |
| Duty | 10% |

Figure 17:
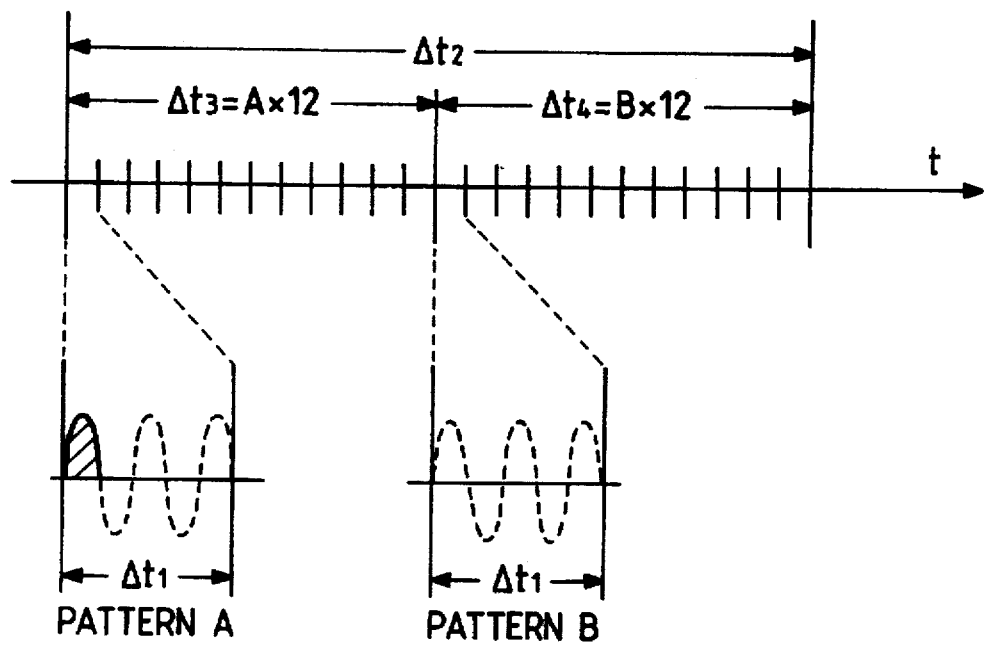
FIG. 17 is a chart illustrating the method for supplying electric power in a first example of experiment relating to the present invention.

FIG. 17 is a chart illustrating the method for supplying electric power in a second example of experiment relating to the present invention. FIG. 17 shows the voltage on the vertical axis and time on the horizontal axis. For example, let us consider a case in which the duty is 10%, the pattern is A, the second period is 1 sec., and the power source used is a commercial AC power source at 60 Hz. The second period Δ $t_2$=1 sec. is composed of 60×2=120 units, and, as the duty is 10%, it is necessary to conduct electric power in a total of 12 units in the second period Δ $t_2$. Since the pattern A for the first period Δ $t_1$ is intended for conducting electric power in one unit out of the five units, the pattern A is to be repeated 12 times, so that the first phase Δ $t_3$ is composed of 12×5=60 units. The second phase Δ $t_4$ is composed of 60 units, which is a balance after the subtraction of Δ $t_3$ from the total of 120 units, so that the pattern B is to be repeated 12 times.

Figure 18:
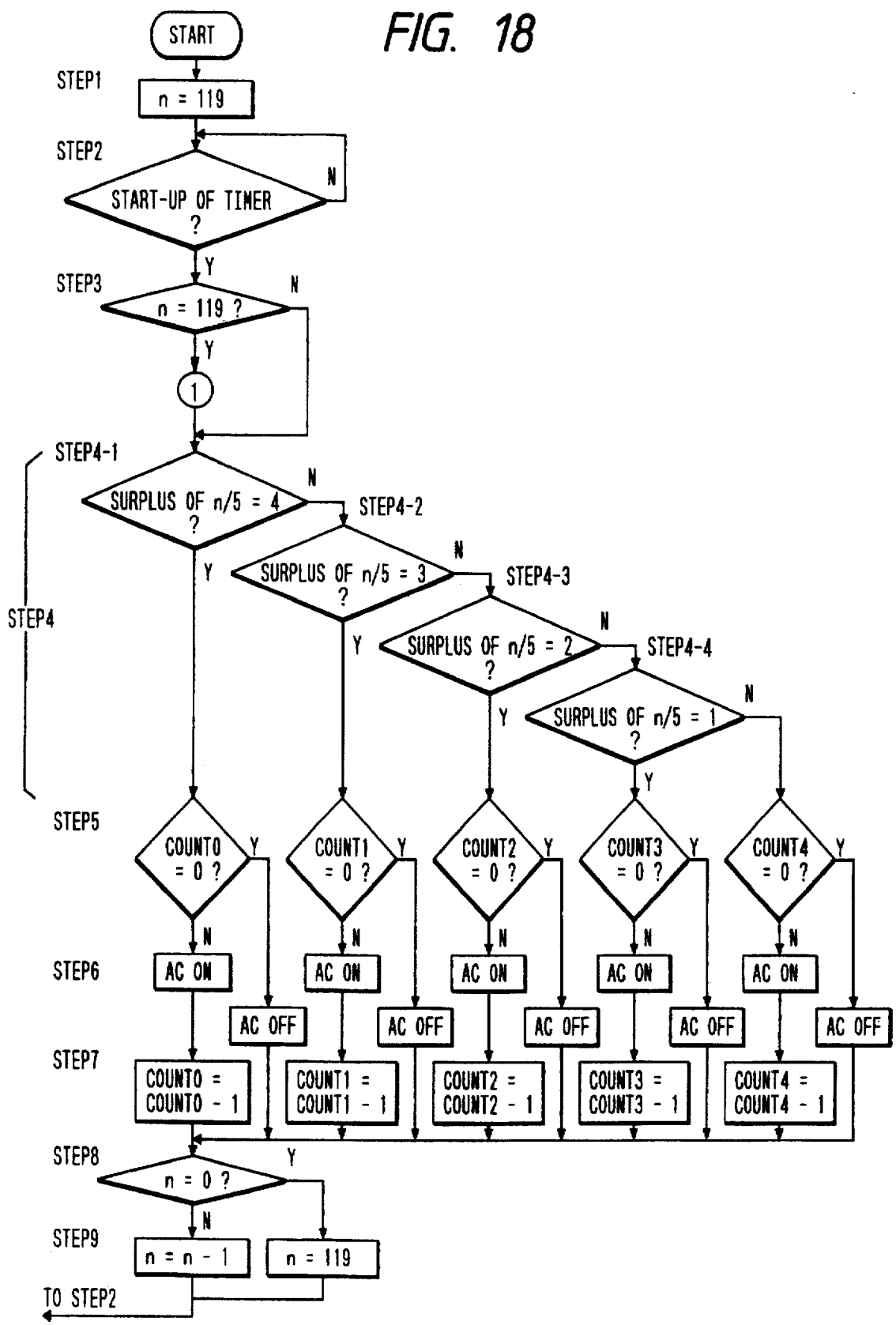
FIG. 18 is a flow chart illustrating the temperature control method for the first example of experiment relating to the present invention.
Figure 19A:
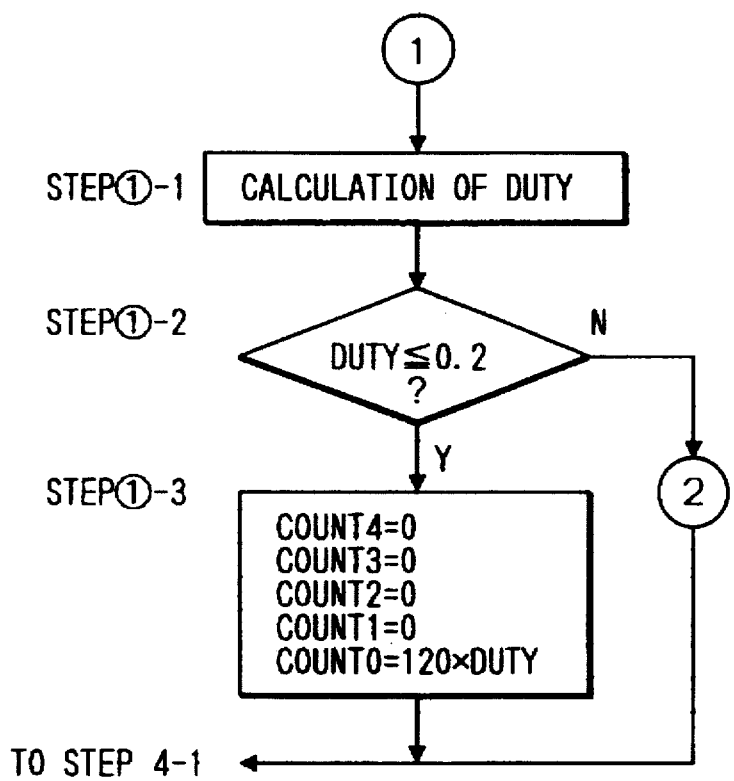
FIG. 19 (a) is a flow chart illustrating the continuation of the flow chart (FIG. 18) illustrating the temperature control method for the first example of experiment relating to the present invention, and FIG. 19 (b) is chart explaining the results of the temperature control shown in FIG. 19 (a)
Figure 19B:
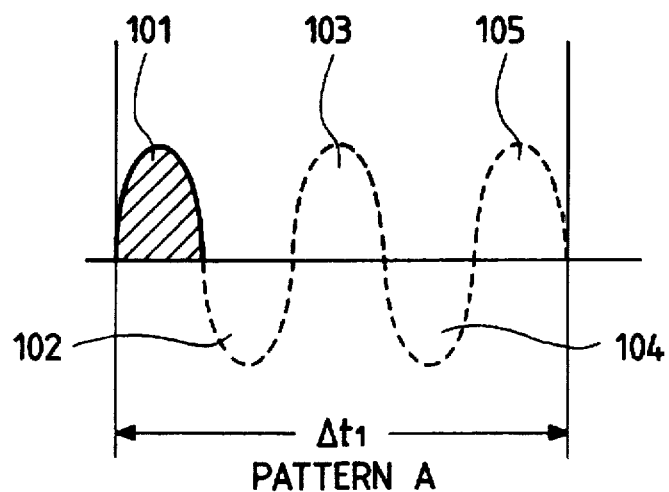

Next, with reference to FIG. 18 and FIG. 19, a description is made of the control signals for performing control in the case of the output of the pattern shown in FIG. 17. FIG. 18 is a flow chart illustrating the entire temperature control method for the second example of experiment relating to the present invention. In this example of experiment, the electric power used is a commercial AC power source at 60 Hz, and the second period Δ $t_2$ is composed of 120 units, in which one half of a cycle of an alternating current wave is taken as one unit.

First, at the Step 1, the initial value is set up for the count value n for the entire second period Δ $t_2$. For the initial one unit of the 120 units for the second period Δ $t_2$, the count value n on the counter is to be set to 119. At the Step 2, it is to be ascertained whether or not the timer for 1/120 sec. is started up in order to have the following process performed once in 1/120 sec. If the counter is started up, the operation proceeds to the Step 3, but, if the counter is not started up, i.e., if 1/120 sec. has not elapsed, then the Step 2 is repeated, and the start-up of the timer is to be waited for. At the Step 3, it is to be judged whether the operation is the initial single operation of 120 times in one second. When the operation is the initial single operation, with the result of the judgment being Y, then the operation proceeds to the routine (1) for determining the duty and for allocating the power conducting pattern.

FIG. 19 (a) is a chart illustrating the routine (1) for the example 2 of experiment (FIG. 18). At the Step (1)-1, the duty, which represents the quantity of electric power to be supplied, is calculated, on the basis of the data on the detected temperature as input into the CPU, by employing the method described above. As the duty thus calculated for the example 1 of experiment is 10%, which corresponds to the value of the duty shown in FIG. 16, the judgment at the Step (1)-2 is Y. In this manner, it is judged at the Step (1)-2 what percent the duty is calculaetd, and the operation branches off to form an electric power conducting pattern suitable for each duty. In case the duty is 20% or more at this moment, an electric power conducting pattern for 20% or more is allocated, and the operation proceeds to the routine (2). A description will be made of the routine (2) in the Example 5 of Experiment, which is to be presented later. Next, at the Step (1)-3, a command is issued for setting the duty to 10%, i.e., for allocating the timing for conducting electric power in twelve power conduction units. In other words, the pattern A in the first period Δ $t_1$ is to be set up.

FIG. 19 (b) is chart illustrating the correspondence between count0 through count4, which are described at the Step (1)-e in FIG. 19 (a), and the one half of a cycle of the alternating current wave. This FIG. 19 (b) shows the electric voltage supplied to the halogen lamp heater 3 of the fixing unit on the vertical axis and shows the time t on the horizontal axis. The first period Δ $t_1$ is composed of five units, and the first unit 101 is allocated as count0, the second unit 102 is allocated as count1, the third unit 103 is allocated as count2, the fourth unit 104 is allocated as count3, and the fifth unit 105 is allocated as count4. Then, the units from count1 to count4 are set to 0, and the calculated value of 120×the duty is to be set in the count value for count0. This value 120 represents the number of units present in the second period Δ $t_2$=one second, and, since the duty is 10%, it is found that 120×duty=120×0.1=12. Generally, the calculated value of d×2×Δ$t_2$×duty is entered in count0 where d is the AC power source frequency, Δ$t_2$ is the time of the sescond period. At this time, the calculated value is to be rounded to the nearest whole number by counting fractions of 0.5 and over as a unit and cutting away the rest in case the value is not any integral number. Moreover, the routine (1) described above is to be executed once in one second.

Then at the Step 4 through the Step 7 shown in FIG. 18, it is judged whether electric power is to be conducted or not for the current one unit. From the Step 4-1 through the Step 4-4, and at the Step 5, it is judged which of the five units in the first period $\Delta t_1$ the count value n on the counter is indicating and it is decided to which of count0 through count4 in correspondence to this is to be referred to. At the Step 5, the operation is shifted to the Step 8 without conducting any electric power to the halogen lamp heater 3 in case the value referred to is 0, but electric power is conducted to the halogen lamp heater 3 at the Step 6 if it is judged that the value referred to is not 0. The operation proceeds further to the Step 7, and the count value referred to is reduced by one.

When the CPU has finished the processing operations up to the Step 7, it ascertains at the Step 8 that the count value n is not 0, i.e., that the count value n does not indicate the final unit in the second period. Then, at the Step 2, the CPU reduces 1 from the current count value n on the counter and thereafter returns to the Step 2. Further, if the CPU judges at the Step 8 that the count value n=0, i.e., that the unit referred to is the final unit in the second period $\Delta t_2$, the CPU restores the counter to n=119, then returning to the Step 2. With the CPU has performed this series of processing operations, the electric power supply pattern shown in FIG. 17 is realized.

With the performance of control over the conduction of electric power on the basis of this processing flow, it is sufficient to perform the calculation for the temperature detection and the duty at one time for each of the second period $\Delta t_2$ (one second), and, additionally, this control process can be performed with a small amount of calculation, and, since it is possible in the period to determine an electric power supply pattern by a procedure with a single program, the system does not require a memory device in any large capacity, but is capable of conducting electric power at various duties merely by control operations consisting of repetitions only. Thus, this control process is capable of performing fine and precise temperature control and also reducing the burden placed on the CPU.

With a fixing device provided with a heating means having a small heat capacity and large electric power effective for reducing a warm-up time as in the case of this example of embodiment, the output duty is extremely small after the elapse of an overshoot subsequent to the completion of the warm-up operation. In the actual operation, the duty is in values ranging from 10% to 20% in most cases, and there is therefore scarcely any instance in which the control system executes the routine (2) shown in FIG. 18. An instance in which this routine (2) is executed is found in a case in which a special recording medium, such as a particularly thick sheet of paper or a particularly thick envelope or the like, is passed through the device, as in the case of the Example 5 of Experiment, which will be described later.

Figure 20A:
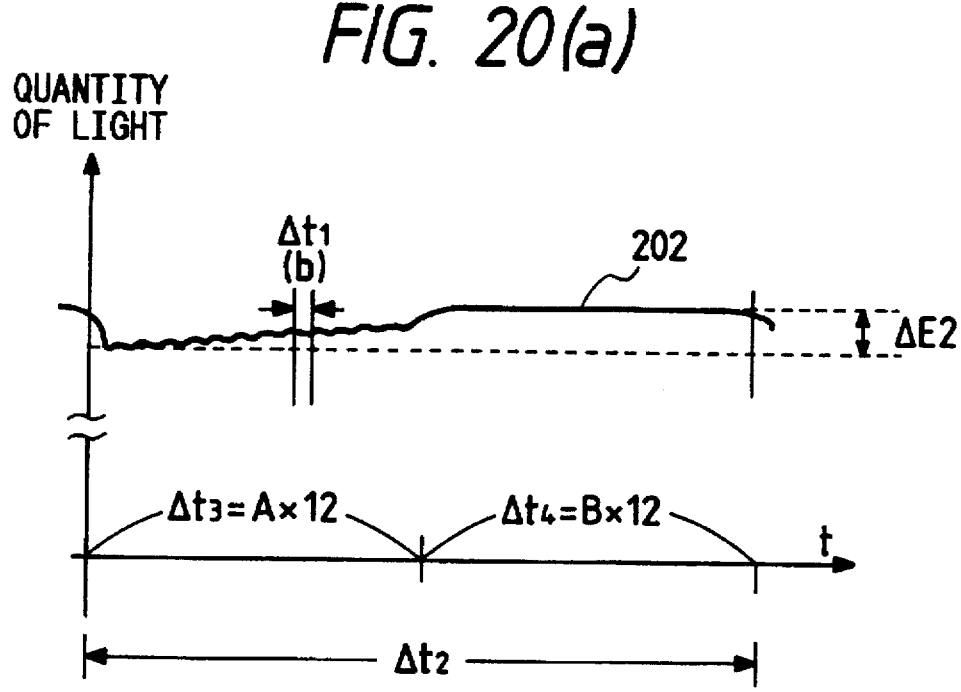
FIGS. 20 (a) and (b) are charts respectively illustrating the fluctuations which occur in the quantity of light when the first example of experiment relating to the present invention is employed.
Figure 20B:
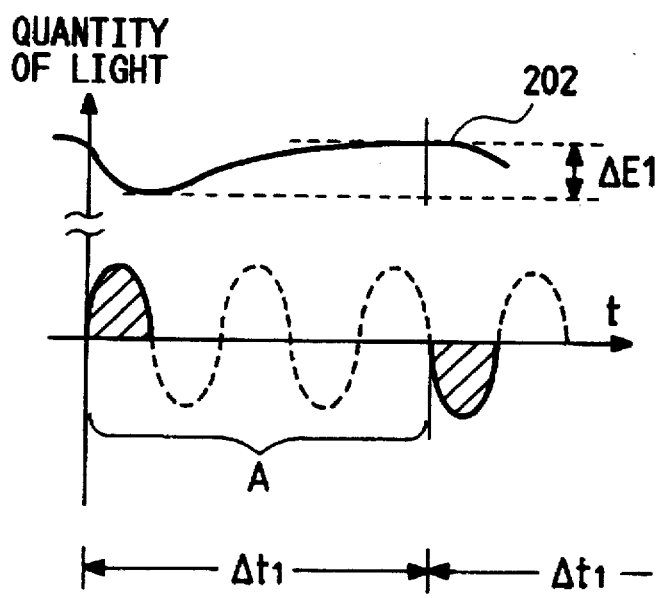

In the Example 3 of Experiment described above, a control method working with an intermittent interval of four units, which is one of the desirable range of intermittent intervals, is described, and the flickering impressions which occurred at that time were observed. FIGS. 20 (a) and (b) are charts respectively illustrating the light quantity fluctuations 202, as well as the electric power conduction pattern, which occurred in a fluorescent lamp connected to the same electric power line to which a fixing device having the construction described in the Example 2 of Experiment or an image forming apparatus provided with such a fixing device is connected. FIG. 20 (a) illustrates the fluctuations which occur in the quantity of light in correspondence to the second period $\Delta t_2$, and FIG. 20 (b) illustrates the fluctuations which occur in the quantity of light in correspondence to the first period $\Delta t_1$. In each of these Figures, the vertical axis indicates the quantity of light while the horizontal axis t indicates the time. In FIG. 20 (a), the quantity of light fluctuates as indicated by 202, and the maximum value $\Delta E2$ for the fluctuation in the second period $\Delta t_2$, is as small as 1.6%, which corresponds to the region (A) shown in FIG. 13. Moreover, in FIG. 20 (b), the maximum value $\Delta E1$ for the fluctuation in the quantity of fluctuation in the quantity of light in the first period $\Delta t_1$, is 0.6%, and the frequency for the fluctuation in the quantity of light is as high as 24 Hz (which corresponds to 20 Hz when it is converted for a case in which the electric power supplied is a commercial AC power source at 50 Hz), and this frequency corresponds to the region (A) shown in FIG. 15.

With the temperature control method performed for the fixing device according to the present invention, it is possible to prevent flickers from occurring in a fluorescent lamp on the same power source line and also to attain a favorable state of fixing. Further, this control process offers a further advantage in that the service life of the halogen lamp heater is extended since the rush current for the halogen lamp heater decreases at the time when the conduction of electric power is started.

Further, the intermittent interval can be shortened in case any larger duty is needed. This is a case in which larger electric power is required for the construction of a fixing device. Such a case is found, for example, in a case in which the paper passage velocity is faster than the velocity shown in Table 3, in a case in which the halogen lamp heater 3 works with any electric power smaller than the electric power shown in Table 3, or in a case in which a particularly thick recording medium is to be passed through the device. Moreover, it is effective to extend the intermittent interval, on the contrary, in case it is sufficient for the device to operate with a smaller duty. For example, such a case is found in a case in which it is sufficient to supply smaller required electric power to the fixing device by reason of the construction of the fixing device, namely, a case in which the paper passage velocity is slower than the velocity shown in Table 3 or a case where the halogen lamp heater 3 works with any electric power larger than the electric power shown in Table 3.

[Example 3 of Experiment]

Next, a third example of experiment will be described. This example features a halogen lamp heater having a larger electric power capacity in replacement of the halogen lamp heater for 350 W, which is used in the Example 2 of Experiment, with the temperature control similar to that in the Example 2 of Experiment being performed at a low duty. The construction of the principal parts of the fixing device is as shown in Table 4 given below (It is to be noted here that the items under the same conditions as those stated in Table 3 are not restated particularly here unless they are principal items in the construction).

TABLE 4

| | |
|---|---|
| Halogen lamp power | 500 W |
| Control cycle (second period) | 1 sec. |
| First period $\Delta t_1$ | 5 units |
| Pattern in first period | A |
| | (Power conducted in one unit, power not conducted in four units, intermittent interval 4) |
| Pattern in second period | B |
| | (Power not conducted in five units) |
| Duty | 5% |

Figure 21A:
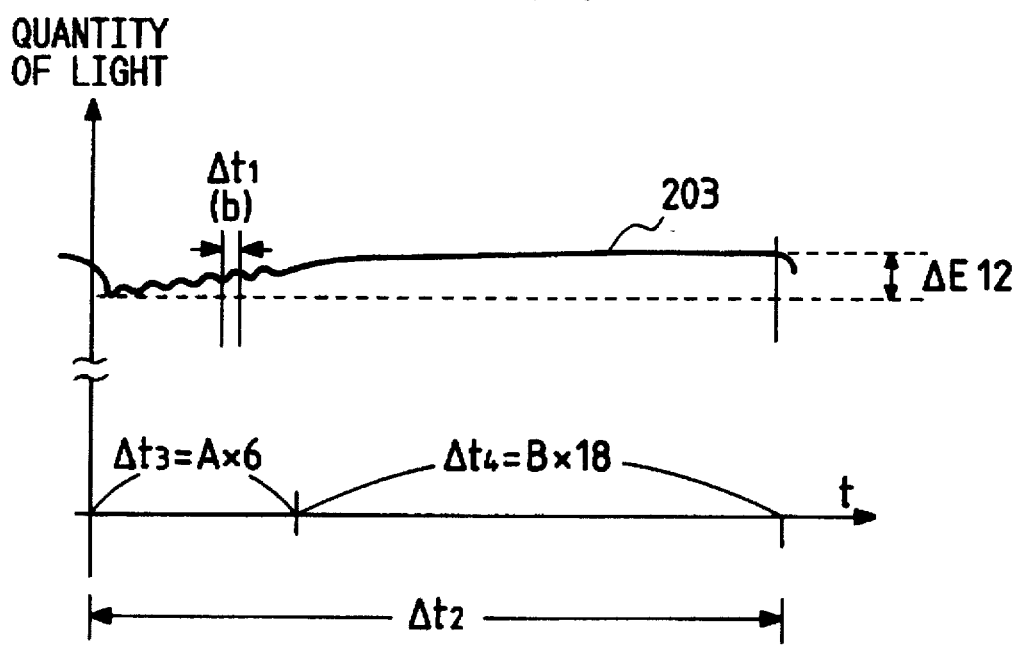
FIGS. 21 (a) and (b) are charts respectively illustrating the fluctuations which occur in the quantity of light when the second example of experiment relating to the present invention is employed.
Figure 21B:
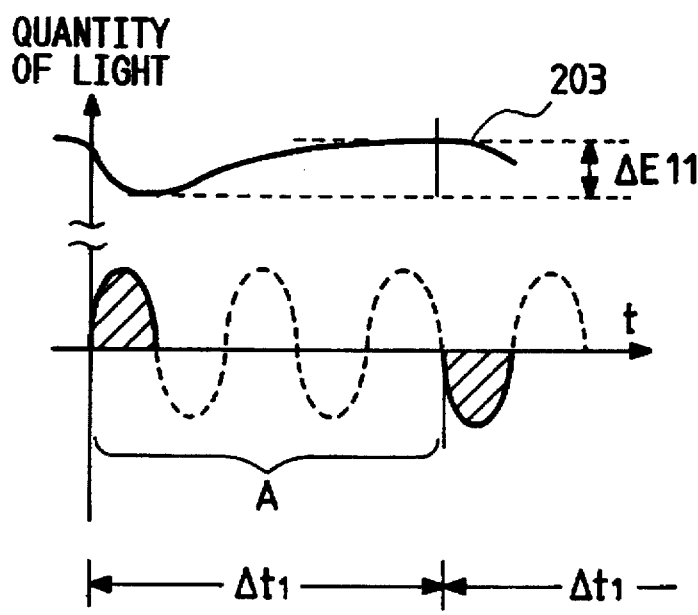

FIGS. 21 (a) and (b) are charts respectively illustrating the light quantity fluctuations 203 which occur in a fluorescent lamp connected to the same electric power line to which a fixing device or an image forming apparatus provided with a fixing device is connected when a temperature control process is performed with the fixing device in the construction described in the Example 3 of Experiment according to the present invention and also illustrating the electric power conduction pattern at work at that time. FIG. 21 (a) shows the fluctuations which occur in the quantity of light in the second period $\Delta t_2$, while FIG. 21 (b) shows the fluctuations which occur in the quantity of light in the first period $\Delta t_1$. Each of these Figures shows the quantity of light on the vertical axis and shows the time on the horizontal axis t. The maximum value $\Delta$ E12 for the quantity of fluctuation in the quantity of light in the second period $\Delta t_2$ is 2.5%, and this corresponds to the region (B) shown in FIG. 13. Further, the maximum value $\Delta$ E11 for the quantity of fluctuation in the quantity of light in the first period $\Delta t_1$ is 0.6%, and the frequency for the fluctuation in the quantity of light is as high as 24 Hz (which corresponds to 20 Hz when it is converted for a case in which the electric power supplied is a commercial AC power source at 50 Hz), and this frequency corresponds to the region (A) shown in FIG. 15.

Even though the fixing device in this construction uses a halogen lamp heater working with a larger muximum output power, the impression of the flickers which occurred in the operation of this fixing device was that of the region (B) shown in FIG. 15. Further, the time needed for the warm-up operation at that time was reduced by approximately 2.5 sec. from the warm-up time required in the Example 2 of Experiment. Moreover, a decline in the temperature was slight even in the course of the passage of the recording medium, and the electric power supplied can be at a small duty. Even if it is granted that any large electric power is applied to produce a large overshoot or a large temperature ripple, it will be possible to perform appropriate control by taking such a measure as changing a control constant because this control process may be combined with such a highly advanced control process as PID control.

[Example 4 of Experiment]

Further, an Example 4 of experiment was conducted on the performance of a control method with an intermittent interval set longer than in the Example 3 of Experiment. The construction of this device was as shown in Table 5 presented below.

TABLE 5

| | |
|---|---|
| Halogen lamp power | 500 W |
| Control cycle (second period) | 1 sec. |
| First period $\Delta t_1$ | 6 units |
| Pattern in first period | C |
| | (Power conducted in one unit, power not conducted in five units, intermittent interval 5) |
| Pattern in second period | D |
| | (Power not conducted in six units) |
| Duty | 5% |

Figure 22A:
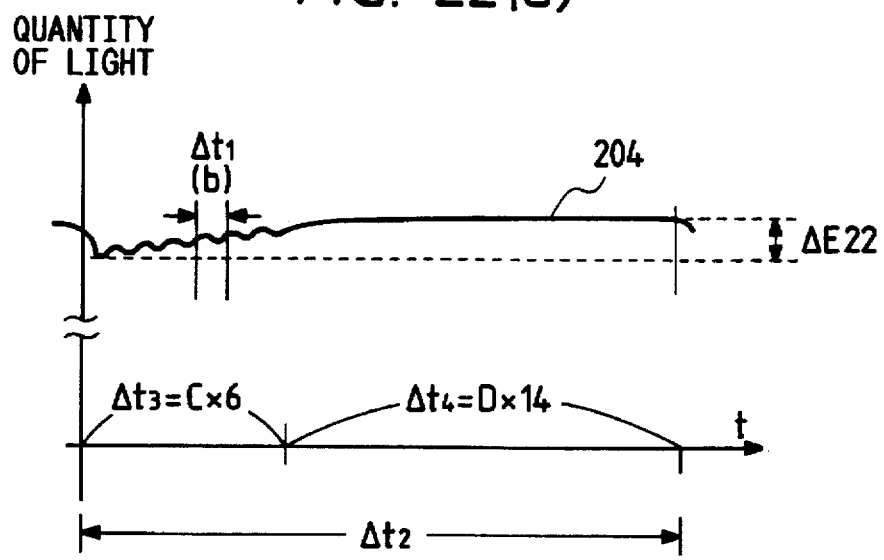
FIGS. 22 (a) and (b) are charts respectively illustrating the fluctuations which occur in the quantity of light when the third example of experiment relating to the present invention is employed.
Figure 22B:
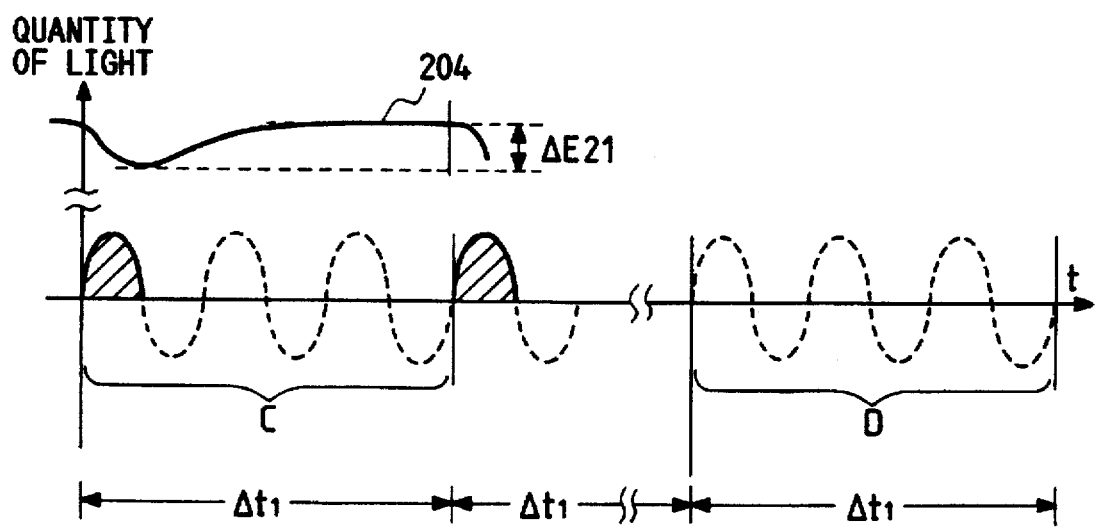

FIGS. 22 (a) and (b) are charts respectively illustrating the light quantity fluctuations 204 occurring in a fluorescent lamp connected to the same electric power line to which a fixing device or an image forming apparatus provided with a fixing device is connected when a temperature control process is performed with the fixing device in the construction described in the Example 4 of Experiment according to the present invention. FIG. 22 (a) shows the fluctuations which occur in the quantity of light in the second period $\Delta t_2$ and an electric power conduction pattern at work in the second period, while FIG. 21 (b) shows the fluctuations which occur in the quantity of light in the first period $\Delta t_1$ and the electric power conduction pattern at work in the first period. Each of these Figures shows the quantity of light on the vertical axis and shows the time on the horizontal axis t. The maximum value $\Delta$ E22 for the quantity of fluctuation in the quantity of light in the second period $\Delta t_2$ is 2.0%, and this corresponds to the region (A) shown in FIG. 13. Further, the maximum value $\Delta$ E21 for the quantity of fluctuation in the quantity of light in the first period $\Delta t_1$ is 0.8%, and the frequency for the fluctuation in the quantity of light is as high as 20 Hz (which corresponds to approximately 17 Hz when it is converted for a case in which the electric power supplied is a commercial AC power source at 50 Hz), and this frequency corresponds to the region (A) shown in FIG. 15. Even though the fixing device in this construction uses a halogen lamp heater working with a larger quantity of electric power, the impression of the flickers was favorable even though the control method was applied at the intermittent interval of five units.

[Example 5 of Experiment]

Next, a description will be made of a fifth example of experiment, in which a high duty is attained with the passage of a particularly thick recording medium or a particularly thick envelope or the like was passed through the fixing device. The construction of the fixing device employed in this example of experiment is as shown in Table 6 presented below.

TABLE 6

| | |
|---|---|
| Halogen lamp power | 350 W |
| Control cycle (second period) | 1 sec. |
| First period $\Delta t_1$ | 5 units |
| Pattern in first period | A' |
| | (Power conducted in two units, power not conducted in three units) and A |
| | (Power conducted in one unit, and power not conducted in four units) |
| Pattern in second period | None |
| Duty | 30% |

Figure 23:
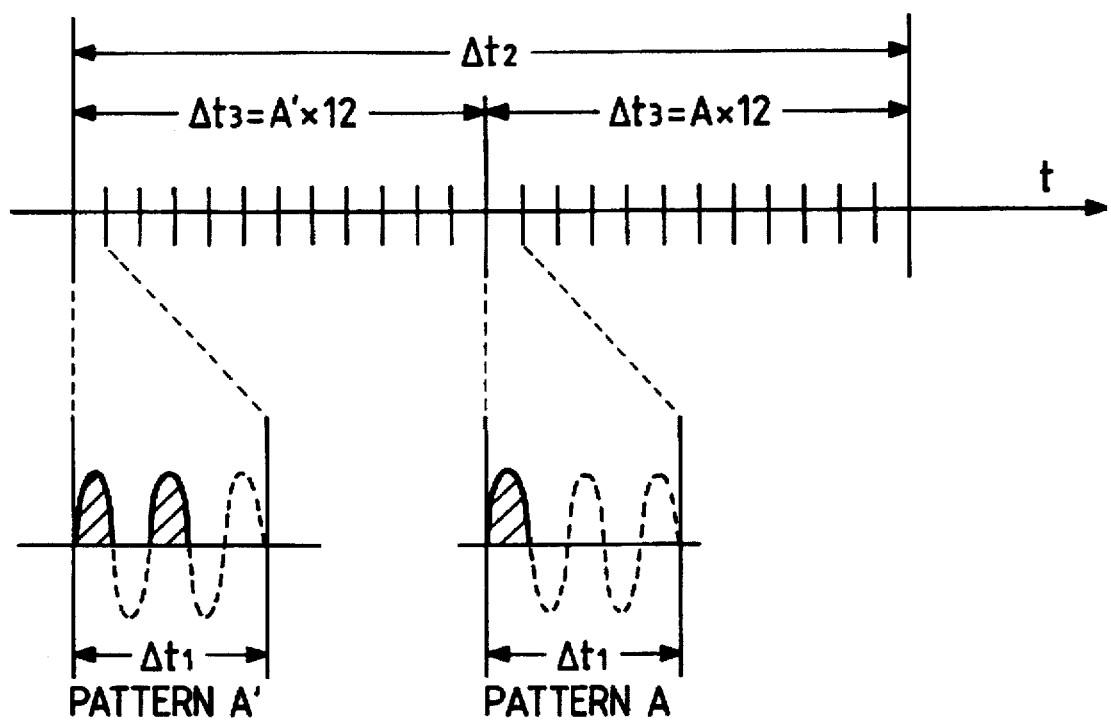
FIG. 23 is a chart illustrating the method for supplying electric power in the fourth example of experiment relating to the present invention.

The maximum limit of the duty will be 20% in case temperature control is performed in the first period $\Delta t_1$ composed of five units and in the pattern A in the first period, as in the construction of the fixing device in the Example 2 of Experiment. However, in the case of a duty in excess of 20%, it is possible to deal properly with the requirement by putting, as appropriate, the conduction of electric power for several units into the four units for the non-conduction of electric power. FIGS. 23 is a chart which illustrates the electric power conduction pattern for the Example 5 of Experiment. The second period $\Delta t_2$ shown in FIG. 23 is composed only of the first phase $\Delta t_3$. In the $\Delta t_3$, the two different patterns, i.e., the pattern A and the pattern A', are used for supplying electric power to the halogen lamp heater, as shown in the Figure.

Figure 24A:
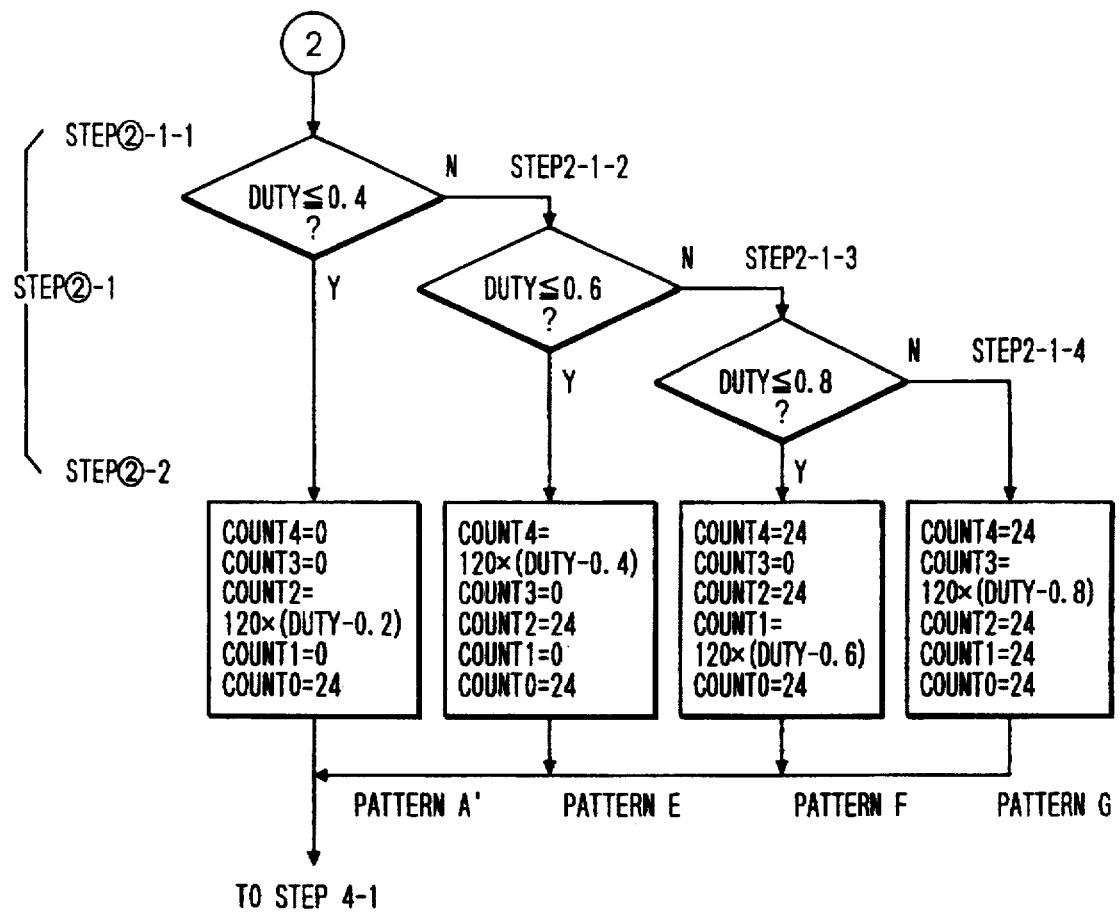
FIG. 24 is a flow chart which, being a continuation of the flow chart (FIG. 19 (a)) showing the temperature control methods in the first through fourth example of experiments relating to the present invention, is a flow chart illustrating the temperature control method particularly in the fourth example of experiment of the present invention.
Figure 24B:
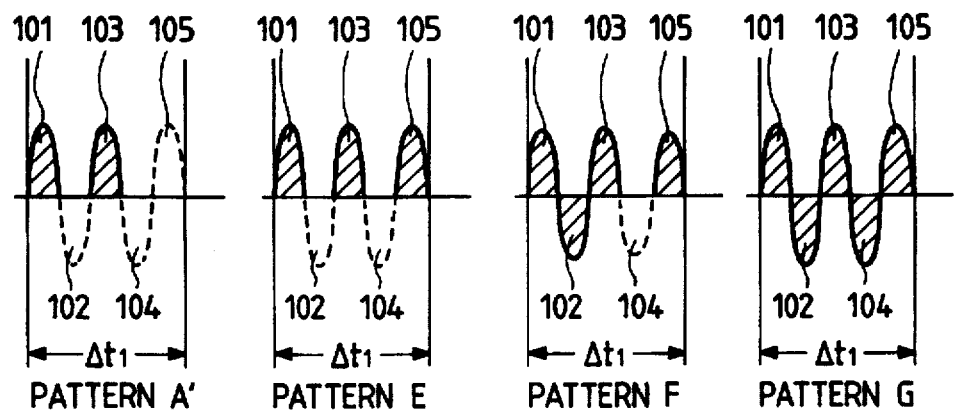

Next, with respect to the control signal for performing the control in the case of the output of the patterns shown in FIG. 23, a description will be made with reference to FIG. 18, FIG. 19, and FIG. 24. FIG. 24 is a flow chart for allocating the electric power conduction patterns for a case in which operations are performed at a high duty in this example of experiment and also for illustrating the electric power conduction pattern to be used in the first period $\Delta t_1$ at such a time.

First, the Step 1 shown in FIG. 18 through the Step (1)-1 shown in FIG. 19 are performed in the manner described above. Next, at the Step (1)-2 shown in FIG. 19, it is judged whether or not the duty calculated at the Step (1)-1 is 20% or less. Then, when the judgment is to be N, the routine (2)

shown in FIG. 24 is to be executed (in the case of this Example 5 of Experiment, the duty is 30%, and the operation therefore branches for the execution of the routine (2)). At the Step (2)-1, it is judged whether or not the duty is in a still higher value, such as 40%, 60%, or 80% or more. In the case of this Example 5 of Experiment, the duty is 30%, so that duty=0.3, and the judgment at the Step (2)-1-1 is to be Y, and the operation proceeds to the Step (2)-2. At the Step (2)-2, the CPU issues a command for allocating a timing to be put out. The CPU performs the allocation of count0 to count4 in the same manner as that shown for the Step (1)-3 in FIG. 19, and, at the duty of 30% in this Example 5 of Experiment, the value of count0 is 24 and the value of count2 is 12. If the calculated value is not any integral number at this time, then the calculated value is to be rounded to the nearest whole number by counting fractions of 0.5 and over as a unit and cutting away the rest.

FIG. 24 (b) shows the pattern A' through the pattern G in a presentation of electric power conduction patterns matching various duties. In this manner, the conduction of electric power in one unit is appropriately filled in the first period $\Delta t_1$. The routine (2) as described above is executed once in one second, and the operation proceeds to the Step 4-1 shown in FIG. 20. Since this is a simple routine, it does not work as any burden on the CPU, or does not cause any delay in its processing speed, either.

Figure 25A:
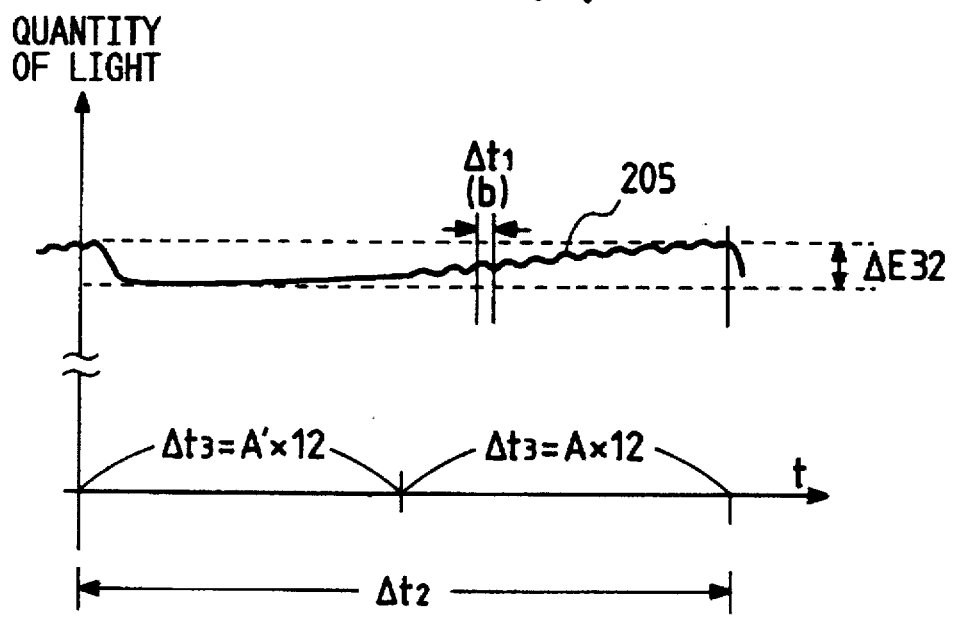
FIGS. 25 (a) and (b) are charts respectively illustrating the fluctuations which occur in the quantity of light when the fourth example of experiment relating to the present invention is employed.
Figure 25B:
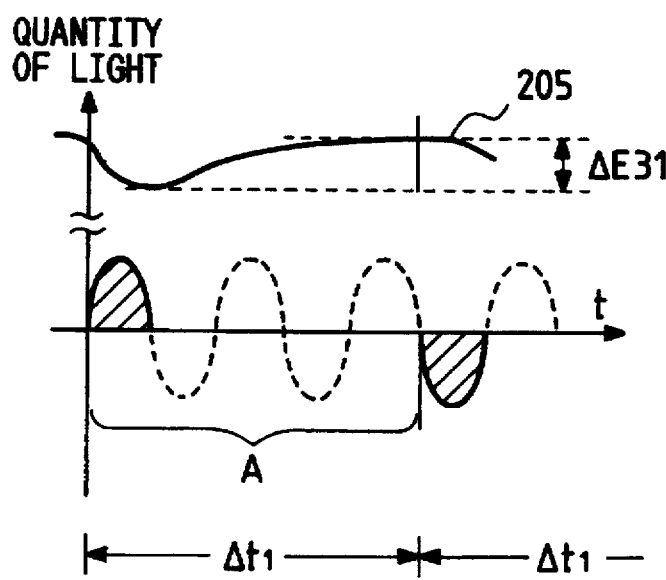

FIGS. 25 (a) and (b) are charts respectively illustrating the light quantity fluctuations 205 which occur in a fluorescent lamp connected to the same electric power source line to which a fixing device or an image forming apparatus provided with the fixing device is connected when temperature control is performed in this Example of Experiment. FIG. 25 (a) is a chart illustrating the fluctuations which occur in the quantity of light in the second period $\Delta t_2$ and the electric power conduction pattern in the second period, and FIG. 25 (b) is a chart illustrating the fluctuations which occur in the quantity of light in the first period $\Delta t_1$ and the electric power conduction pattern in the first period. These FIG. 25 (a) and FIG. 25 (b) respectively show the quantity of light on the vertical axis and show the time on the horizontal axis 5. The maximum value $\Delta$ E32 for the quantity of fluctuation in the quantity of light in the second period $\Delta t_2$ is 1.6%, which corresponds to the region (A) shown in FIG. 13. Additionally, the light quantity fluctuation in the first period $\Delta t_1$ occurs only in the pattern A at an intermittent interval larger than 2, and the maximum value $\Delta$ E31 for the light quantity fluctuation is 0.6%, and the frequency for the light quantity fluctuation is 24 Hz (which corresponds to 20 Hz when it is converted for a case in which the electric power supplied is a commercial AC power source at 50 Hz), and this frequency corresponds to the region (A) shown in FIG. 15. Thus, even in case the duty was high, the flickers in the light from the fluorescent lamp connected to the same electric power source line to which a fixing device or an image forming apparatus provided with a fixing device was connected gave a favorable impression.

6-5. Method for Preventing Flickering Impression (Part 2)

Next, a description will be made of another temperature control method for a method for supplying electric power to a halogen lamp heater 3 on the basis of a predetermined supplied electric power quantity P. This is a method for dexterously performing the supply of electric power to a heating means at particular intermittent intervals without setting up any period for determining the quantity of electric power. That is to say, this method features an application of the principle that the intermittent conduction of electric power, which is described in "6-3. Method for Preventing Flickering Impression (Part 1)" is effective for preventing a flicker, even in a case in which the fixing device does not have any control cycle for the second period $\Delta t_2$ mentioned above, to a temperature control method by the ON/OFF control process.

With reference to FIG. 13, it is found that the ON/OFF control process produces a region (C) in which a flickering impression is sensed, though it is not disagreeable, in case the quantity of fluctuation in the quantity of light is large. The temperature control method according to the present invention is intended for achieving an extremely favorable state without any flickering impression at all by performing intermittent electric power conduction, thereby reducing the quantity of fluctuation in the quantity of light.

First, as described above with reference to FIG. 13 and FIG. 14, the intermittent interval for the conduction of electric power is to be kept at four units or more. Then, the quantity of fluctuation in the quantity of light at the time when a shift is effected from the OFF state to the ON state in this example of embodiment, can be reduced to 2% or less. As the result of this, a flickering impression is not sensed. Secondly, as mentioned earlier with reference to FIG. 15, the intermittent interval for the conduction of electric power is to be set to six units or less. Then, flickering impression caused by the light quantity fluctuation in the first period $\Delta t_1$ is not sensed.

Thus, it is possible to realize a temperature control method which does not cause any flickering impression at all, including an ON/OFF control process, by performing the supply of electric power in an intermittent manner with one half of a cycle of an alternating current wave taken as one unit and by setting this intermittent power supply interval from four units to six units of one half of a cycle of an alternating current wave.

6-6. Examples of Experiment

[Example 6 of Experiment]

Now, as the Example 6 of Experiment, a specific example will be described of a case in which intermittent electric power conduction is performed with an ON/OFF control which does not provide any period for determining the quantity of electric power. The construction of the fixing device in this example of experiment is as shown in Table 7. In this regard, it is to be noted that the fundamental items of the construction other than the items explicitly stated here are the same as those given in Table 2. Further, since there is no period for determining the quantity of electric power, the second period $\Delta t_2$ and the duty, which are shown in Table 2, do not exist in this Example 6 of Experiment.

TABLE 7

| Halogen lamp power | 500 W |
| Temperature control method | ON/OFF control |
| First period $\Delta t_1$ | Five units |
| Pattern at ON time | (Power conducted to one unit, power not conducted to four units, intermittent interval 5) |

Figure 26A:
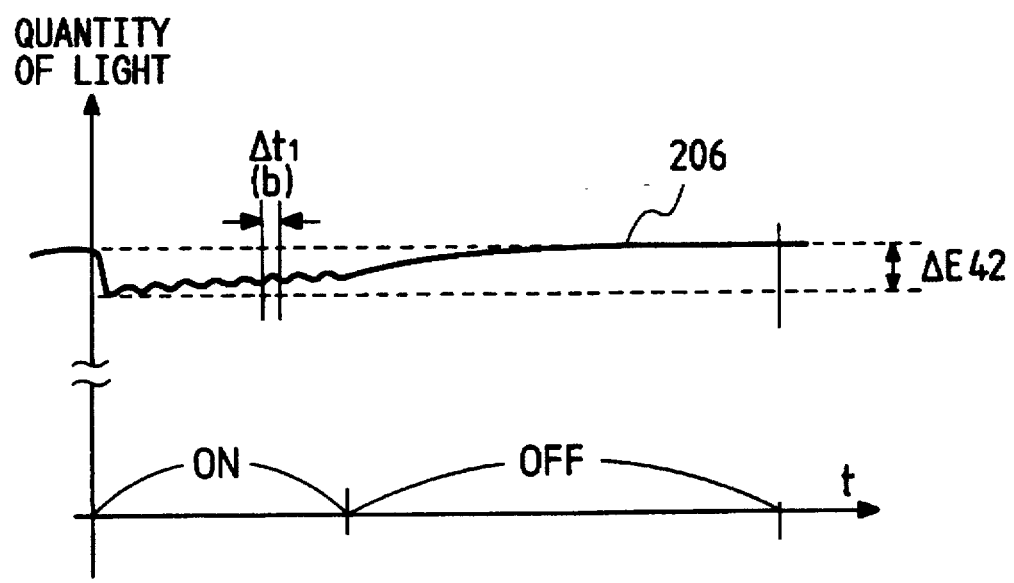
FIGS. 26 (a) and (b) are charts respectively illustrating the fluctuations which occur in the quantity of light when the fifth example of experiment relating to the present invention is employed.
Figure 26B:
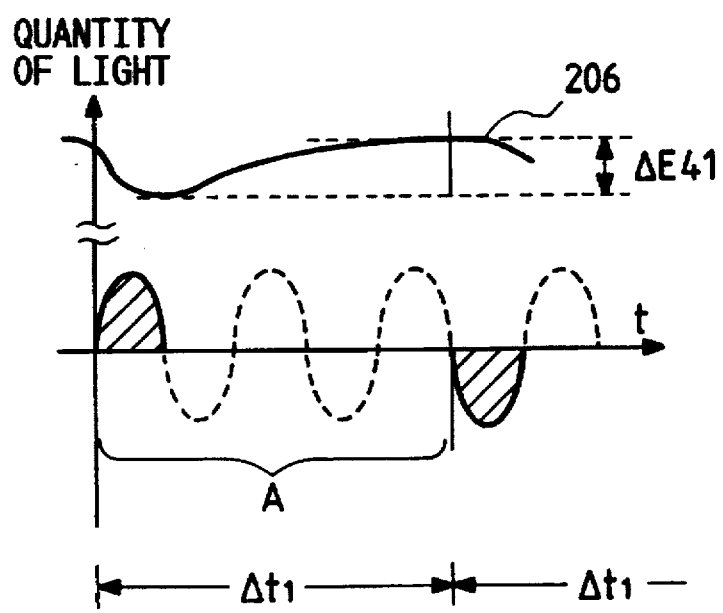

FIGS. 26 (a) and (b) are charts respectively illustrating the light quantity fluctuations 206 which occur in the light emitted by a fluorescent lamp connected to the same electric power line to which a fixing device or an image forming apparatus provided with a fixing device is connected when temperature control is performed in this Example of Experiment. FIG. 26 (a) is a chart illustrating the fluctuations which occur in the quantity of light, and the electric power conduction pattern, at the time when a shift is made from OFF to the ON state in the ON/OFF control, and FIG. 26 (b)

is a chart illustrating the fluctuations which occur in the quantity of light in the first period $\Delta t_1$ and the electric power conduction pattern for the first period. Each of these Figures shows the quantity of light on the vertical axis and shows the time on the horizontal axis t. The maximum value $\Delta E42$ for the quantity of fluctuation in the quantity of light in a single ON/OFF operation is 1.6%, and this value corresponds to the region (A) shown in FIG. 13. Further, the maximum value $\Delta E41$ for the fluctuation in the quantity of light in the first period $\Delta t_1$ is 0.6%. In this case, the frequency for the fluctuation in the quantity of light was 24 Hz (which corresponds to 20 Hz when it is converted for a case in which the electric power supplied is a commercial AC power source at 50 Hz), and this frequency corresponds to the region (A) shown in FIG. 15. In this state, no flicker was sensed in the light from the fluorescent lamp connected to the same electric power source line to which a fixing device or an image forming apparatus provided with a fixing device was connected.

Moreover, it is to be noted in this regard that a fluorescent lamp has been taken up here as an example of a lighting appliance which gives a flickering impression, but that a lighting appliance producing such a flickering impression is not limited to a fluorescent lamp. Thus, the present invention will produce a similar effect even in a case in which the appliances are such a lighting appliances as a discharge lamp and an incandescent lamp and display units for such devices as a television set and a projector.

7. Sequence Control

Next, a description will be made of a sequence control method, which forms a third characteristic feature of the present invention and which changes the control target temperature in a manner suitable for the circumstances.

7-1. Changeover of Control Temperature (High Temperature Mode and Low Temperature Mode)

Figure 27:
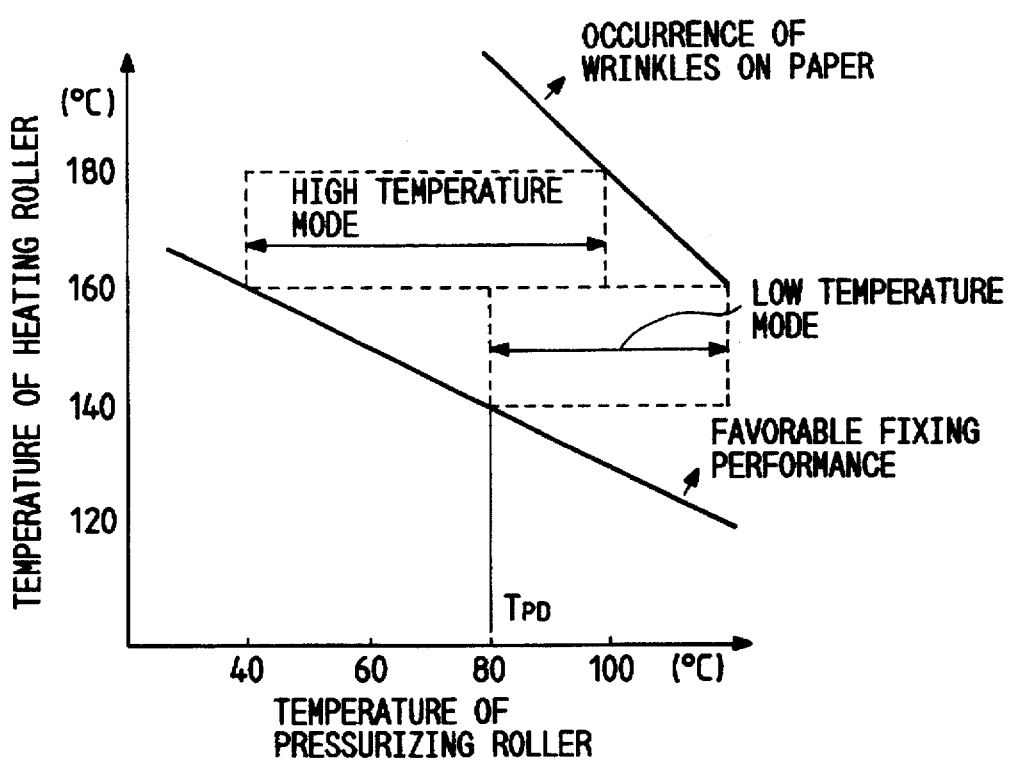
FIG. 27 is a chart illustrating a favorable fixing condition secured with the fixing device in the example of embodiment of the present invention.

In a fixing device in the construction described above, the state ensuring the performance a fixing process in a favorable condition depends on both the temperature of the heating roller 1 and the temperature of the pressurizing roller 2. FIG. 27 illustrates a favorable fixing region (i.e., the region kept between the two diagonal solid lines in the Figure) which appears when the temperature of the heating roller 1 and the temperature of the pressurizing roller 2 have changed. However, the favorable fixing region shown in FIG. 27 will change, depending on the time in which the recording medium passes through the nip portion of the heating roller 1 and the pressurizing roller 2. FIG. 27 shows a case in which the time for the passage of the recording medium through the nip portion is 0.1 sec.

FIG. 27 shows that it is possible to prevent a state of insufficient fixing by setting the temperature of the heating roller 1 at a somewhat high temperature in a case in which the pressurizing roller 2 is at a relatively low temperature than in a case the pressurizing roller 2 is at a relatively high temperature. However, while the temperature on the surface of the heating roller 1 is subjected to temperature control, the pressurizing roller 2 is not given any temperature control, so that the temperature on the surface of the pressurizing roller 2 will ordinarily be liable to have fluctuations in an extensive range from a state approximately the same as the atmospheric temperature at the lower side to a temperature somewhat lower than the controlled temperature of the heating roller 1 at the higher side. Therefore, it is conceivable that the pressurizing roller 2 happens to attain a rise of temperature to a state at a high temperature while the heating roller 1 remains at a controlled temperature appropriate when the pressurizing roller 2 is cold. If this state takes place, there appears a state of excessive heating to the recording medium 5, which is passed through the device, with the result that unnecessary gloss develops on the surface of the recording medium, that wrinkles are developed on the recording medium 5, and that there occurs a phenomenon known as a high temperature offset, in which the toner is transferred to the surface of the heating roller 1 to be transferred again to the recording medium to spoil the images produced there. The line of demarcation defining the limit of the favorable region on the high temperature side in FIG. 27 is the limit line beyond which wrinkles due to excessive heating are developed on the paper.

Then, the present invention assumes the degree of the increasing temperature of the pressurizing roller 2, and the set fixing temperature of the heating roller 1 is changed in accordance with the assumed degree between high temperature mode and low temperature mode, so that the appropriate fixing condition can be always attained.

7-2. Temperature Variation of Pressurizing Roller

The present invention therefore discloses a sequential temperature control method whereby it is made possible always to maintain a favorable state of fixing with changes effected in the fixing temperature in accordance with the fluctuations in the temperature of the fixing roller without any addition of any new component part, and a detailed description will be made below with respect to the temperature control method. All of the several examples described below as a sequential temperature control method in embodiment of the present invention are applied to the fixing device described above for the printer.

Now, a description will be made of an example of the sequential temperature control method in embodiment of the present invention. This example of embodiment describes two control methods, i.e., 1) a method for discriminating the temperature of the pressurizing roller 2 and 2) a method of correcting a decline in the temperature of the pressurizing roller at the time of the passage of the recording medium through the fixing device.

7-2-1. Discrimination of Temperature of Pressurizing Roller

First, a description will be made of the first control method, i.e., a method for discriminating the temperature of the pressurizing roller.

In order to find the temperature of the pressurizing roller 2, the temperature control method in this embodiment measures the temperature of the heating roller 1 immediately before starting the conduction of electric power to the heating roller 1 at the time of the warm-up operation and then discriminates the temperature of the pressurizing roller 2 on the basis of the temperature thus measured of the heating roller 1. In a case in which the temperature of the pressurizing roller 2 is indirectly estimated on the basis of the temperature of the heating roller 1 in this manner, it may happen in some instances that the estimated temperature of the pressurizing roller 2 is in a value different from its actual temperature. For example, at a time immediately after printing one sheet after the completion of a warm-up operation performed from a state in which the pressurizing roller 2 is sufficiently cool, the heating roller 1 is in a state at a high temperature, but the pressurizing roller 2 is not warmed up to any sufficient degree, and there remains a considerable temperature difference between the pressurizing roller 2 and the heating roller 1. In addition, the manner how this temperature difference occurs is different for different image forming jobs performed in the past, so that the temperature of the heating roller 1 does not serve as any index for the temperature of the pressurizing roller 2.

In view of this situation, this example of embodiment judges the extent of a rise in the temperature of the pressurizing roller 2 with attention paid to the following two points. The first point is the point that it is possible to achieve a favorable state of fixing by just changing the temperature of the heating roller in several stages, for example, in two stages bordering on a certain temperature, in most cases even if the temperature of the heating roller 1 is not caused to change strictly in accordance with the temperature of the pressurizing roller 2. Changes in two stages will be satisfactory so long as the favorable range is covered with a high temperature mode and a low temperature mode as shown in FIG. 27.

Figure 28:
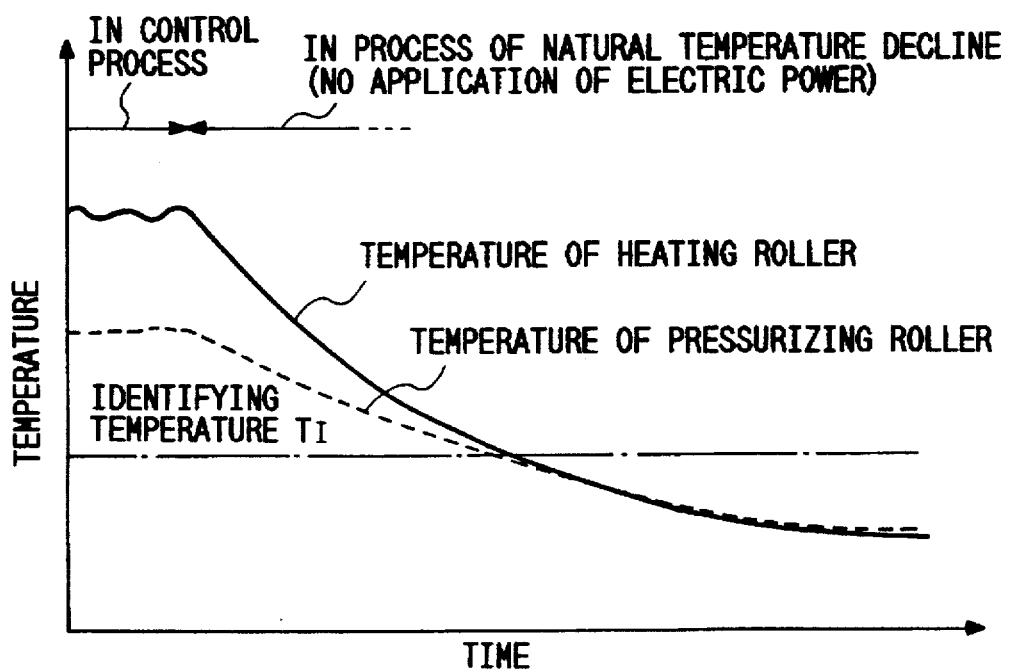
FIG. 28 is a chart illustrating a natural temperature decline process with the fixing device in the example of embodiment of the present invention.

The second point is the temperature change behavior of the heating roller 1 and the pressurizing roller 2 in the state of a natural temperature decline as shown in the graph in FIG. 28. That is to say, the point is that there is a temperature (an equalizing temperature $T_I$) at which the temperature of the heating roller 1 and the temperature of the pressurizing roller 2 will be almost the same, when the temperature of the heating roller 1 has declined to or below a certain predetermined value even if there is initially any difference in temperature between the heating roller 1 and the pressurizing roller 2 in the state in which the heating roller 1 and the pressurizing roller 2 become cool with no electric power applied to the heating roller 1, i.e., in the process of a natural decline in temperature. The temperature of the heating roller 1 can serve as an index for the temperature of the pressurizing roller 2 so long as it is at a temperature at which the temperature of the heating roller 1 and that of the pressurizing roller 2 are almost the same. Therefore, with such a temperature working as a boundary, it will be sufficient to make a discrimination between a high temperature mode, in which the heating roller 1 is to be controlled so as to attain a change toward a high temperature since the pressurizing roller 2 has not attained any sufficient rise in temperature, and a low temperature mode, in which the heating roller 1 is to be controlled so as to attain a change toward a low temperature since the pressurizing roller 2 has attained a sufficient rise in temperature.

The natural temperature decline process as used for the present invention is defined clearly and definitely as set forth in the following part. First, a fixing device is left as it is for a sufficiently long period of time under a room temperature at approximately 20° C. Next, electric power is to be supplied to a halogen lamp heater 3 while both a heating roller 1 and a pressurizing roller 2 are not rotated, and the temperature of the heating roller 1 is thereby caused to rise to attain a target temperature. When the heating roller 1 has attained the target temperature, the heating roller 1 and the pressurizing roller 2 are immediately set into their rotation for two minutes. Thereafter, the conduction of electric power to the halogen lamp heater 3 and the rotation of these two rollers are stopped at the same time. From this point, a natural temperature decline process begins. Then, by measuring the surface temperatures of both the rollers after that point in time, it is possible to find an equalizing temperature $T_I$. Here, the rotation of both the rollers for a duration of two minutes represents an intermediate state between a case in which only one sheet has been printed after a warm-up operation is performed with its start from a state under a room temperature at about 20° C. and then brought to its completion and the state in which a sufficiently large number of sheets have been printed continually from the same state after the warm-up operation.

With the fixing device described in this example of embodiment, measurements were made of the ambient temperature, the image forming jobs in the past, and so forth under various conditions mainly including the conditions defined above, and it was found that the equalizing temperature $T_I$ was almost in the proximity of the 40° C. In view of this state, the discriminating temperature $T_D$ for making a discrimination between the high temperature mode and the low temperature mode was set at 40° C., and the temperature of the pressurizing roller 2 was measured. That is to say, after the temperature of the heating roller 1 was set at the level of 40° C., a warm- up operation is performed, and, when the fixing device has come to a state in which a recording medium 5 begins to be passed through the fixing device, in accordance with the above-mentioned operating sequence for this example of embodiment, a measurement was made of the temperature of the pressurizing roller 2. The temperature of the pressurizing roller 2 at that time was 80° C. Accordingly, the target control temperature for the heating roller 1 in the high temperature mode may be set at such a temperature as ensures its coverage of a favorable fixing region on the assumption that the temperature of the pressurizing roller 2 fluctuates only in a range not any higher than 80° C. In the low temperature mode, on the other hand, the target control temperature for the heating roller 1 may be set up on the assumption that the pressurizing roller 2 fluctuates only in a range not any lower than 80° C. Moreover, the lower limit value for the temperature fluctuations of the pressurizing roller 2 in the high temperature mode can be set at the temperature which the pressurizing roller 2 attains at the time of the passage of paper through the fixing device after a warm-up operation has been performed in accordance with the operating sequence from the lower limit value for the ambient temperature assumed as an operating condition for an image forming apparatus provided with a fixing device. On the other hand, the upper limit value for the temperature fluctuations of the pressurizing roller 2 in the low temperature mode can be set at the upper limit value for the temperature of the pressurizing roller 2 for the time of continually printing a large number of sheets. As described so far, these two modes as thus delimited can respectively cover a favorable range of fixing because the range for the fluctuations of the temperature of the pressurizing roller 2 is smaller in comparison with the range of fluctuations in the total in a case in which the modes are not divided into the two modes, i.e., the high temperature mode and the low temperature mode.

Here, some remarks are supplemented with respect to the equalizing temperature $T_I$. The statement that the temperature of the heating roller 1 and the temperature of the pressurizing roller 2 are almost the same should be understood to means that the temperatures of between these rollers are acceptable as being practically the same so long as the temperature difference between them are within a certain range. The range is to be determined on the basis of the point to what extent of strictness the temperature should be controlled, but it may usually be regarded as an almost the same temperature if the two temperatures are within a range of 5° C.

Now, the adequate values of the equalizing temperatures $T_I$ and the discriminating temperature $T_D$ mentioned above are different, depending on the construction of the particular fixing device or the like. Now, a method for determining adequate values of the discriminating temperature $T_D$ will be described in the following part. First, the equalizing temperature $T_I$ is to be found by the method described above. Next, a fixing process is actually performed while a measurement is made of the respective surface temperatures of the heating roller 1 and the pressurizing roller 2, and a search is thereby made for a favorable fixing region shown in FIG. 27. In FIG. 27, a favorable fixing region is a region which is located below the limit for the occurrence of wrinkles on the paper and above the line which indicates the limit for the favorable fixing performance. Then, the changeover temperature $T_{PD}$ is set up in such a manner that the temperature of the heating roller 1 and the temperature of the pressurizing roller 2 are always kept in the favorable fixing region. The two rectangular regions indicated by broken lines in FIG. 27 show a high temperature mode and a low temperature mode, which are changed over from each to the other with the changeover temperature $T_{PD}$ as a boundary, and each of these modes are thus contained in a favorable fixing region. Thus, it is necessary to provide a certain allowable range to the temperature which the heating roller 1 may assume, so that the temperature range may be contained within the favorable fixing region, and such a range is allowed in order to account for a detecting error in the detection of temperature by the temperature sensor 4 and for a control error in the temperature control operation. In addition, the minimum temperature which the pressurizing roller 2 may assume is the temperature which is attained at the point in time when a recording medium 5 begins its entry into the fixing device after a warm-up operation from the state in which it is at the room temperature. Further, the maximum temperature which the pressurizing roller 2 may assume is the temperature which is attained after the temperature of the pressurizing roller 2 has risen to such an extent as to be finally saturated when image forming jobs are performed consecutively. Thus, the temperature range which the heating roller 1 may take and the temperature range which the pressurizing roller 2 may take are measured in this manner, and the changeover temperature $T_{PD}$ is to be set in such a manner that a rectangular region for the high temperature mode and a rectangular region for the low temperature mode may be contained in a favorable fixing region on the graph showing a favorable fixing region in FIG. 27. Next, starting from the state in which the pressurizing roller 2 is cold, heat the heating roller 1 and keep the roller at a target control temperature, and find the temperature rise curve for the pressurizing roller 2 while driving the two rollers for their respective rotation.

Figure 29:
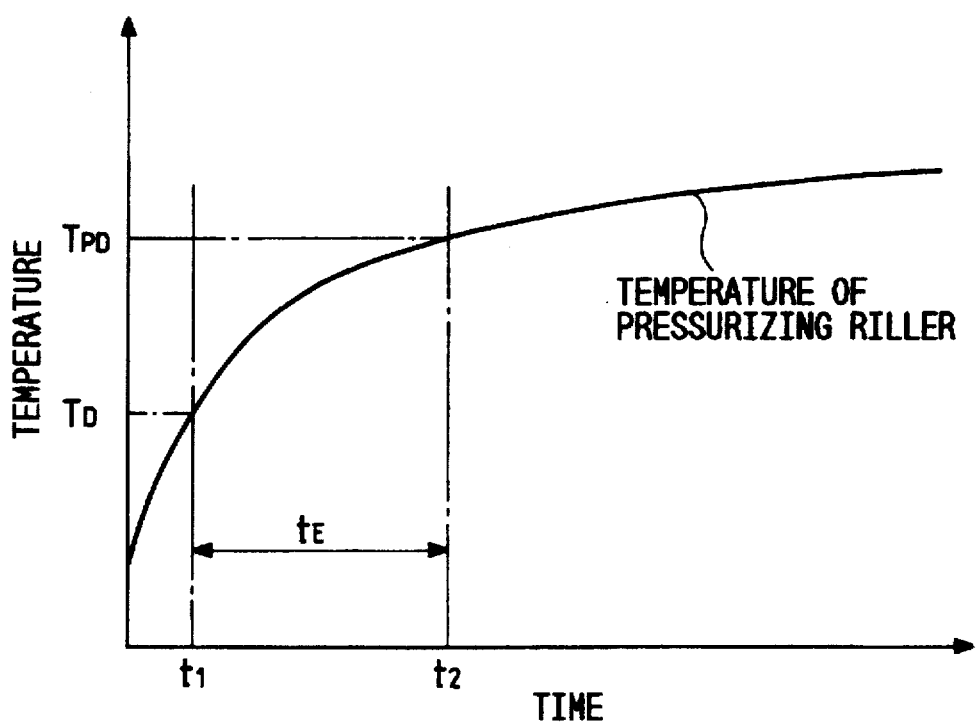
FIG. 29 is a chart illustrating a temperature rise process on the pressurizing roller in the example of embodiment of the present invention.

FIG. 29 illustrates a temperature rise curve for the pressurizing roller in the fixing device described in this example of embodiment of the present invention. In FIG. 29, the temperature of the pressurizing roller 2 at the time $t_1$, which is obtained by subtracting the unloaded rotation time $t_E$ set up in the operating sequence of the fixing device from the time $t_2$ at which the temperature of the pressurizing roller 2 is at the changeover temperature $T_{PD}$ is the rotation start time temperature of the pressurizing roller 2 in the state of the boundary for the changeover between the high temperature mode and the low temperature mode. In case the pressurizing roller 2 does not start its rotation, the temperature of the pressurizing roller 2 usually does not attain almost no rise in the course of a rise of the temperature of the heating roller 1, so that the temperature at the time of the start of a rotation of the pressurizing roller 2 may be regarded as the time at the time of the start of the conduction of electric power. Accordingly, the rotation start time temperature of the pressurizing roller 2 thus obtained and serving as a boundary state for the mode at the time of the start of the passage of paper can be taken as a discriminating temperature $T_D$.

Even in a case in which the operating sequence is different from that of this example of embodiment, an electric power conduction start temperature may similarly be found by tracing in such a manner that the changeover temperature $T_D$ can be attained at the time of the start of the passage of paper.

Of course, the changeover temperature $T_{PD}$ at such a time should be at a temperature lower than the identifying temperature since the temperature of the heating roller should represent the temperature of the pressurizing roller. Further, a certain range is allowed for the temperature of the heating roller 1 in FIG. 27 in order to offer an allowance for a deviation in the temperature control, a dispersion in the measurements by the temperature sensor 4, and so forth.

Next, a description will be made of the shift from the high temperature mode to the low temperature mode. This shift is needed because it is necessary to shift from the high temperature mode to the low temperature mode after printing a certain predetermined number of sheets since a temperature rise occurs on the pressurizing roller 2 in the case of a printing job performed on a large number of sheets even though a fixing operation is initially performed in the high temperature mode. The predetermined number of sheets as a condition for such a shift in the operating mode is determined in the manner which is described as follows. A printing operation is performed on a large number of sheets while the control system keep measuring the temperature of the pressurizing roller 2 as from the state in which the pressurizing roller 2 is cold, and the number of sheets of paper printed until the fixing device attains the boundary temperature for the pressurizing roller 2, i.e. a temperature at which the operating mode is to be changed over, namely, the changeover temperature $T_{PD}$, is to be obtained. For a fixing device which is employed ordinarily, it is appropriate to set the predetermined number of sheets at a range approximately from two sheets to 10 sheets.

7-2-2. Correction of Temperature Decline on Pressurizing Roller at Time of Passage of Recording Medium Next, a description will be made of a method for correcting a temperature decline which occurs on the pressurizing roller as the result of the passage of a recording medium 5 in another example of embodiment o the present invention.

Figure 30:
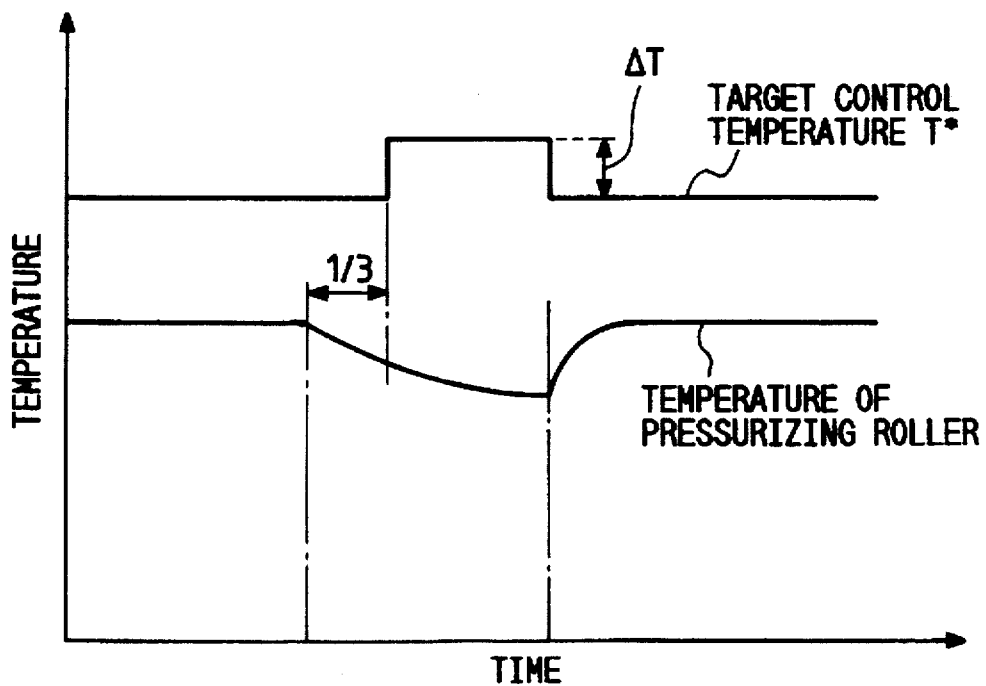
FIG. 30 is a chart illustrating the changes which occur in the temperature on the pressurizing roller when the recording medium is passed through the fixing device in the example of embodiment of the present invention.

The fluctuations which occur in the temperature of the pressurizing roller 2 as the result of the passage of the recording medium can be predicted because the timing at which temperature fluctuations occur is regulated by the operating sequence of the image forming apparatus. Accordingly, once the behavior of the temperature decline is found, it is effective to perform such a control sequence which causes a change in the target temperature of the heating roller 1 in such a manner as to compensate for the temperature decline behavior. FIG. 30 presents a graph showing the measured results of the fluctuations in the temperature of the pressurizing roller at the time of the passage of the recording medium through a fixing device in the construction described above. The temperature decline on the pressurizing roller progresses according as the recording medium is passed through the fixing device, as shown in FIG. 30. Though it is observed that the qualitative form of such temperature fluctuations is almost constant, depending on such factors as the variety of the recording medium, but the magnitude of the fluctuations in temperature is not constant.

Now, a description will be made of the correcting method in the following part. First, a measurement is to be made of the declines which occur in the temperature of the pressurizing roller 2 when the fixing device fixes the recording medium 5 having the largest heat capacity and the recording medium 5 having the smallest heat capacity among the recording media 5 usable for the image forming apparatus according to the present invention. In the meantime, it is possible to find the quantity of a temperature rise which is needed for the heating roller 1 in compensation for the quantity of a temperature decline of the pressurizing roller 2 on the basis of the inclination of the line indicating the lower limit of the favorable fixing region shown in FIG. 27. Therefore, the temperature decline measured on the pressurizing roller 2 by the method described above is to be converted into the quantity of a temperature rise to be attained on the heating roller 1, and the target control temperature T* is to be changed accordingly. However, it is not necessary, as a matter of fact, to perform any such strict control as always changing the target temperature T* of the heating roller 1 in response to a decline in the temperature of the pressurizing roller 2, but it will be sufficient to change the target temperature T* in several stages in accordance with the degrees of the temperature decline of the pressurizing roller 2. In this example of embodiment, the temperature of the heating roller 1 is raised by $\Delta T=3°$ C. as from the point in time when the passage of one third of the recording paper size is completed as shown in FIG. 30. Ordinarily, it is appropriate to raise the temperature by approximately $\Delta T=5°$ C. from the $\Delta T=1°$ C.

Figure 31:
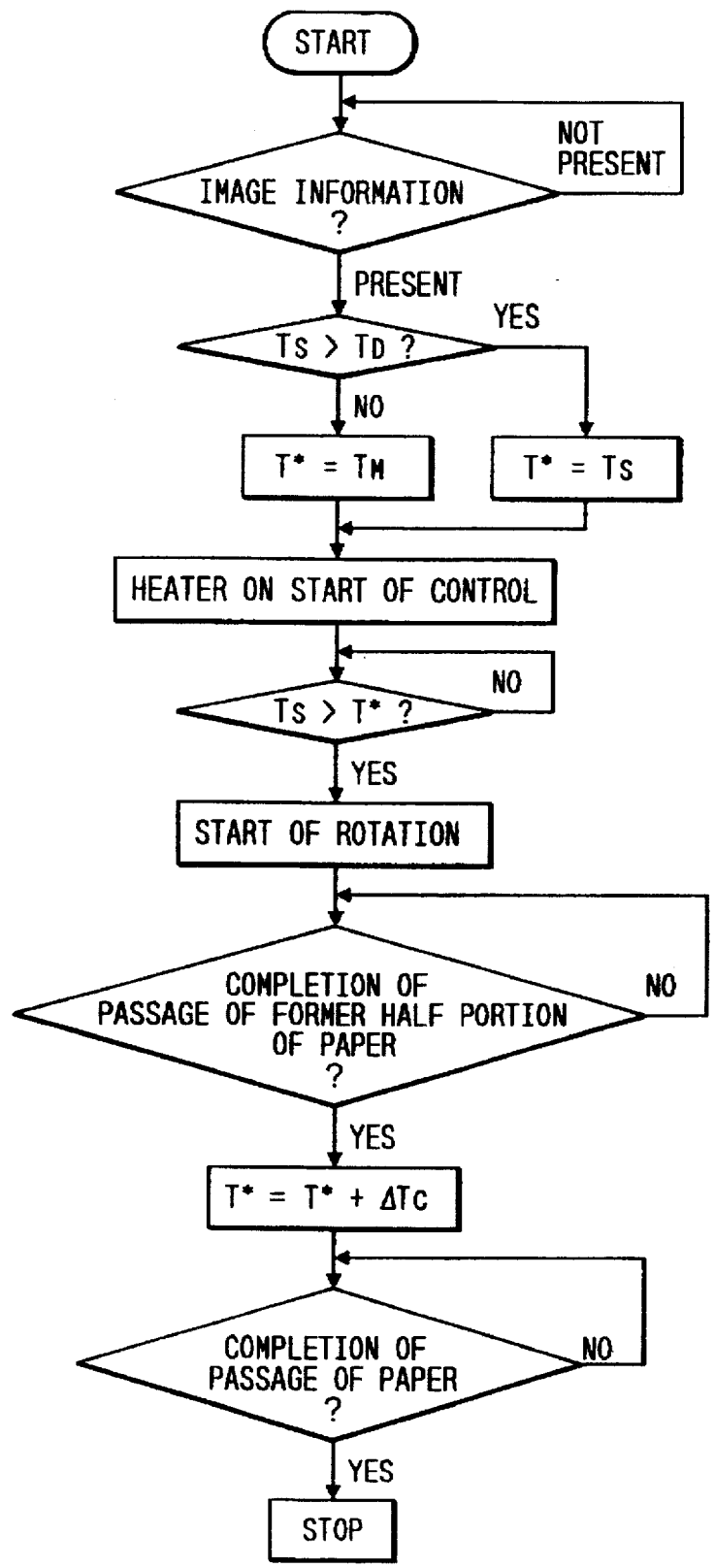
FIG. 31 is a flow chart illustrating the temperature control performed by the use of a process for correcting a target temperature with a discriminating temperature and the passage of a recording medium through the fixing device in the example of embodiment of the present invention.

On the basis of the sequential temperature control method as described above, the temperature control sequence is formed in the manner shown in the flow chart in FIG. 31. When the image data is entered first from outside of the image forming apparatus, the temperature $T_S$ detected by the temperature sensor 4 at that time is compared with the discriminating temperature $T_D$, and it is determined which of the two modes, the high temperature mode and the low temperature mode, is to be employed. In a manner suitable for the operating mode thus selected, the target control temperature is set either to $T_H$ or $T_L$, and it is started to conduct electric power to the halogen lamp heater 3, putting the fixing device into a warm-up state. When the temperature $T_S$ detected by the temperature sensor 4 has attained the target control temperature T*, the fixing device starts the rotation of both the rollers, and a recording medium 5 passes through the fixing device after a predetermined period of time. When the former half portion (½) of the recording medium 5 in the process of its passage has passed through the fixing device, the target control temperature is raised by $\Delta T_C$ (3° C. in this example of embodiment), and the initial target control temperature is assumed again when the passage of the recording medium is completed. If the operation is performed initially in the high temperature mode, the fixing device is set in a low temperature mode after it has printed a predetermined number of sheets, and the passage of the recording medium 5 is started when the target control temperature has attained the value for the operation of the fixing device in the low temperature mode.

In case it is desired to make a correction with a higher degree of accuracy, it is feasible to enter information on such items as the types of paper and to operate the fixing device so as to make a correction suitable for the specified information. For example, in the case of a fixing process performed on a thick sheet of paper, it will be effective to set a larger value for the temperature rise $\Delta T_C$ for the target control temperature than the value for the range of fluctuation for the ordinary recording paper.

7-3. Example of Experiment

[Example 7 of Experiment]

Now, a description will be made of an example in which an experiment was conducted with the temperature control method described below.

TABLE 8

| Heating roller | |
|---|---|
| Material | Aluminum |
| Diameter | 18 mm |
| Tchickness | 0.6 mm |
| Pressurizing roller | |
| Rubber material | Silicone rubber |
| Hardness | 24 degrees (JIS-A) |
| Rubber thickness | 4 mm |
| Diameter | 18 mm |
| Roller pressurizing force | 5 kg |
| pressurizing width | 230 mm |
| Paper passage velocity v | 20 mm/sec. |
| Paper type | weight: 70 g/m² |
| Halogen lamp power | 500 W |
| Temperature sensor | |
| Sensing element | Thermistor |
| Time constant τ | 2 sec. |
| Analog-digital (A/D) conversion levels | 256 levels |
| Temperature resolution for A/D conversion | 0.5 degree/level |
| Control cycle | 1 sec. |
| Mode discriminating temperature $T_D$ | 40° C. |
| Mode changeover temperature $T_{PD}$ | 80° C. |
| Unloaded operation time $t_R$ | 15 sec. |
| High temperature mode control temperature $T_H$ | 155° C. |
| Low temperature mode control temperature $T_L$ | 145° C. |
| Number of sheets for shift of mode | 5 sheets |
| Temperature rise during paper passage $\Delta T_C$ | 0° C. |

With a fixing device made to the specifications stated above and in the sequence of operations shown in FIG. 31, fixing operations were performed after the completion of an warm-up operation with respect to a case in which the pressurizing roller 2 was cold and a case in which the pressurizing roller 2 attained a temperature rise to a sufficiently high level. As the result of this experiment, it was found that a sufficiently favorable state of fixing could be obtained with a fixing process started in 15 seconds after the start of the rotation of both the rollers in a case in which the pressurizing roller 2 was cold. Further, also in a case in which the pressurizing roller 2 had attained a rise in its temperature to a sufficiently high level, no phenomena attributable to excessive heating, such as wrinkles developed on the paper and a high temperature offset ever appeared in a fixing process started similarly in 15 seconds after the start of the rotation of both the rollers.

In the Example 7 of Experiment presented above, the example described here does not make any compensation for a decline occurring in the temperature of the pressurizing roller 2 as the result of the passage of a recording medium 5. The Example 8 of Experiment, which will be described next, is an example which features a combination of a method for controlling by discriminating the temperature of the pressurizing roller 2 and by a changeover between the high temperature mode and the low temperature mode and a method for compensating for a decline in the temperature of the pressurizing roller 2 in consequence of the passage of a recording medium 5.

TABLE 9

The specifications for the fixing device used in this Example of Experiment are as stated in the following part.

| Heating roller | |
|---|---|
| Material | Aluminum |
| Diameter | 18 mm |

TABLE 9-continued

The specifications for the fixing device used in this
Example of Experiment are as stated in the following part.

| | |
|---|---|
| Thickness | 0.6 mm |
| Pressurizing roller | |
| Rubber material | Silicone rubber |
| Hardness | 24 degrees (JIS-A) |
| Rubber thickness | 4 mm |
| Diameter | 18 mm |
| Roller pressurizing force | 5 kg |
| pressurizing width | 230 mm |
| Paper passage velocity v | 20 mm/sec. |
| Paper type | weight 70 g/m$^2$ |
| Halogen lamp output | 500 W |
| Temperature sensor | |
| Element | Thermistor |
| Time constant τ | 2 sec. |
| Analog-digital (A/D) conversion levels | 256 levels |
| Temperature resolution for A/D conversion | 0.5 degree/level |
| Control cycle | 1 sec. |
| Mode discriminating temperature $T_D$ | 40° C. |
| Mode changeover temperature $T_{PD}$ | 80 ° C. |
| Unloaded operation time $t_E$ | 15 sec. |
| High temperature mode control temperature $T_H$ | 155° C. |
| Low temperature mode control temperature $T_L$ | 145° C. |
| Number of sheets for shift of mode | 5 sheets |
| Temperature rise during paper passage Δ $T_C$ | 3° C. |

With a fixing device made to the specifications stated in Table 9 above and in the sequence of operations shown in FIG. 31, fixing operations were performed after the completion of a warm-up operation as in the Example 7 of Experiment with respect to a case in which the pressurizing roller 2 was cold and a case in which the pressurizing roller 2 attained a temperature rise to a sufficiently high level. As the result of this experiment, it was found that a sufficiently favorable state of fixing could be obtained with a fixing process started in 15 seconds after the start of the rotation of both the rollers in a case in which the pressurizing roller 2 was cold. Further, also in a case in which the pressurizing roller 2 had attained a rise in its temperature to a sufficiently high level, no phenomena attributable to excessive heating, such as wrinkles developed on the paper and a high temperature offset ever appeared in a fixing process started similarly in 15 seconds after the start of the rotation of both the rollers. In addition, this fixing device performed an extremely favorable fixing process with almost no change at all in the state of fixing in the former half portion and latter half portion of the recording medium 5.

Further, the mode discriminating temperature $T_D$ in this example of embodiment is set at 40° C., which is the same temperature as the equalizing temperature $T_1$, but a similarly favorable state of fixing could be achieved even if the mode discriminating temperature $T_D$ was set at a temperature lower than the identifying temperature, for example, 35° C., while the changeover temperature $T_{PD}$ was set at approximately 77° C. or the unloaded rotation time $t_E$ was set approximately 18 sec.

7-4. Other Examples of Temperature Discrimination of Pressurizing Roller

Figure 32:
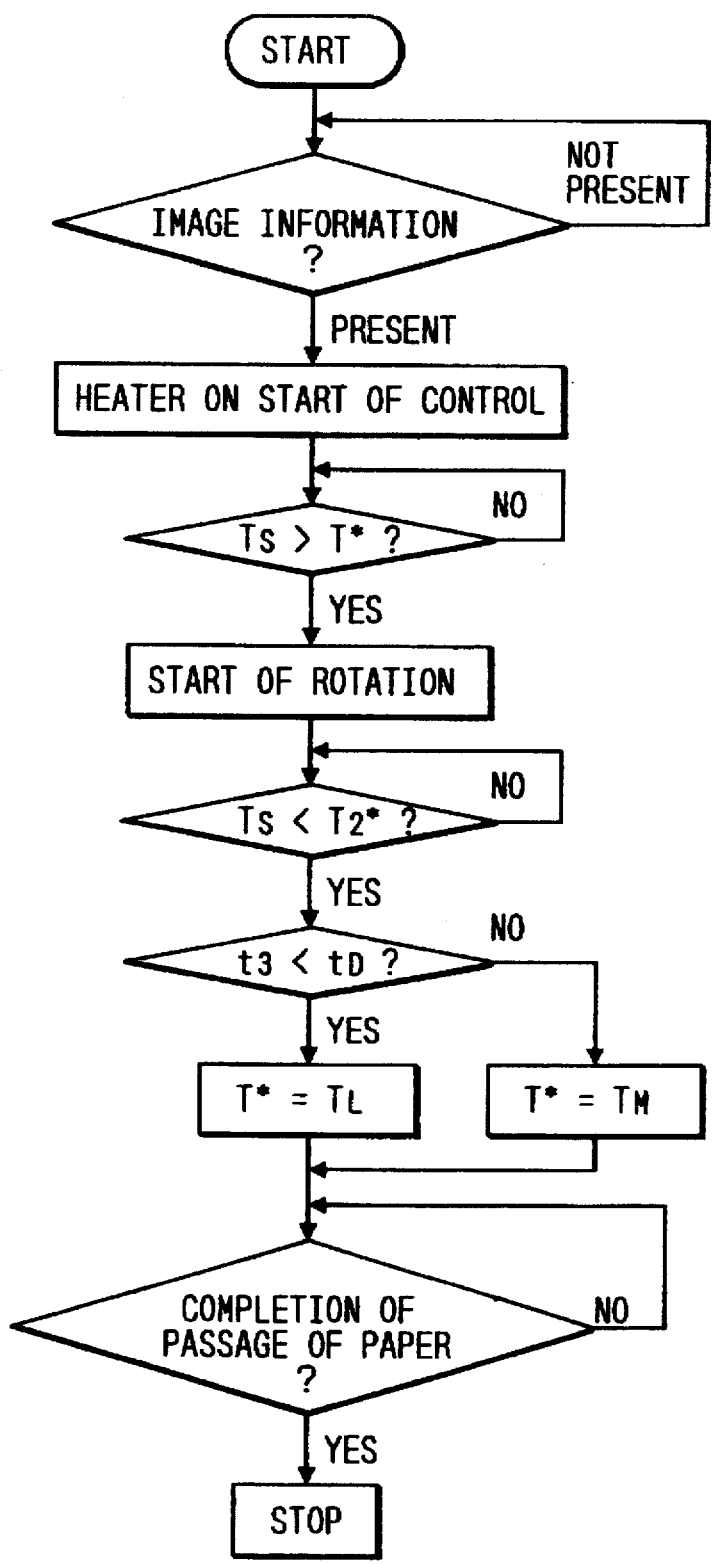
FIG. 32 is a flow chart illustrating the temperature control by the use of a temperature decline change rate in the example of embodiment of the present invention.
Figure 33:
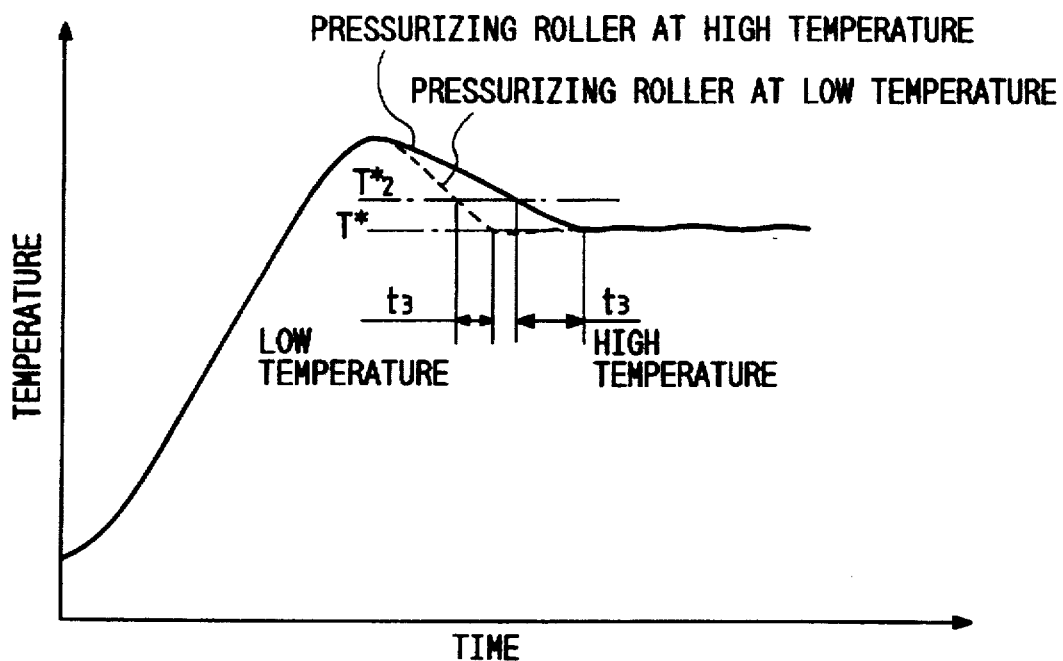
FIG. 33 is a graph for illustrating the manner how the control target temperature is to be set up on the basis of the change rate of the temperature decline which occurs on the heating roller.

Next, another example of embodiment of a temperature sequence control method according to the present invention is described with reference to FIG. 32 and FIG. 33. In this example of embodiment, an estimate of the temperature of the pressurizing roller 2 is made on the basis of the manner how the heating roller 1 is deprived of its temperature while the 1 and the pressurizing roller 2 are rotating together. A flow chart for this example of embodiment is presented in FIG. 32, and the manner how the temperature fluctuates at such a time is shown in FIG. 33.

First, when image data is entered, electric power is conducted to the heating roller 1, and a warm-up operation is performed. Then, when the temperature of the heating roller 1 has attained the predetermined target temperature T*, the heating roller 1 and the pressurizing roller 2 start their rotation. The initial target temperature T* may be either in the low temperature mode $T_L$ or in the high temperature mode $T_H$. In general, however, the heating roller 1 takes a shorter period of time when it is heated from a low temperature state to a high temperature state than the period of time which the heating roller 1 takes when it is cooled from a high temperature state to the low temperature state. Thus, in order to reduce the mode shift time to the maximum extent possible, it will be better to set the initial target temperature T* in the low temperature mode $T_L$. Immediately after the heating roller 1 has attained the target temperature T*, the temperature of the heating roller 1 is in an overshoot state, and electric power is not applied to the halogen lamp heater 3. Therefore, the quantity of heat which the heating roller 1 is deprived of by the pressurizing roller 2 is reflected as it is on the fluctuations of the temperature of the heating roller 1. Next, as the overshoot state continues for some time, the temperature of the heating roller 1 declines in the meantime to a point in the proximity of the target temperature T*, and then electric power begins to be applied again. In this example of embodiment, a changeover is made between the high temperature mode T*=$T_H$ and the low temperature mode T*=$T_L$, depending on the manner how the temperature of the heating roller 1 declines until it arrives there after the temperature of the heating roller 1 once attains a peak.

As for the methods available for discriminating the manner of a decline of the temperature of the heating roller 1, such methods as 1) a method for discriminating the temperature decline on the basis of the time from the time when the temperature of the heating roller 1 attains a peak to the time when electric power begins to be applied, 2) a method for discriminating the temperature decline on the basis of the average rate of change of the temperature from the time when the temperature of the heating roller 1 attains a peak to the time when electric power begins to be applied, and 3) a method for discriminating the temperature decline on the basis of the rate of change in the temperature immediately before the time when electric power begins to be applied are effective. In this example of embodiment, the third method is employed. In specific terms, the time $t_3$, which is the period of time from the time when the temperature of the heating roller 1 arrives at a temperature T*$_2$, which is slightly higher than the target temperature T*, and then attains the target temperature T* is to be counted, and the operating mode is determined on the basis of the relative sizes of the time $t_3$ and the discriminating time $t_D$. If the time $t_3$ is smaller than the discriminating time $t_D$, it is considered that the heating roller 1 is deprived of a large quantity of heat, so that the temperature of the pressurizing roller 2 should be low, and then the fixing device is put into the high temperature mode T*=$T_H$. If the time $t_3$ is larger than the discriminating time $t_D$, the fixing device is put into the low temperature mode T*=$T_L$.

Figure 34:
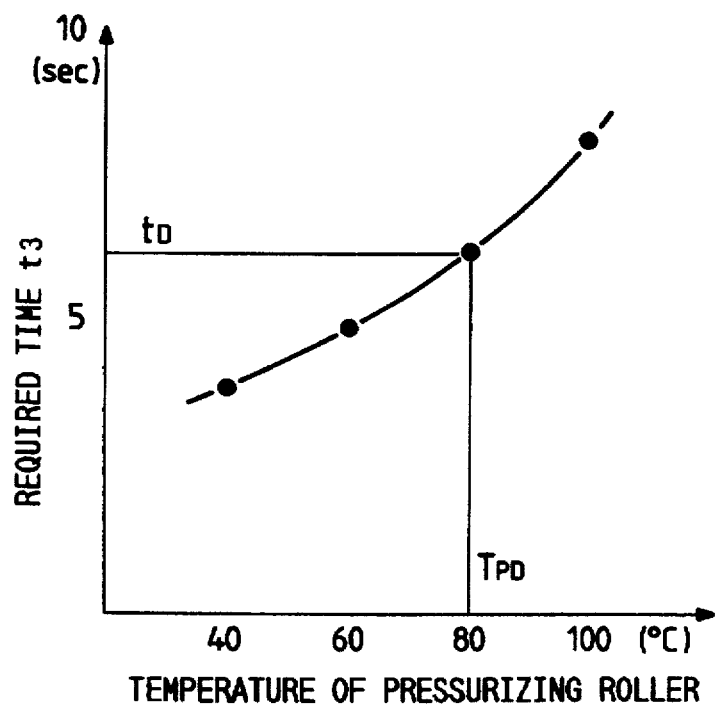
FIG. 34 is a graph for illustrating the manner how the judging time is to be found on the basis of the relationship between the time required for the decline in the temperature and the temperature on the pressurizing roller.
Figure 35:
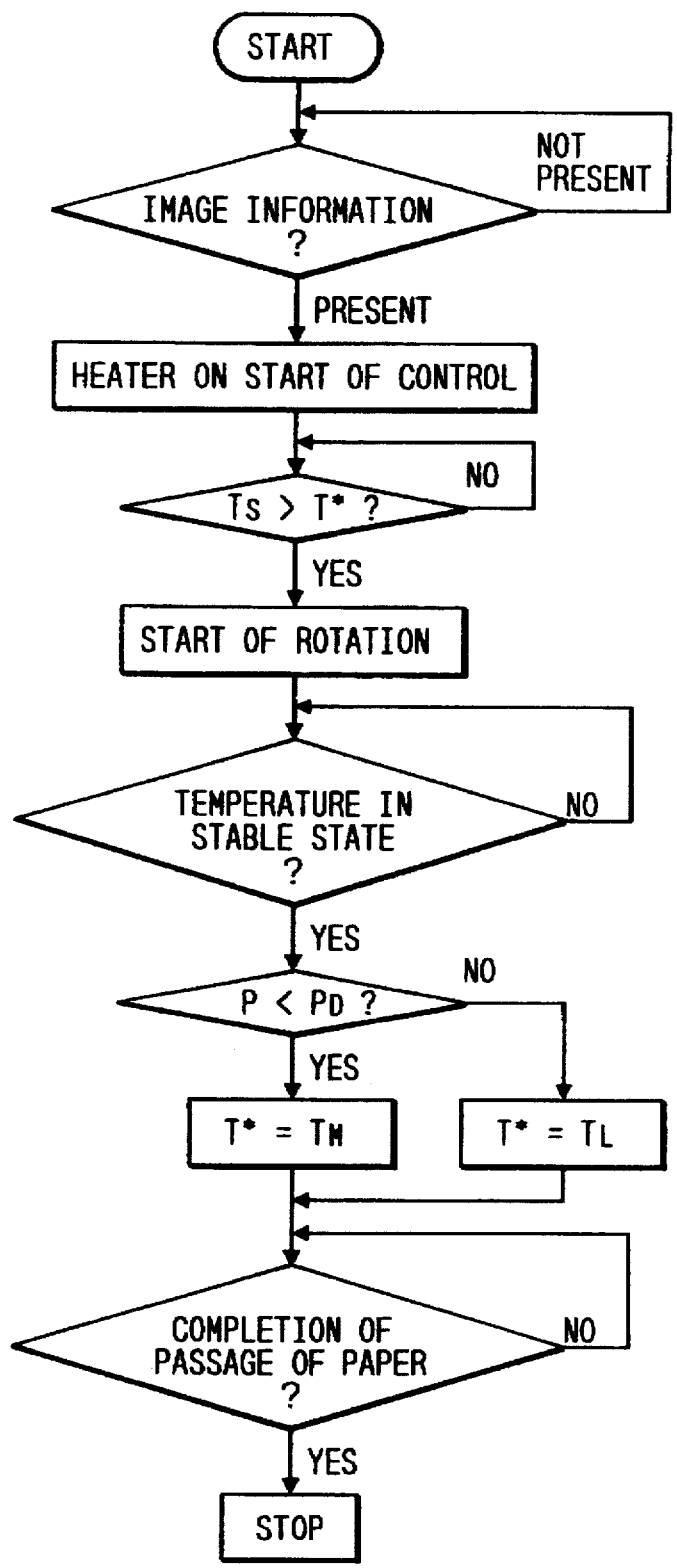
FIG. 35 is a flow chart illustrating the temperature control performed by the use of the quantity of electric power applied at a time when the temperature is in a stable state.

FIG. 34 is a graph for illustrating the correspondence between the required time $t_3$ leading from T*$_2$ to T* and the temperature of the pressurizing roller 2 at that time. It is possible to select a discriminating time $t_D$ with reference to the graph shown in FIG. 34. That is to say, the changeover temperature $T_{PD}$ can be determined in such a manner that the operating region is always contained within the favorable fixing region shown in FIG. 27, and the corresponding required time $t_3$ and the discriminating time $t_D$ can be set up with reference to the curve shown in FIG. 34. By this, it is made possible to demarcate the temperature fluctuation range for the pressurizing roller 2 and to set up a fixing temperature suitable for the temperature fluctuation range in the same way as in the example of embodiment in which the high temperature mode and the low temperature mode are changed over by using the above-mentioned discriminating temperature $T_D$. In this example of embodiment, a discrimination of an operating mode can be done for each sheet of paper printed, so that it is possible to make a more accurate discrimination of the mode in this embodiment than in the example of embodiment described above.

Moreover, the discrimination between the high temperature mode and the low temperature mode is made in this example of embodiment on the basis of the fluctuations in the temperature of the heating roller 1, with the supply of electric power to the halogen lamp heater 3 set at 0 W. However, the same mode discriminating method as described above may be performed to produce the same effect in a state in which a certain quantity of electric power is applied for the purpose of preventing an undershoot, which is liable to occur after an overshoot on the heating roller 1.

Next, another example of embodiment of the sequential temperature control method according to the present invention will be described with reference to the flow chart shown in FIG. 34. In the same way as in the previous example of embodiment, this example of embodiment estimates the temperature of the pressurizing roller 2 on the basis of the manner how the heating roller 1 is deprived of heat while the heating roller 1 and the pressurizing roller 2 are set into their rotation, and a judgment is made on the estimated temperature by a comparison between the applied electric power quantity P and the discriminating electric power quantity $P_D$ when a temperature control process is performed.

The operating sequence is such that electric power is first conducted to the heating roller 1 when image information is entered, and a warm-up operation is performed. Then, after the temperature of the heating roller 1 reaches the target temperature T*, the heating roller 1 and the pressurizing roller 2 are started into their rotation. After the overshoot state in the temperature of the heating roller 1 has been put into a normal state, the heating roller 1 is controlled stably to maintain the target control temperature. Yet, at such a time, the commercial AC electric power is not applied in its wave form entirely to the halogen lamp heater 3 as mentioned above, but is applied at a reduced duty for the number of waves by such a temperature control technique as proportional control. Then, the temperature of the pressurizing roller 2 can be determined on the basis of the electric power quantity P, which is being applied at such a time. If the applied electric power quantity P is larger than the discriminating electric power quantity $P_D$, the heating roller 1 is being deprived of a large quantity of heat, so that the temperature of the pressurizing roller is considered to be low, and the operation of the fixing device is put into the high temperature mode T*=$T_H$. If the applied electric power quantity P is smaller than the discriminating electric power quantity $P_D$, then the operation of the fixing device is put into the low temperature mode T*=$T_L$.

Figure 36:
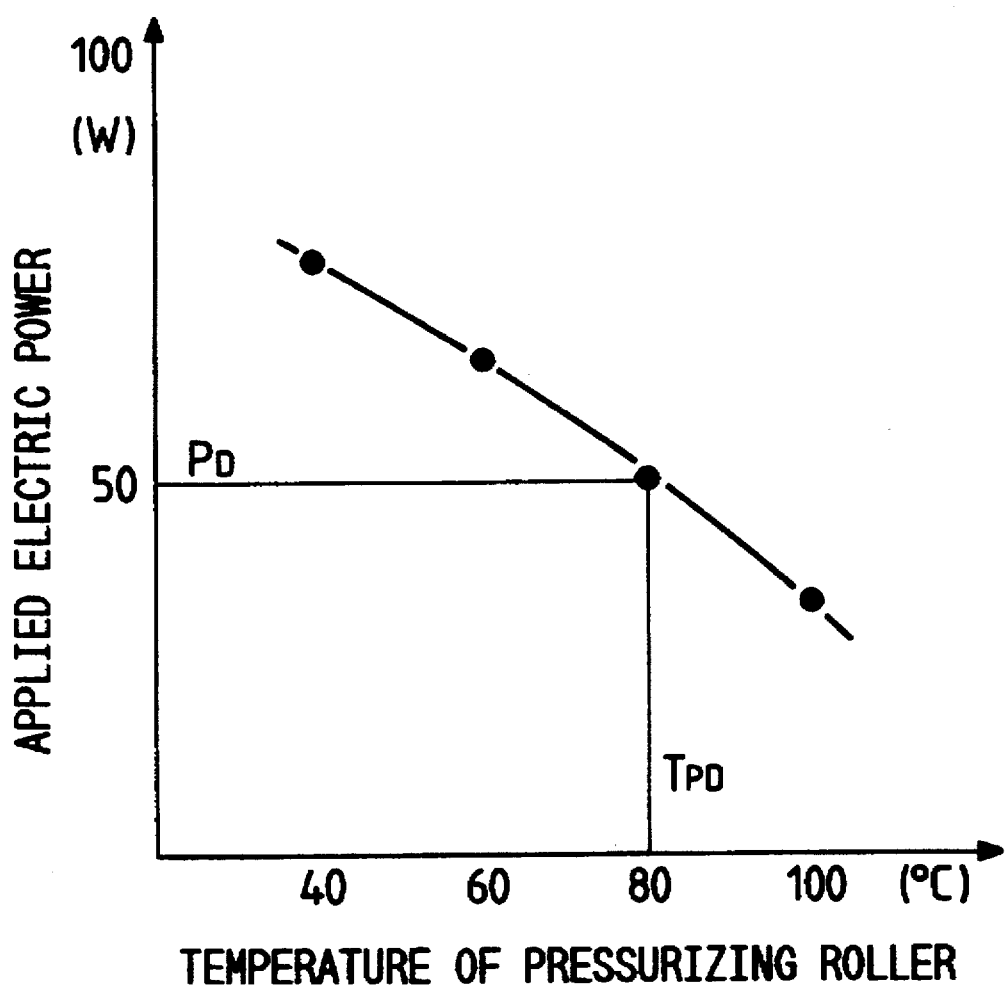
FIG. 36 is a graph for illustrating the manner how the discriminating electric power is to be determined on the basis of the relationship between the quantity of electric power applied and the temperature of the pressurizing roller.

FIG. 36 is a graph showing the measured results that indicate the relationship between the quantity of the applied electric power and the temperature of the pressurizing roller 2. It is possible to select a discriminating electric power quantity $P_D$ with reference to the graph shown in FIG. 36. Specifically, a changeover temperature $T_{PD}$ is to be determined in such a manner that the fixing region is always contained in the favorable fixing region indicated in FIG. 27, and the corresponding quantity of applied electric power can be set as the discriminating electric power quantity $P_D$ on the basis of the curve shown in FIG. 36. When the construction of the fixing device is determined in this manner, it is possible to estimate the temperature of the pressurizing roller 2 on the basis of the quantity of the applied electric power in the control state and also to control the target control temperature of the heating roller 1 in accordance with the estimated temperature of the pressurizing roller 2. Now that the method described in this example of embodiment is capable of changing the target control temperature of the heating roller 1 more strictly in comparison with the example of embodiment described earlier, the method described in this embodiment will prove more effective when it is applied to a fixing device with a narrower area of a favorable fixing region.

7-5. Other Examples of Temperature Decline Correction on Pressurizing Roller at Time of Passage of Recording Medium Next, a description will be made of another example of embodiment of the sequential temperature control method according to the present invention, with reference to the flow chart shown in FIG. 37.

Figure 37:
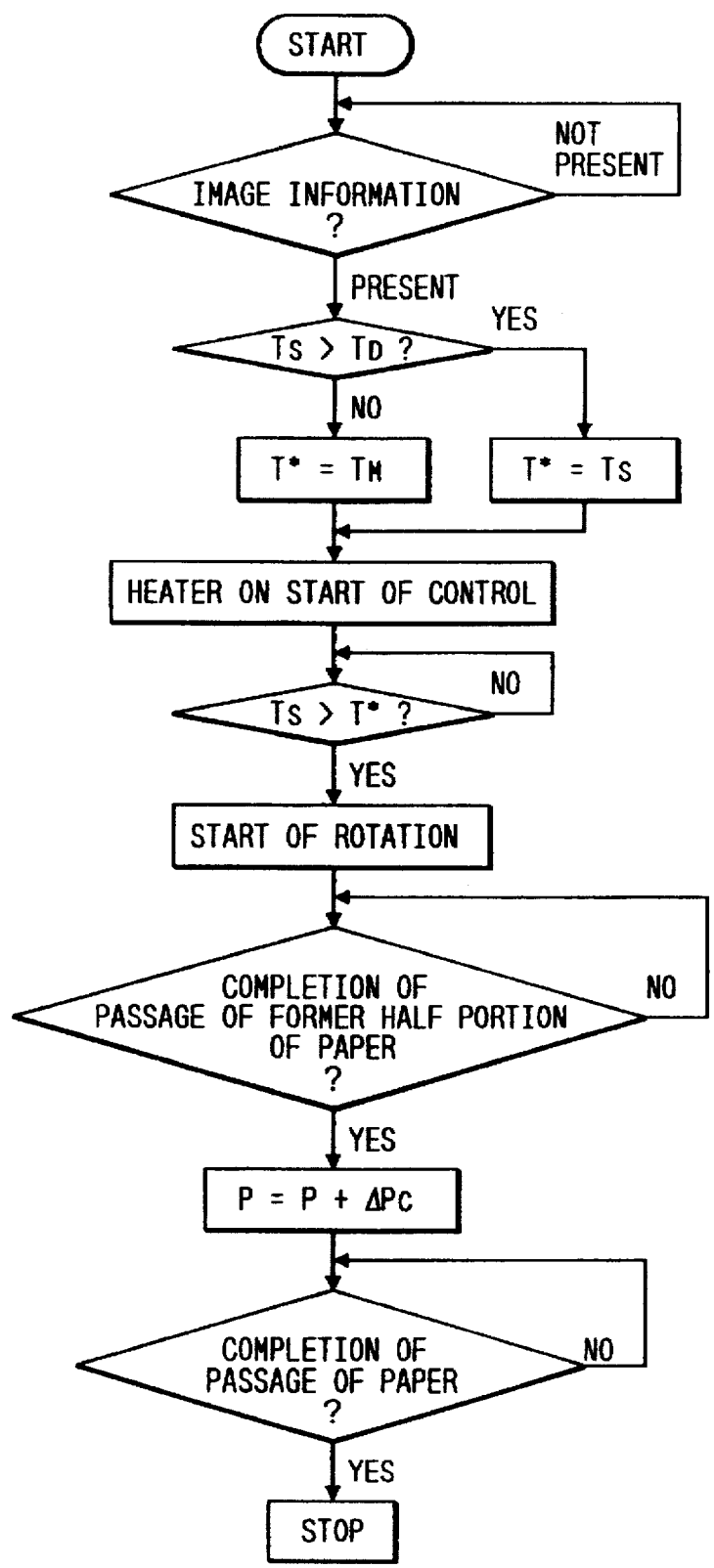
FIG. 37 is a flow chart illustrating the temperature control process performed by the use of a correction of the applied electric power on the basis of the discriminating temperature and the passage of a recording medium through the fixing device in the example of embodiment of the present invention.

This example of embodiment is another example of a control method which compensates for a decline occurring in the temperature of the pressurizing roller 2 as the result of the passage of a recording medium 5 through the fixing device. The method for discriminating the temperature of the pressurizing roller in the former half portion of the flow chart shown in FIG. 37 is the same as such a method described in the preceding example of embodiment (i.e., the method using a discriminating temperature $T_D$). When the passage of the recording medium in the former half portion of the flow chart is completed, the temperature discriminating method in this example of embodiment makes a correction by developing the final control output with the addition of a certain value to the electric power found by calculation as a control output by a feedback control algorithm in the latter half portion of the passage of the recording medium while the target control temperature T* remains at a constant level in the course of the passage of the recording medium through the fixing device in contrast with the temperature discriminating method in the preceding example of embodiment, which changes the target control temperature when the passage of the former half portion of the recording medium is completed. On the occasion of the correction made in this embodiment, the electric power added will be in a value in proportion to the velocity of the passage of the recording medium. An adequate quantity of the electric power to be added $\Delta P_C$ is approximately $0.3 < \Delta P_C/v < 1.5$, in which the velocity for the passage of the recording medium is expressed as "v" (mm/sec.).

In this regard, it is to be noted that the temperature control method according to the present invention is not to be limited to the fixing device of the heat roller process which employs a halogen lamp as a heater as described in the foregoing examples of embodiments. In addition to this process, the temperature control method according to the present invention may be applied desirably, for example, to a resistor which, as a heater, generates heat by the conduction of electric power to it and also to a xenon lamp or the like. Further, as a fixing device, the present invention will be effective even when it is applied to another contact type fixing device of a belt fixing process or the like. This invention will be preferably appropriate for a fixing device which uses a heating means either having a small heat capacity or a large electric power quantity.

Further, as an image forming apparatus provided with a fixing device, the present invention may be applied to a copying machine, a facsimile machine, or the like in addition to a printer as in this example of embodiment.

What is claimed is:

1. A temperature control method for a fixing device which comprises means for heating a recording medium, the heating means having an actual temperature, and temperature detecting means for detecting the temperature of the heating means, the method comprising the steps of:

determining a predetermined target temperature for the heating means;

detecting the temperature by the temperature detecting means to provide a detected temperature which is different from the actual temperature;

correcting the difference between the actual temperature and the detected temperature at the detection time to provide a corrected temperature which represents the actual temperature of the heating means;

generating a control signal on the basis of the corrected temperature and the predetermined target temperature; and heating the heating means in response to the control signal;

wherein the correction for the detection delay is further made on the basis of a relational equation, $$T_C = T_S + f,$$

in which:

$T_C$ represents the corrected temperature, $T_S$ represents the detected temperature, and f represents a predetermined function which includes a term $\tau \cdot \Delta T_X/\Delta t$, in which:

$\Delta T_S/\Delta t$ represents the rate of change in the detected temperature, and $\tau$ represents a time constant of the temperature detecting means.

2. A temperature control method as defined in claim 1, wherein:

the predetermined function f includes a term $k \cdot \tau \cdot \Delta T_S/\Delta t$, in which k represents a correction factor, and satisfies $0 < k \leq 1.5$.

3. A temperature control method as defined in claim 2, wherein the predetermined function f is:

$$f = k \cdot \tau \cdot \Delta T_S/\Delta t.$$

4. A temperature control method as defined in claim 2 or in claim 3 wherein:

the correction factor k also satisfies $$\Delta T_C/\Delta t \cdot (1-k) \cdot \tau > T_o,$$

in which:

$T_o$ represents a predetermined upper limit value for an overshoot of the predetermined target temperature, and $T_o$ satisfies $$5° \leq T_o \leq 30°.$$

5. A temperature control method for a fixing device which comprises means for heating a recording medium, the heating means having an actual temperature, and temperature detecting means for detecting the temperature of the heating means, the method comprising the steps of:

determining a predetermined target temperature for the heating means;

detecting the temperature by the temperature detecting means to provide a detected temperature which has a difference from the actual temperature;

correcting the difference between the actual temperature and the detected temperature at the detection time to provide a corrected temperature which represents the actual temperature of the heating means;

generating a control signal on the basis of the corrected temperature and the predetermined target temperature; and heating the heating means in response to the control signal;

wherein the control signal is generated to cause the heating means to apply electric power in accordance with the equation, $$P = G \cdot (T^* - T_C) + P_C,$$

in which:

$T_C$ represents the corrected temperature, $T^*$ represents the predetermined target temperature, $P_C$ represents an offset electric power, G represents a gain, and P represents the electric power applied by the heating means; and wherein the offset electric power is a constant value for reducing a constant deviation between the predetermined target temperature and the actual temperature, the constant deviation being a function of the gain.

6. A temperature control method as defined in claim 5, wherein $P_C$ (W) satisfies $$0.0025 \leq P_C/(v \cdot L) \leq 0.025,$$

in which:

v represents the velocity, in mm/sec, at which the recording medium is passed, and L represents the width, in mm, for the passage of the recording medium.

7. A temperature control method as defined in claim 5 further comprising the step of varying the offset electric power $P_C$ between a time for the passage of the recording medium and a time for the non-passage of the recording medium.

8. A temperature control method as defined in claim 5 further comprising the step of varying the offset electric power $P_C$ in the course of a passage of the recording medium.

9. A temperature control method for a fixing device provided with a heating means for heating a recording medium, a temperature detecting means for detecting the temperature of the heating means, and a temperature control means for controlling the temperature of the heating means, wherein the temperature control method is characterized by varying applied electric power in accordance with the equation, $$P = G \cdot (T^* - T_S) + P_C,$$

in which the temperature detected by the temperature detecting means is expressed by $T_S$, a predetermined target temperature is expressed by T*, an offset electric power is expressed by $P_C$, a gain is expressed by G, and the electric power applied to the heating means is expressed by P, and wherein the offset electric power is a constant value for reducing a constant deviation between the predetermined target temperature and the actual temperature, the constant deviation being a function of the gain.

10. A temperature control method as defined in claim 9 for application thereof to a fixing device, wherein the temperature control method is characterized in that the offset electric power $P_C$ (W) defined above is as expressed by the equation, $$0.0025 \leq P_C/(v \cdot L) \leq 0.025,$$

in which the paper passage velocity for the recording medium defined above is expressed by v (mm/sec) and the paper passage width of the recording medium defined above is expressed by L (mm).

11. A temperature control method as defined in claim 9 for application thereof to a fixing device, wherein the temperature control method is characterized by varying the offset electric power $P_C$ defined above between the passage time and the non-passage time for the recording medium.

12. The temperature method as defined in claim 11 for application thereof to a fixing device, wherein the temperature control method is characterized in that the offset electric power $P_C$ (W) defined above is as expressed by the equation $$0.0015 \leq \Delta P_C/(v/L) \leq 0.015$$

in which the quantity of the above-defined change which occurs in the offset electric power $P_C$ between the time for the passage of the recording medium and the time for the non-passage of the recording medium is expressed by $\Delta P_C$ (W), the paper passage velocity of the recording medium defined above is expressed by v (mm/sec), and the paper passage width of the recording medium defined above is expressed as L (mm).

13. A temperature control method as defined in claim 9 for application thereof to a fixing device, wherein the temperature control means defined above is characterized by varying the above-defined offset electric power $P_C$ in the course of the passage of a recording medium.

14. A temperate control method for a fixing device provided with a heating means for heating a recording medium, a temperature detecting means for detecting the temperature of the heating means, and a temperature control means for controlling the temperature of the heating means on the basis of the temperature detected by the temperature detecting means, the temperature control method comprising the steps of:

defining a temperature control period for the temperature control means on the basis of a first period which occurs at a first frequency and a second period which is longer in duration than the first period, the second period having defined within a first phase and a second phase;

supplying electric power to the heating means during the first phase; and pot supplying the electric power to the heating means during the second phase;

wherein the electric power having the first frequency is supplied to the heating means during the first phase of the second period.

15. A temperature control method as defined in claim 14 for application thereof to a fixing device, wherein the temperature control method is characterized by calculating the quantity of electric power to be supplied to the heating means defined above for each of the second periods defined above.

16. A temperature control method as defined in claim 15 for application thereof to a fixing device, wherein the temperature control method is characterized by calculating the quantity of electric power to be supplied to the heating means defined above while making a correction of a delay in a detection made by the temperature detecting means defined above.

17. A temperature control method as defined in claim 14 for application thereof to a fixing device, wherein the temperature control method is characterized in that the second period defined above is not less than 0.2 second but not more than 3 seconds.

18. A temperature control method as defined in claim 14, or in claim 17 for application thereof to a fixing device, wherein the temperature control method is characterized in that the first period defined above is one fifth or less of the second period defined above.

19. A temperature control method as defined in claim 14, in claim 17 for application to a fixing device, wherein the first period defined above is characterized by being in proportion to the period of one half of a cycle of an alternating current wave supplied to the heating means defined above.

20. A temperature control method as defined in claim 14 for application thereof to a fixing device, wherein the temperature control method is characterized in that the electric power supply pattern for supplying electric power to the heating means defined above in the first period defined above is composed of at least one unit of the conduction of electric power and at least one unit of the non-conduction of electric power, for which one half of a cycle of an alternating current wave supplied to the heating means defined above is taken as one unit.

21. A temperature control method as defined in claim 20 for application thereof to a fixing device, wherein the temperature control method is characterized in that the electric power supply pattern defined above is composed of one unit for the conduction of electric power and three to eight units for the non-conduction of electric power.

22. A temperature control method as defined in claim 21 for application thereof to a fixing device, wherein the temperature control method is characterized in that the electric power supply pattern defined above is composed of at least one unit for the conduction of electric power and four to six units for the non-conduction of electric power.

23. A temperature control method as defined in claim 14 for application to a fixing device, wherein the temperature control method is characterized in that the second period defined above is composed only of the first phase in which it is permitted to conduct electric power and additionally that the electric power supply patterns for supplying electric power to the above-defined heating means in the above-defined first period in the above-defined first phase are two or more different electric power supply patterns.

24. A temperature control method for a fixing device provided with a heating means for heating a recording medium, a temperature detecting means for detecting the temperature of the heating means, and a temperature controlling means for controlling the temperature of the heating means, the temperature control method comprising the steps of:

defining a plurality of continuous units for power supplying, each of the units having a duration of one-half of a cycle of an alternating current wave;

determining a control interval consisting of a supply interval and an intermittent interval;

supplying electric power for heating to the heating means only during the supply interval; and not supplying the electric power for heating to the heating means during the intermittent interval wherein the intermittent interval consists of one of four, five, and six of said continuous units.

25. A temperature control method for a fixing device provided with a heating means for heating a recording medium, a pressurizing means forming a fixing nip portion as it is kept in contact under pressure with the heating means, a temperature detecting means for detecting the temperature of the heating means, and a temperature control means for controlling the temperature of the heating means on the basis of the temperature detected by the temperature detecting means, the temperature controlling method comprising the steps of:

determining respective natural declines, over time, in the respective surface temperatures of the pressurizing means and the heating means;

identifying an equalizing temperature $T_I$ at which, during the natural declines in the respective surface temperatures, the surface temperature of the pressurizing means is substantially the same as the surface temperature of the heating means at the same time;

predetermining a discriminating temperature $T_D$ based on a rotation start time temperature of the pressurizing means;

controlling the control temperature of the heating means to:

a low control temperature when the temperature detected by the temperature detecting means is, at the time of the start of the conduction of electric power, at a temperature higher than $T_D$, and a high control temperature when the detected temperature is at a temperature lower than $T_D$;

wherein $T_D$ satisfies the equation $$T_D \leq T_I.$$

26. A temperature control method for a fixing device provided with a heating means for heating a recording medium, a pressuring means forming a fixing nip portion as it is kept in contact under pressure with the heating means, a temperature detecting means for detecting the temperature of the heating means, and a temperature controlling means for controlling the temperature of the heating means on the basis of the temperature detected by the temperature detecting means, wherein the temperature controlling means determines the quantity of heat which the above-defined heating means is deprived of by the above-defined pressurizing means in the state in which the heating means and the pressurizing means are being driven, and makes a selection of a control temperature for the heating means.

27. A temperature control method as defined in claim 26 for application thereof to a fixing device, wherein the temperature control method is characterized in that the temperature control means defined above applies 0 or a certain quantity of electric power to the heating means defined above immediately after the start of a driving operation for the heating means and the pressurizing means both defined above and selects the high control temperature when the quantity of a decline in the temperature detected by the temperature detecting means defined above is not less than a predetermined quantity, but selects the low control temperature when the quantity of the decline in the detected temperature defined above is less than the predetermined quantity.

28. A temperature control method as defined in claim 26 for application thereof to a fixing means, wherein the temperature control method is characterized in that the temperature control means defined above maintains the above-defined heating means at a predetermined temperature in a state in which the heating means and the pressurizing means both defined above are being driven and selects the high control temperature when the electric power applied to the above-defined heating means at that time is not less than a predetermined quantity, but selects the low control temperature when the electric power applied to the heating means at that time is less than the predetermined quantity.

29. A temperature control method for a fixing device provided with a heating means for heating a recording medium, a pressurizing means forming a fixing nip portion as it is kept in contact under pressure with the heating means defined above, a temperature detecting means for detecting the temperature of the heating means defined above, and a temperature controlling means for controlling the temperature of the heating means defined above on the basis of the temperature detected by the temperature detecting means defined above, wherein the temperature controlling means determines the temperature of the pressurizing means, and performs a controlling operation in such a manner that the applied electric power will be larger in a downstream portion of one sheet of the recording medium than in an upstream portion thereof.

30. A temperature control method for a fixing device provided with a heating means for heating a recording medium, a pressurizing means forming a fixing nip portion as it is kept in contact under pressure with the heating means, a temperature detecting means for detecting the temperature of the heating means, and a temperature controlling means for controlling the temperature of the heating means on the basis of the temperature detected by the temperature detecting means, wherein the temperature controlling means determines the temperature of the pressurizing means, and performs a controlling operation in such a manner that a higher temperature is attained in the fixing operation performed on a downstream portion of one sheet of recording medium than the fixing operation performed on an upstream portion thereof.

* * * * *